(12) United States Patent
Ukai et al.

(10) Patent No.: US 10,286,464 B2
(45) Date of Patent: May 14, 2019

(54) CUTTING TOOL

(71) Applicant: MAKITA CORPORATION, Anjo-shi, Aichi (JP)

(72) Inventors: Tomohiro Ukai, Anjo (JP); Takayuki Tahara, Anjo (JP); Taisuke Ukai, Anjo (JP); Yudai Sugino, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 0 days.

(21) Appl. No.: 15/700,945

(22) Filed: Sep. 11, 2017

(65) Prior Publication Data
US 2018/0021866 A1 Jan. 25, 2018

Related U.S. Application Data

(63) Continuation of application No. 14/764,668, filed as application No. PCT/JP2013/084842 on Dec. 26, 2013, now Pat. No. 9,764,399.

(30) Foreign Application Priority Data

Feb. 1, 2013 (JP) ................. 2013-018895

(51) Int. Cl.
*B23D 49/16* (2006.01)
*B23D 51/00* (2006.01)
(Continued)

(52) U.S. Cl.
CPC ........... *B23D 49/16* (2013.01); *B23D 49/162* (2013.01); *B23D 51/00* (2013.01); *B23D 51/10* (2013.01); *B25F 5/02* (2013.01)

(58) Field of Classification Search
CPC ...... B23D 49/16; B23D 49/162; B23D 51/00; B23D 51/10; B25F 5/02
See application file for complete search history.

(56) References Cited

U.S. PATENT DOCUMENTS

| 4,891,884 A | 1/1990 | Torbet |
| D447,924 S | 9/2001 | Neitzell et al. |
(Continued)

FOREIGN PATENT DOCUMENTS

| JP | 2002-192419 A | 7/2002 |
| JP | 2003-260677 A | 9/2003 |
(Continued)

OTHER PUBLICATIONS

Feb. 18, 2014 International Search Report issued in International Application No. PCT/JP2013/084842.
(Continued)

*Primary Examiner* — Omar Flores Sanchez
(74) *Attorney, Agent, or Firm* — Oliff PLC

(57) ABSTRACT

A motor housing of housings forming an outer casing of a tool main body is provided with two battery attachment portions allowing attachment of rechargeable batteries. The two battery attachment portions are configured as slide attachment type battery attachment portions. The two battery attachment portions are suited to slide attachment type rechargeable batteries that are attached through sliding. The two rechargeable batteries are attached in the right-left direction of the tool main body so that the two rechargeable batteries can be arranged side by side in the direction in which the tool main body extends.

20 Claims, 52 Drawing Sheets

(51) Int. Cl.
*B23D 51/10* (2006.01)
*B25F 5/02* (2006.01)

(56) References Cited

U.S. PATENT DOCUMENTS

| | | | |
|---|---|---|---|
| D475,907 S | 6/2003 | Neitzell et al. | |
| D487,384 S | 3/2004 | Neitzell et al. | |
| 9,073,563 B2 | 7/2015 | Middleton et al. | |
| 2003/0101600 A1 | 6/2003 | James et al. | |
| 2004/0231170 A1 | 11/2004 | Neitzell et al. | |
| 2008/0041174 A1 | 2/2008 | Lagaly et al. | |
| 2010/0162579 A1 | 7/2010 | Naughton et al. | |
| 2010/0299943 A1 | 12/2010 | Fukinuki | |
| 2011/0147031 A1 | 6/2011 | Matthias et al. | |
| 2011/0162219 A1 | 7/2011 | Okouchi | |
| 2011/0198103 A1 | 8/2011 | Suzuki | |
| 2011/0308831 A1* | 12/2011 | Martinsson | B25F 5/02 173/217 |
| 2012/0131803 A1 | 5/2012 | Aoyama et al. | |
| 2015/0328796 A1* | 11/2015 | Okouchi | B27B 9/02 30/377 |
| 2015/0375416 A1* | 12/2015 | Haneda | B27B 17/00 30/383 |

FOREIGN PATENT DOCUMENTS

| | | |
|---|---|---|
| JP | 2008-000835 A | 1/2008 |
| JP | 2009-241242 A | 10/2009 |
| JP | 2011-136541 A | 7/2011 |
| JP | 2011-161603 A | 8/2011 |
| JP | 2011-526217 A | 10/2011 |
| JP | 2012-051046 A | 3/2012 |
| JP | 2012-111021 A | 6/2012 |
| WO | 2009/111747 A2 | 9/2009 |

OTHER PUBLICATIONS

Apr. 25, 2017 Office Action issued in Japanese Patent Application No. 2014-559538.

May 1, 2018 Office Action issued in Japanese Patent Application No. 2017-154859.

* cited by examiner

FIG. 20
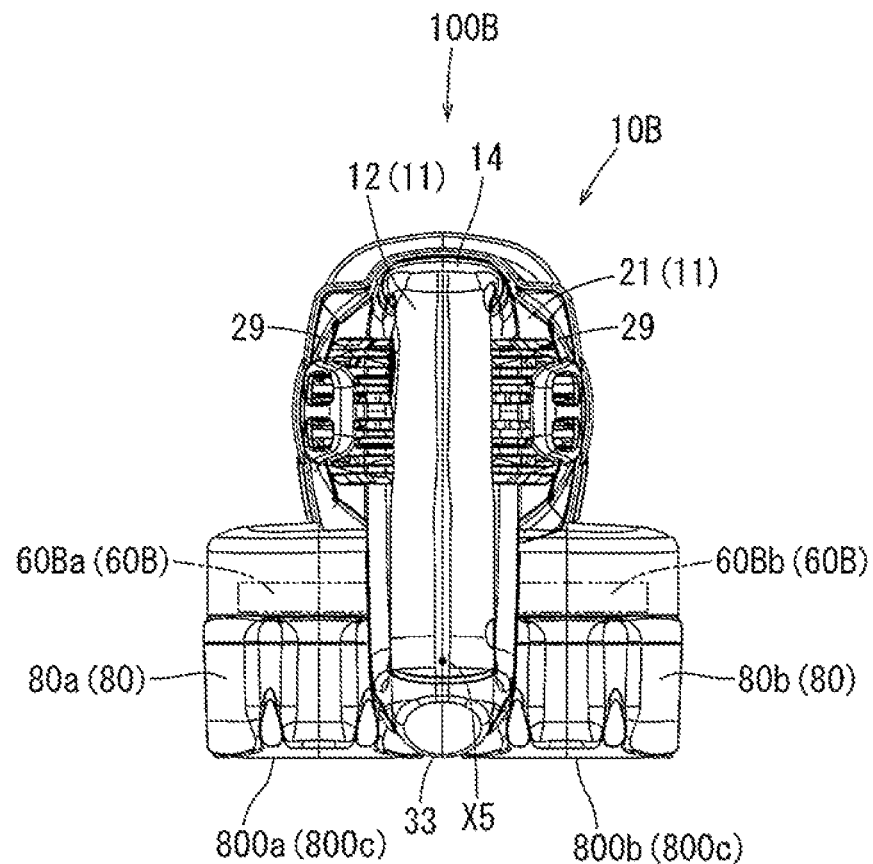
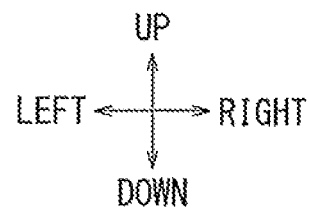

FIG. 51
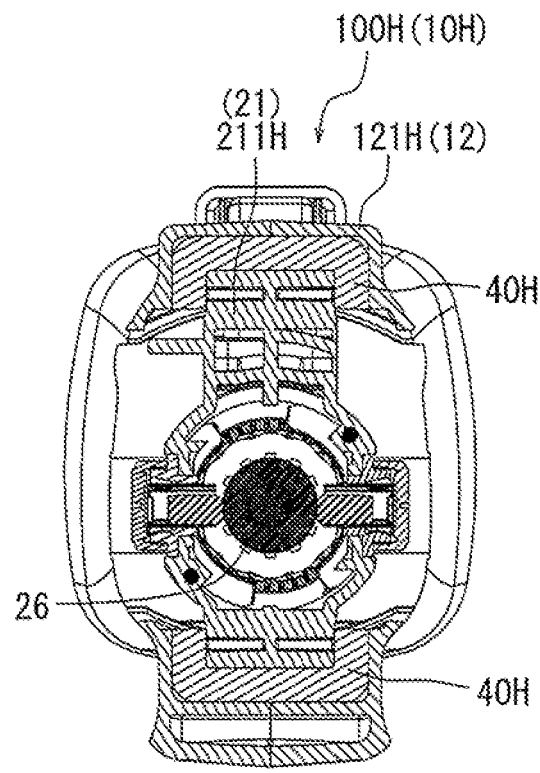
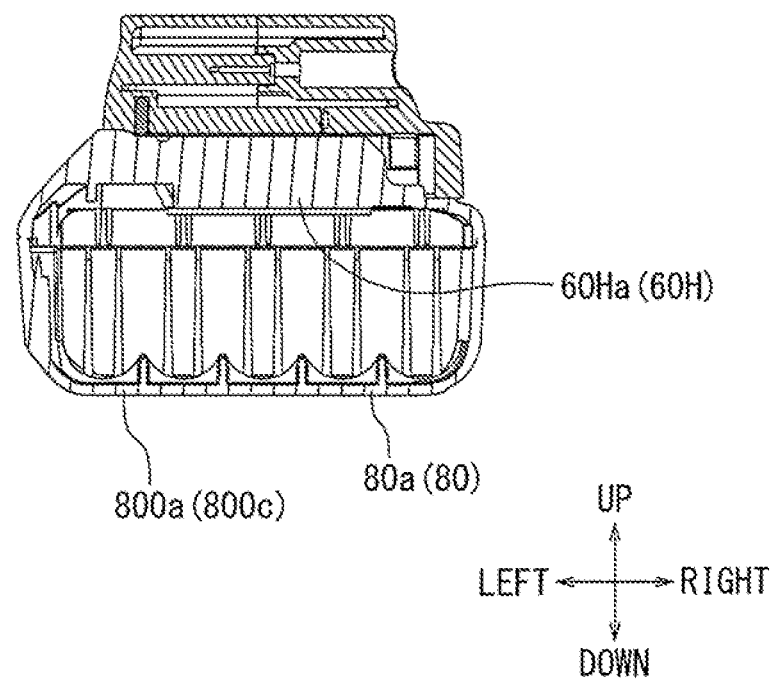

CUTTING TOOL

CROSS-REFERENCE TO RELATED APPLICATIONS

This is a Continuation of application Ser. No. 14/764,668 filed Jul. 30, 2015, which is a National Stage of International Patent Application No. PCT/JP2013/084842 filed Dec. 26, 2013, which claims the benefit of Japanese Patent Application No. 2013-018895 filed Feb. 1, 2013. The disclosure of the prior applications is hereby incorporated by reference herein in its entirety.

TECHNICAL FIELD

The embodiments of the present disclosure relate to a cutting tool that may be configured to reciprocate an elongated cutting blade for cutting a workpiece.

BACKGROUND ART

As a cutting tool for cutting a workpiece such as wood, there has been known a cutting tool called a reciprocating saw (see, for example, Japanese Laid-Open Patent Publication No. 2012-51046). This type of reciprocating saw is configured as a hand-held type cutting tool for performing a cutting operation while being held by hand. In brief, this type of reciprocating saw is provided with a housing, an electric motor housed in the housing, and a reciprocation converting mechanism that converts the rotational drive force of the electric motor to a reciprocating motion.

A cutting blade mounting mechanism is provided at the output shaft of the reciprocation converting mechanism. Mounted to this cutting blade retaining mechanism is an elongated blade (cutting blade) extending in the reciprocating direction. In this cutting tool, the rotational drive force generated by the electric motor is converted to a reciprocating motion by the reciprocation converting mechanism, so that the blade mounted to the cutting blade mounting mechanism at the front end reciprocates. The blade thus reciprocating may cut the workpiece to be cut.

On the other hand, regarding the above-described reciprocating saw, there has been a demand for an increase in the voltage of the electric power supplied from a rechargeable battery, and a demand for an increase in the supply capacitance of the electric power. However, a rechargeable battery set to a high voltage or a rechargeable battery set to a large supply capacitance is expensive and is poor in versatility.

There has been a need in the art to enable the use of a rechargeable battery that is superior in versatility, for meeting the demand for setting the voltage to be higher or for setting the supply capacitance to be lager in using a cutting tool that is configured to reciprocate an elongated cutting blade to cut a workpiece by the cutting blade

SUMMARY

In one aspect according to the present disclosure, a cutting tool may have an output shaft to which a cutting blade is mounted. The output shaft may be reciprocated to cut a workpiece to be cut by the mounted cutting blade. A tool main body may include a front end from which the output shaft protrudes. The tool main body may be provided with an electric motor rotatably driving a motor shaft with a supply of power from a rechargeable battery. A reciprocation converting mechanism may convert the rotation drive of the motor shaft to a reciprocating motion of the output shaft. A housing may form an outer casing of the tool main body and may be provided with two battery attachment portions each allowing attachment of the rechargeable battery. Each of the two battery attachment portions may be configured as a slide attachment type battery attachment portion suited to a slide attachment type rechargeable battery that is attached through sliding.

With this arrangement, the housing forming the outer casing of the tool main body is provided with two battery attachment portions each allowing attachment of the rechargeable battery, so that it is possible to meet the demand for setting a voltage to be higher and for setting a supply capacitance to be larger for use as the cutting tool. Further, with the above arrangement, each of the two battery attachment portions may be configured as a slide attachment type battery attachment portion suited to a slide attachment type rechargeable battery that is attached through sliding. That is, it is possible to use widely used slide attachment type rechargeable batteries. As a result, it is possible to is use rechargeable batteries that are superior in versatility, for meeting the demand for setting the voltage to be higher or for setting the supply capacitance to be lager for use as the cutting tool.

At a rear portion of the tool main body, there may be provided a grip housing including a handle portion to be grasped by hand. Attachment directions of two rechargeable batteries respectively attached to the two battery attachment portions may cross a reciprocating direction of the output shaft, and also may cross a direction in which the grip housing extends. Therefore, the attachment direction of each rechargeable battery may be set to the width direction of the tool main body.

In general, the tool main body may have a shape of extending in the reciprocating direction of the output shaft, and therefore, when the rechargeable batteries are attached in the width direction of the tool main body, the rechargeable batteries are arranged in parallel side by side in the direction in which the tool main body extends. As a result, while it is possible to arrange the two rechargeable batteries in parallel side by side, it is possible to suppress bulkiness in the width direction of the tool main body, making it possible to easily perform a cutting operation in a narrow space to maintain the maneuverability of the tool. Further, because the attachment direction of each rechargeable battery crosses the vibrating direction of the tool main body, it is possible to enhance the effect of preventing detachment of the rechargeable batteries after attachment.

The attachment directions of the two rechargeable batteries may be the same with each other. With this arrangement, it is possible to attach or detach the two batteries at once in one direction, and therefore, the attachment or detachment operation can be easily performed with convenience.

The two battery attachment portions may be arranged so as to be astride a center line extending in a front-rear direction of the tool main body. The right-left direction (width direction) of this tool main body may be set as a direction crossing the front-rear direction of the tool main body.

With this arrangement, the weight of the rechargeable batteries attached to the battery attachment portions can be easily well-balanced in the right-left direction of the tool main body, making it possible to maintain the maneuverability of the tool.

Positions of the two battery attachment portions may be set such that a synthetic center of gravity of two rechargeable batteries attached to the two battery attachment portions is positioned on the center line extending in the front-rear direction of the tool main body.

With this arrangement, even in the state in which the two rechargeable batteries have been attached, the cutting tool can be well-balanced in the right-left direction.

Positions of the two battery attachment portions may be set such that directions in which two rechargeable batteries are attached to the two battery attachment portions are at an angle so as to cross downwards from above a reciprocating direction of the output shaft.

With this arrangement, it is possible to inhibit the attached rechargeable batteries from being detached from the battery attachment portions when the operation is performed with the cutting tool being oriented horizontally or upwards. That is, in any of the orientations taken for the operation, no gravitational force may act on the rechargeable batteries attached to the battery attachment portions, making it possible to prevent detachment of the rechargeable batteries from the battery attachment portions.

Positions of the two battery attachment portions may be set such that lower surfaces of two rechargeable batteries attached to the two battery attachment portions are within a same plane.

With this arrangement, the lower surfaces of the two rechargeable batteries may be flush with each other so as to define common lower surfaces, and therefore, it is possible to place the cutting tool such that the common lower surfaces face the placing surface.

In another aspect according to the present disclosure, a cutting tool may have an output shaft to which a cutting blade is mounted. The output shaft may be reciprocated to cut a workpiece by the mounted cutting blade. A tool main body may include a front end from which the output shaft protrudes. The tool main body may be provided with an electric motor rotatably driving a motor shaft with a supply of power from a rechargeable battery. A reciprocation converting mechanism may convert the rotation of the motor shaft to a reciprocating motion of the output shaft. A housing may form an outer casing of the tool main body and may be provided with two battery attachment portions each allowing attachment of the rechargeable battery. At least one battery attachment portion of the two battery attachment portions may be arranged at a motor housing that supports the electric motor.

With this cutting tool, the at least one battery attachment portion is arranged at the motor housing supporting the electric motor. Therefore, it is possible to apply cooling air for cooling the electric motor to the rechargeable battery attached to the battery attachment portion. As a result, it is possible to cool the rechargeable battery during the use.

In a further aspect according to the present disclosure, a cutting tool may have an output shaft to which a cutting blade is mounted. The output shaft may be reciprocated to cut a workpiece by the mounted cutting blade. A tool main body may include a front end from which the output shaft protrudes. The tool main body may be provided with an electric motor rotatably driving a motor shaft with a supply of power from a rechargeable battery. A reciprocation converting mechanism may convert the rotation of the motor shaft to a reciprocating motion of the output shaft. A housing may form an outer casing of the tool main body and may be provided with at least one battery attachment portion allowing attachment of the rechargeable battery. An arrangement position of the at least one battery attachment portion may be set to a position opposite to a position of a center of gravity of the tool main body with the rechargeable battery detached therefrom, with respect to a reciprocation axis along which the output shaft reciprocates.

With this cutting tool, the position of the center of gravity of the entire cutting tool with the rechargeable battery attached to the at least one battery attachment portion can be set close to the reciprocation axis along which the output shaft reciprocates. Hence, the position of the center of gravity of the entire cutting tool with the rechargeable battery attached thereto can be set close to the reciprocation axis along which the output shaft reciprocates as a result of conversion by the reciprocation converting mechanism reciprocates. Therefore, it is possible to suppress the fluttering of the reciprocating output shaft generated when cutting the workpiece to be cut. Therefore, the cutting tool may be improved in terms of feeling of use and easy to handle.

In a still further aspect according to the present disclosure, a cutting tool may have an output shaft to which a cutting blade is mounted. The output shaft may be reciprocated to cut a workpiece by the mounted cutting blade. A tool main body may include a front end from which the output shaft protrudes. The tool main body may be provided with an electric motor rotatably driving a motor shaft with a supply of power from a rechargeable battery. A reciprocation converting mechanism may convert the rotation of the motor shaft to a reciprocating motion of the output shaft. A grip housing may include a handle portion to be grasped by hand and may be arranged at a rear portion of the tool main body. The grip housing may be provided with at least one battery attachment portion allowing attachment of the rechargeable battery. An elastic member may be arranged at at least a part between a front side portion of the grip housing and a rear side portion of the motor housing to which the front side portion of the grip housing is connected.

With this cutting tool, the grip housing may provided with at least one battery attachment portion allowing attachment of the rechargeable battery, and therefore, it is possible to attach the rechargeable battery to the at least one battery attachment portion. With the arrangement, it is possible to increase the weight of the grip housing having the handle portion, so that the vibrations generated through the reciprocation of the output shaft may be inhibited from being transmitted to the handle portion. Therefore, the cutting tool can be reduced in vibrations and can be improved in terms of feeling of use for the user.

Further, by the arrangement of the elastic member at at least a part between the front side portion of the grip housing and the rear side portion of the motor housing, the vibrations generated through the reciprocation of the output shaft may be transmitted to the handle portion via the elastic member, making it possible to buffer the vibrations transmitted to the handle portion. Therefore, the cutting tool can be reduced in vibrations and can be improved in terms of feeling of use for the user.

BRIEF DESCRIPTION OF THE DRAWINGS

FIG. 20 is a view of the reciprocating saw of FIG. 17 as seen from the rear side.

FIG. 51 is a sectional view taken along arrow line (LI)-(LI) in FIG. 46.

DETAILED DESCRIPTION

First Embodiment

Figure 1:
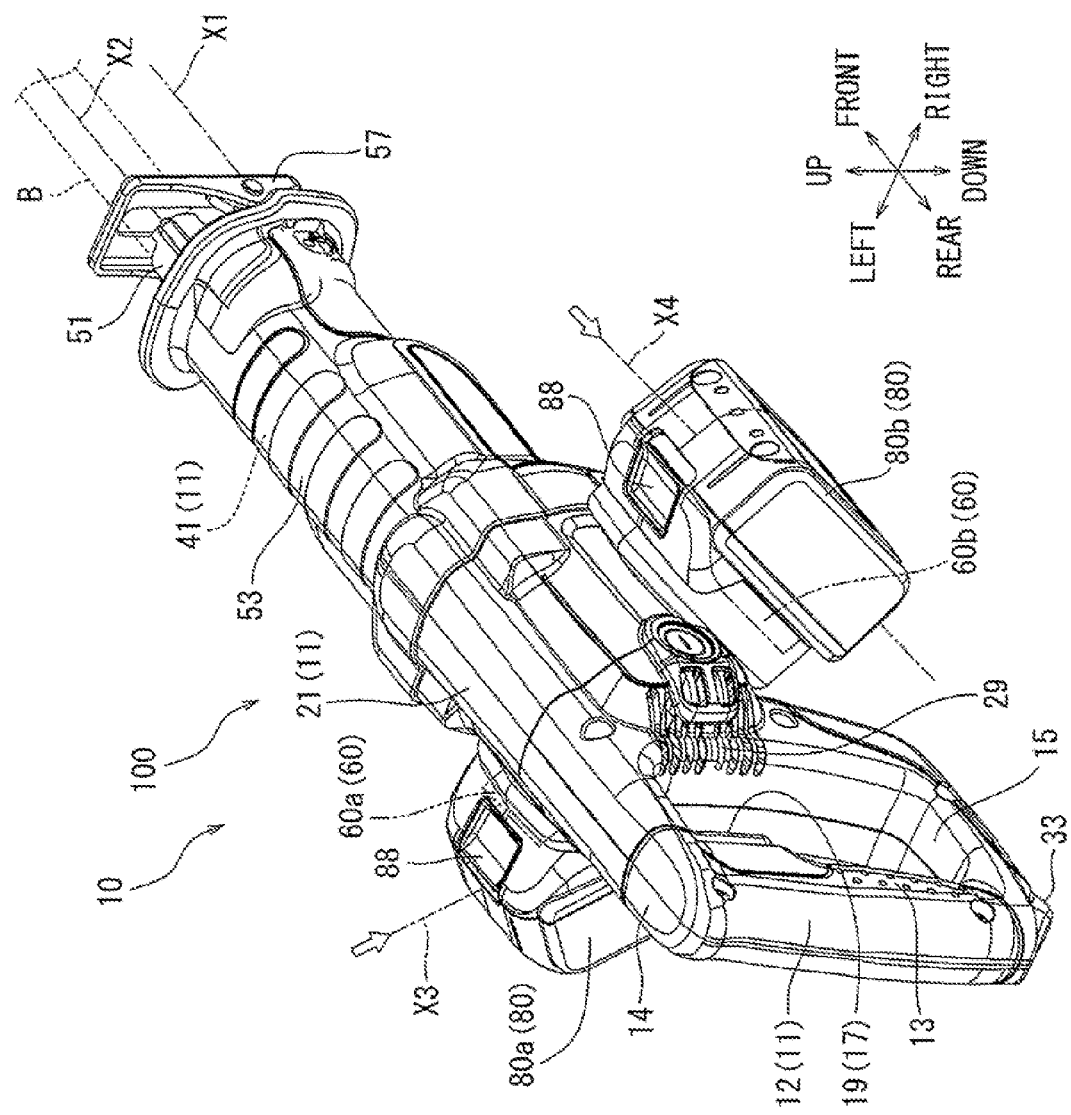
FIG. 1 is a substantially overall perspective view illustrating the external appearance of a reciprocating saw according to a first embodiment, as seen obliquely from the rear side.
Figure 2:
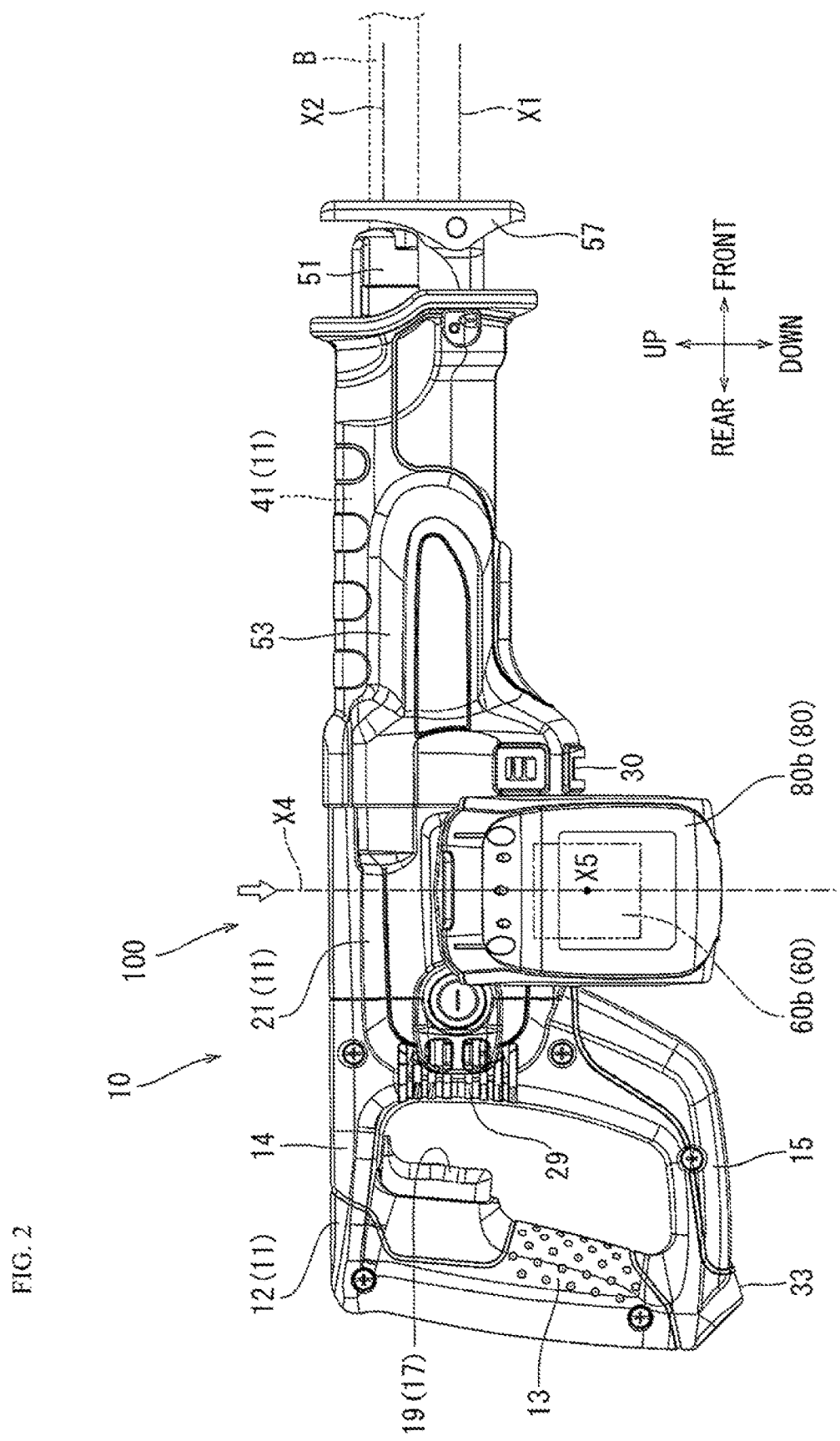
FIG. 2 is a side view of the reciprocating saw shown in FIG. 1.
Figure 3:
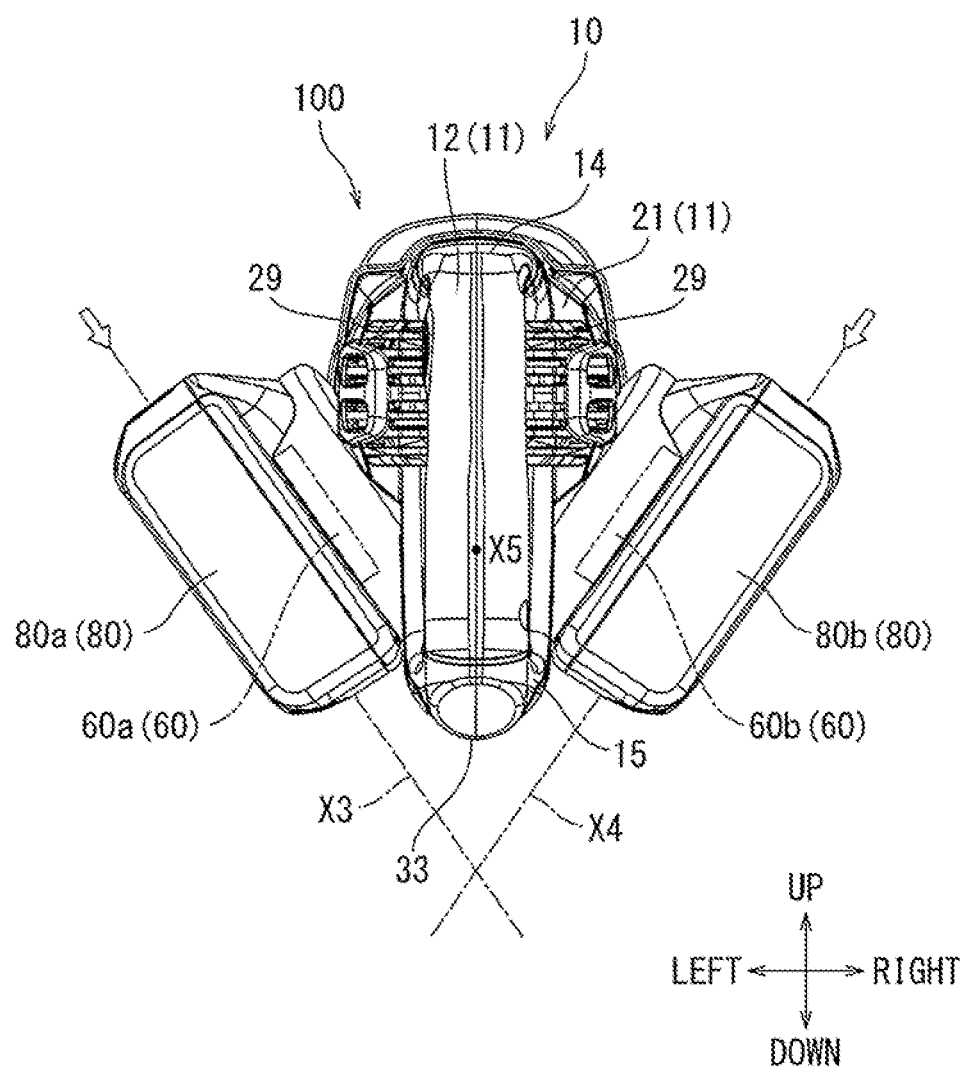
FIG. 3 is a view of the reciprocating saw of FIG. 1 as seen from the rear side.
Figure 4:
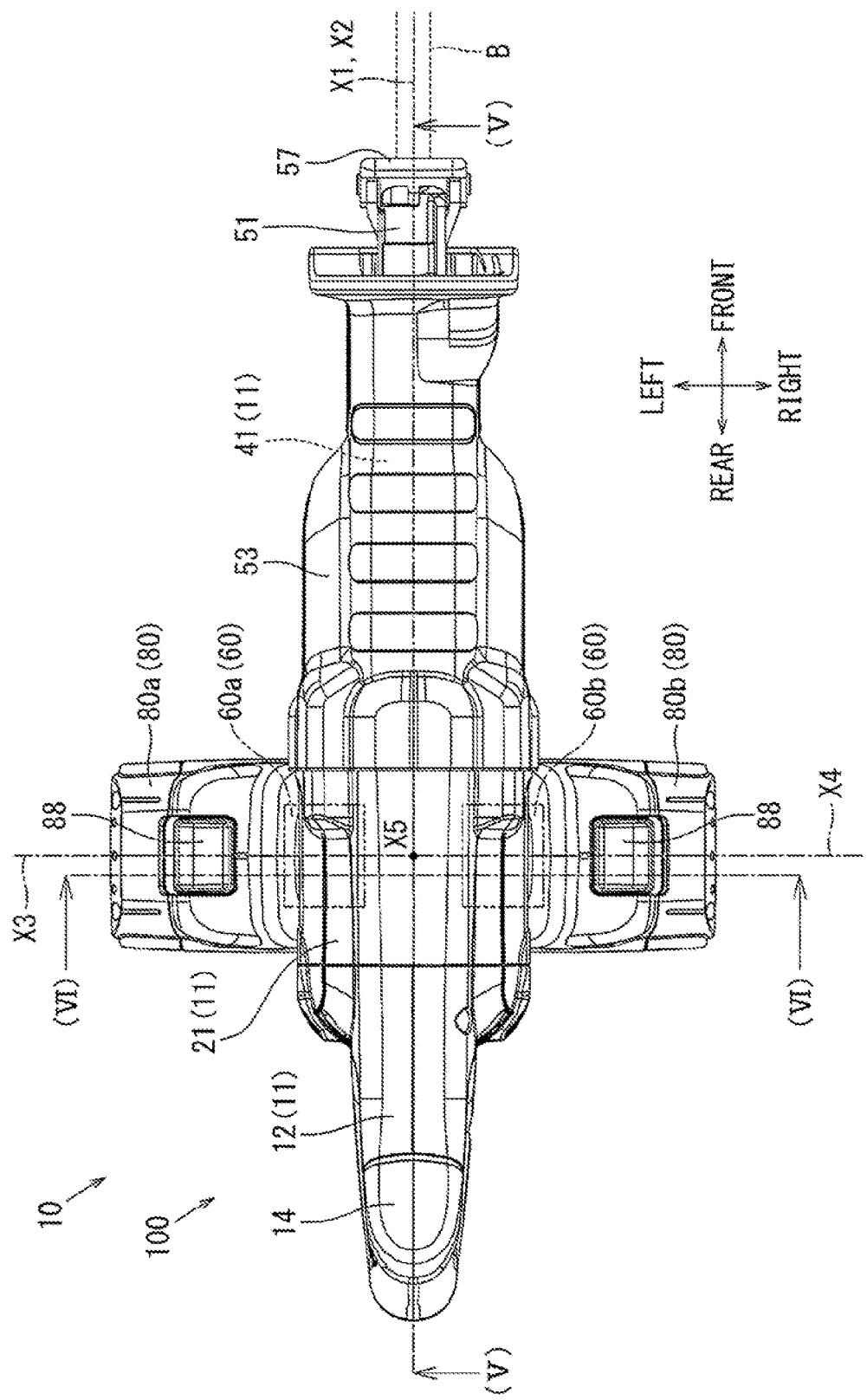
FIG. 4 is a plan view of the reciprocating saw of FIG. 1 as seen from the upper side.
Figure 5:
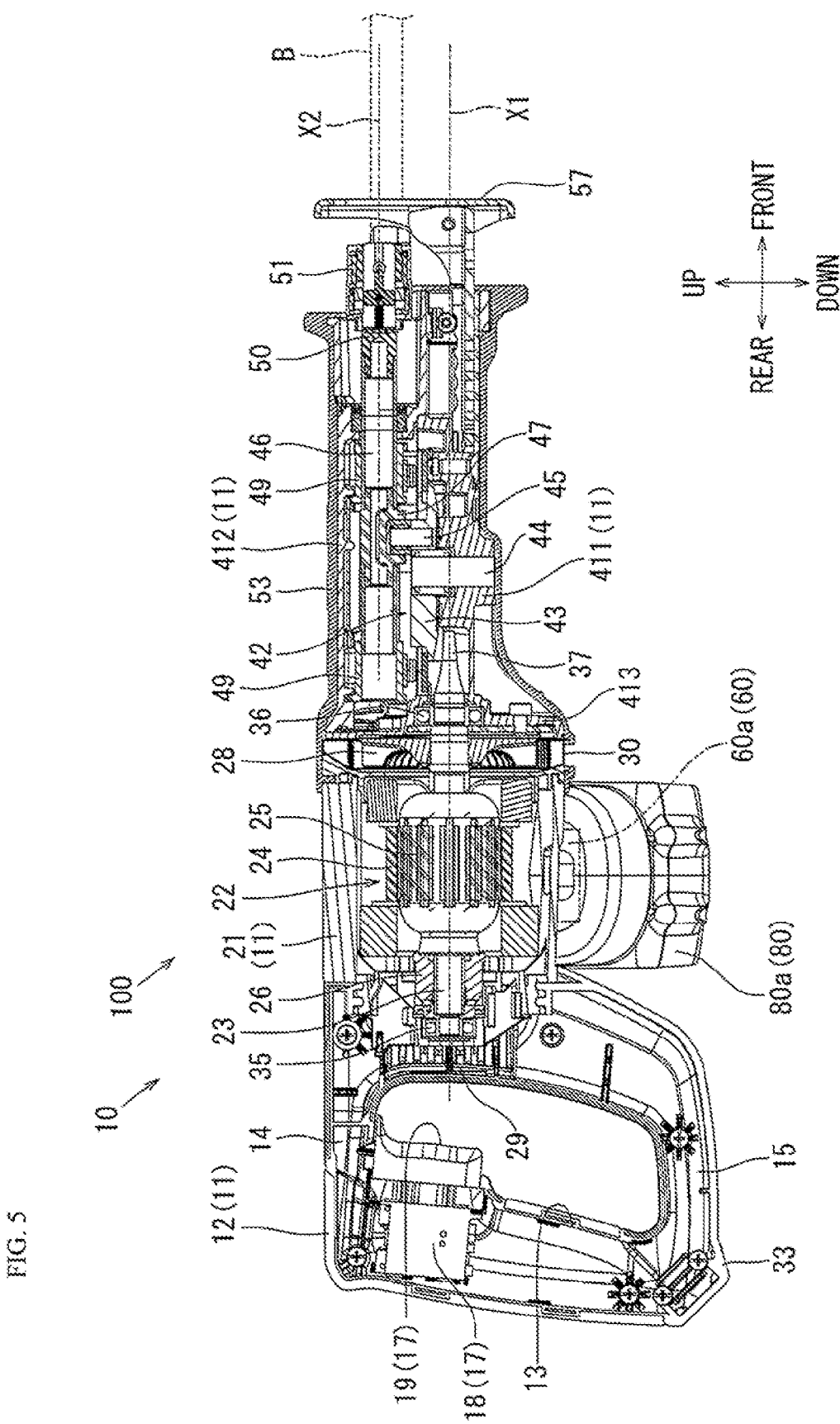
FIG. 5 is a sectional view taken along the arrow line (V)-(V) of FIG. 4.
Figure 6:
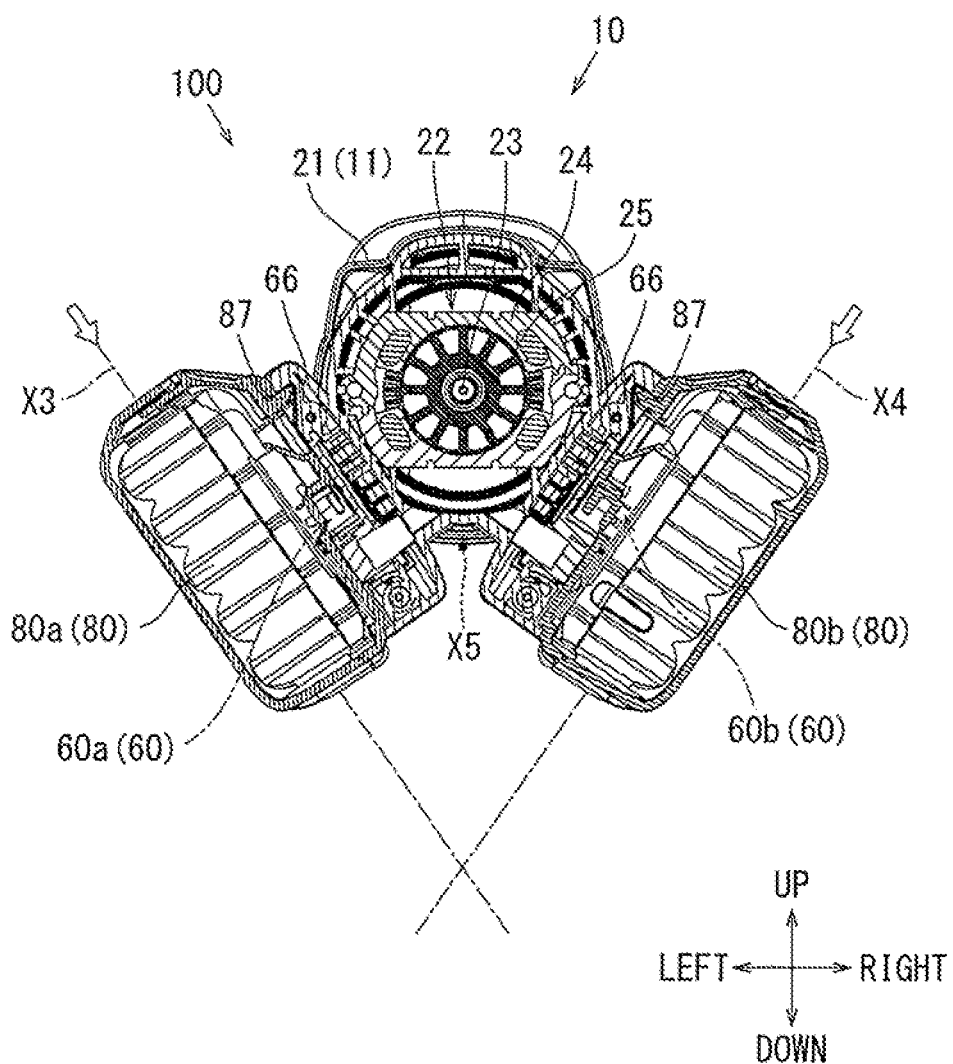
FIG. 6 is a sectional view taken along the arrow line (VI)-(VI) of FIG. 4.
Figure 7:
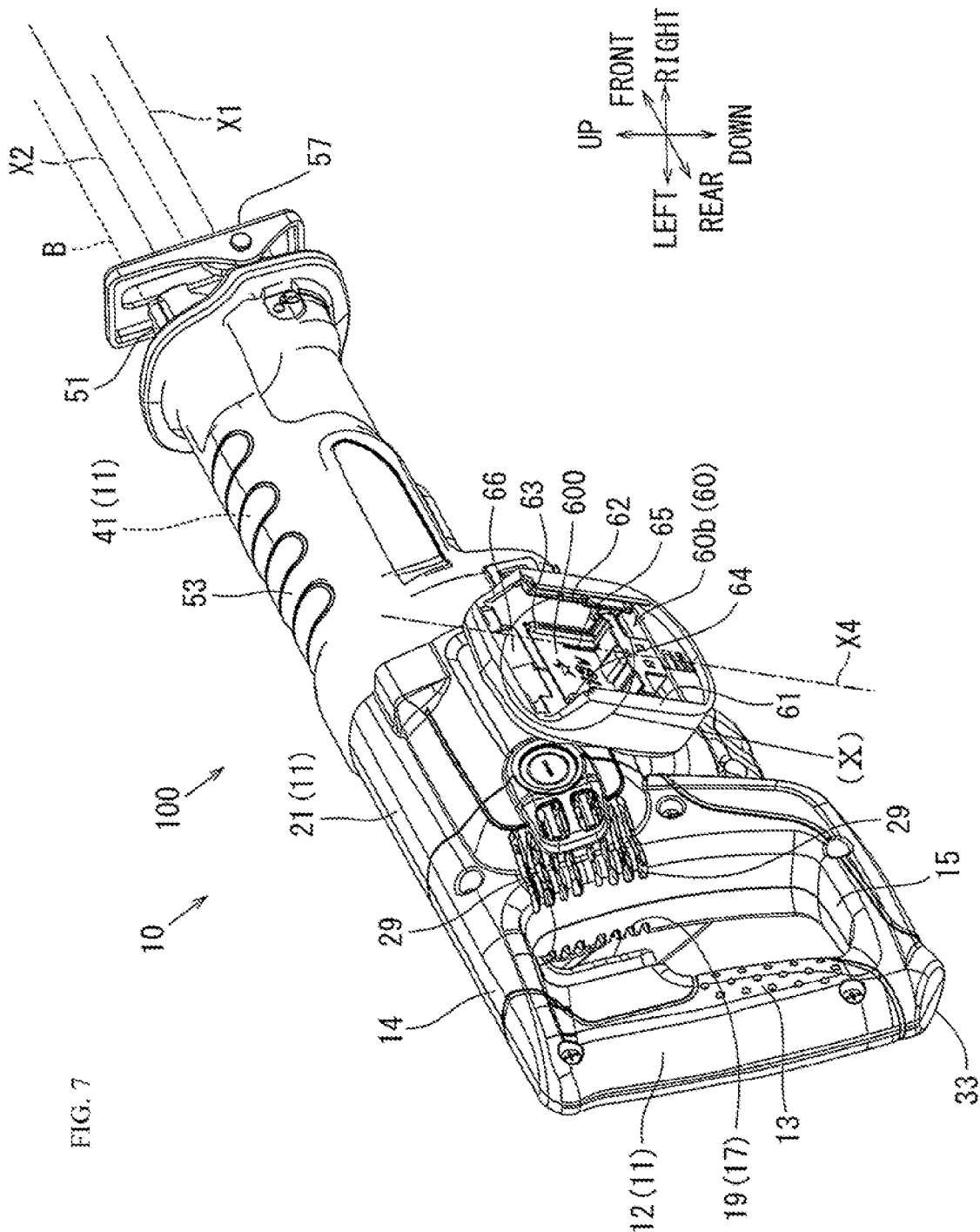
FIG. 7 is a perspective view illustrating the external appearance of the reciprocating saw with rechargeable batteries removed therefrom.
Figure 8:
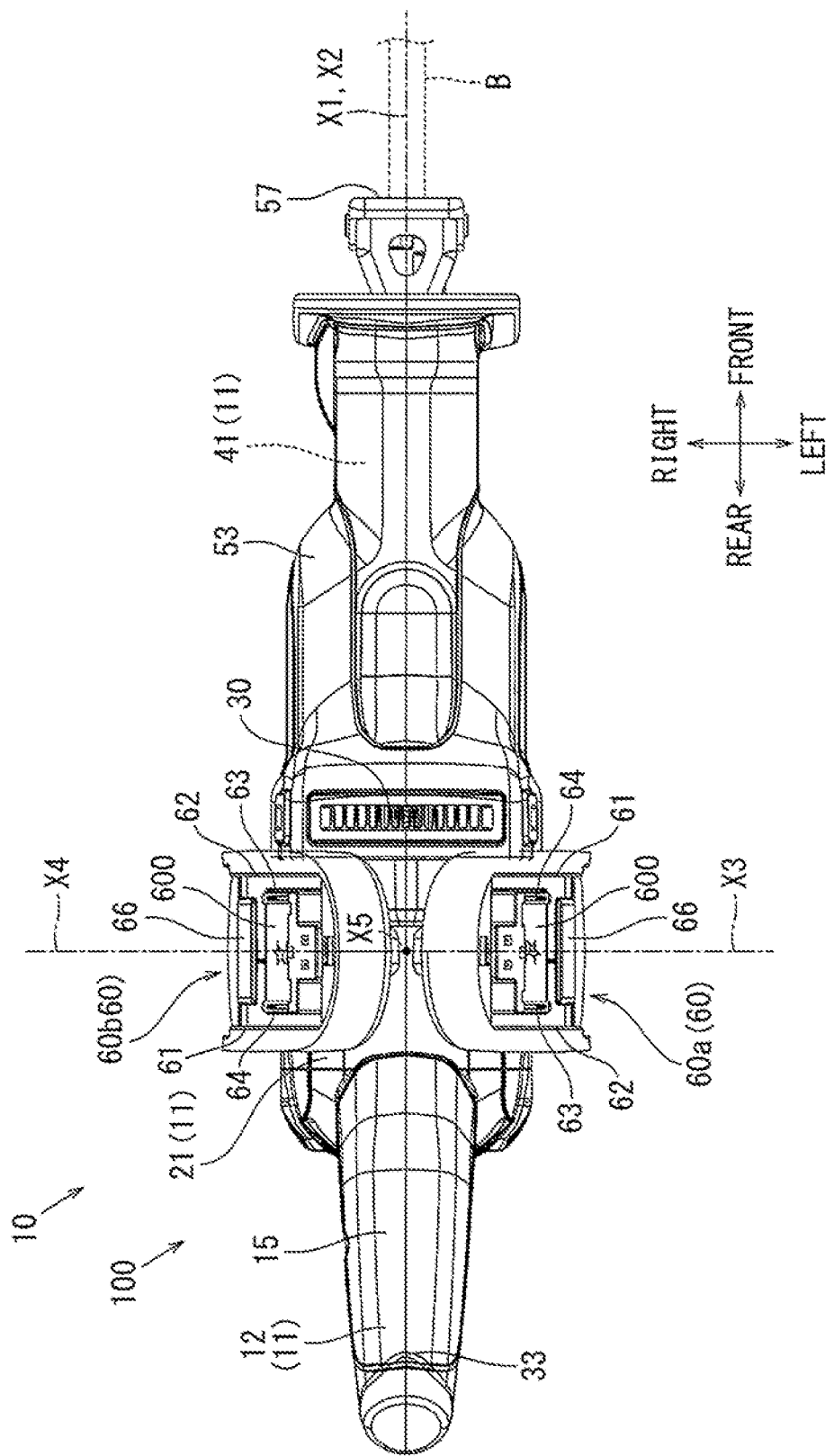
FIG. 8 is a view of the reciprocating saw of FIG. 7 as seen from the lower side.
Figure 9:
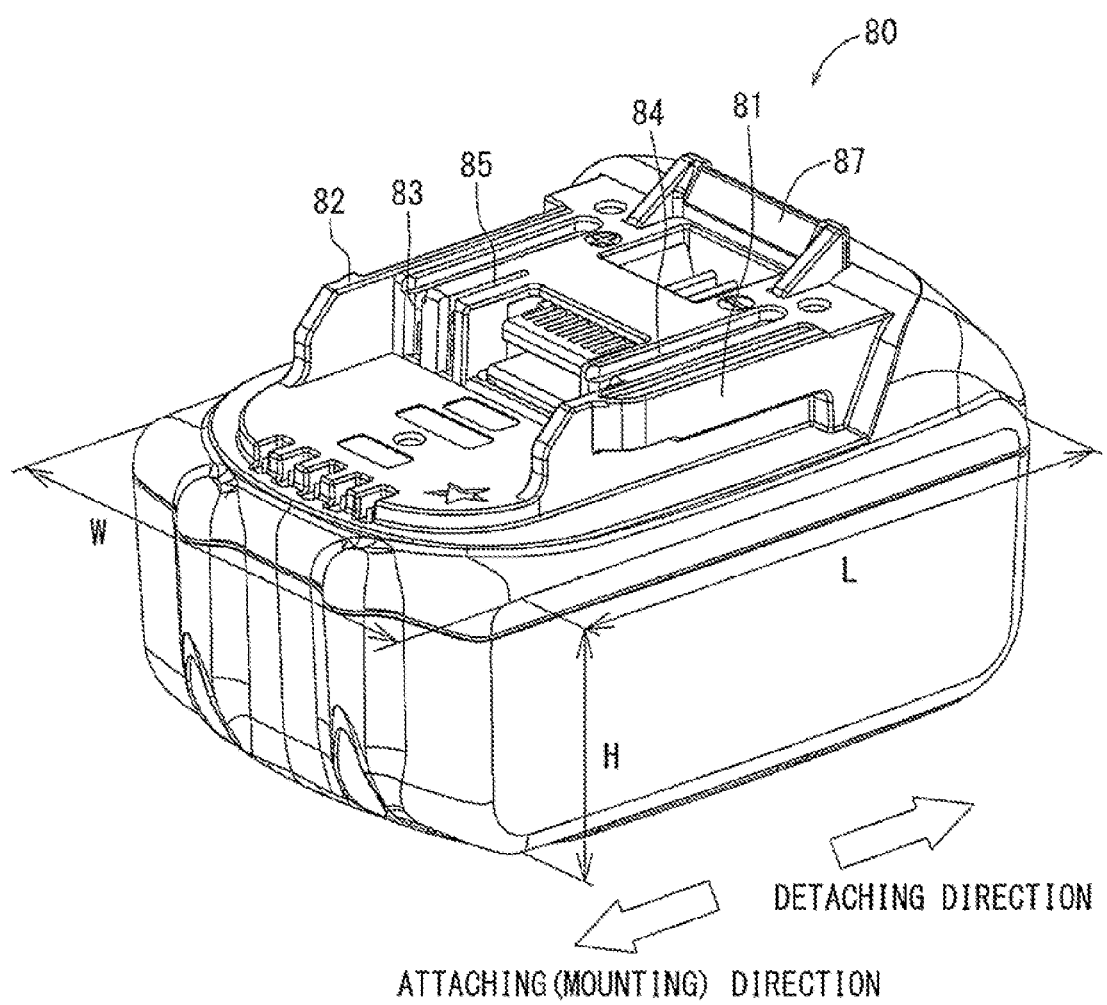
FIG. 9 is a perspective view of a rechargeable battery that is attached to a battery attachment portion through sliding.
Figure 10:
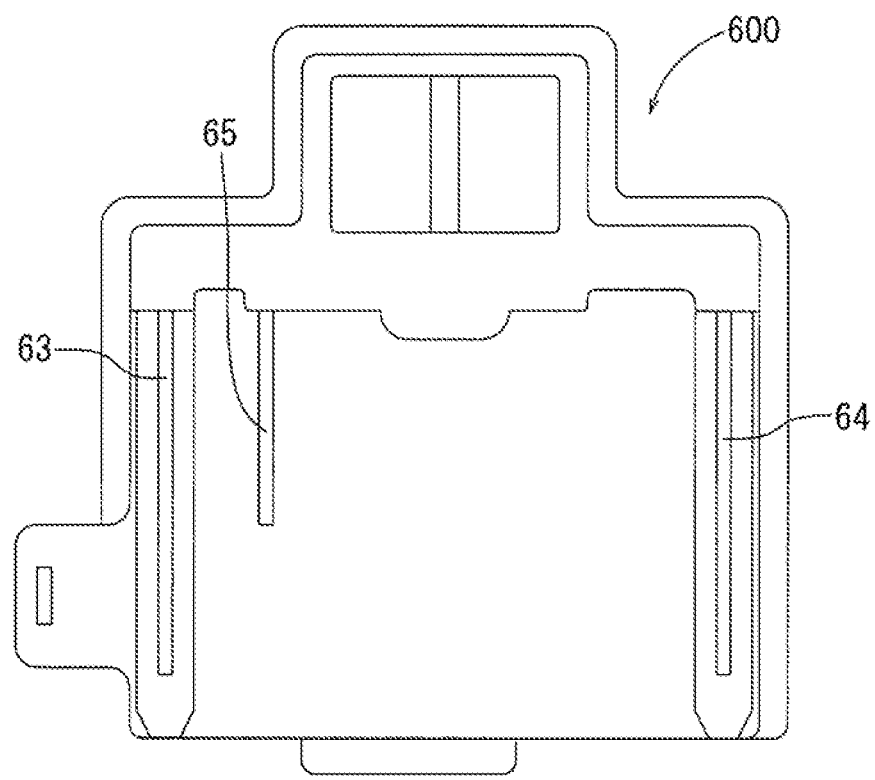
FIG. 10 is an enlarged plan view of a battery terminal connection portion.
Figure 11:
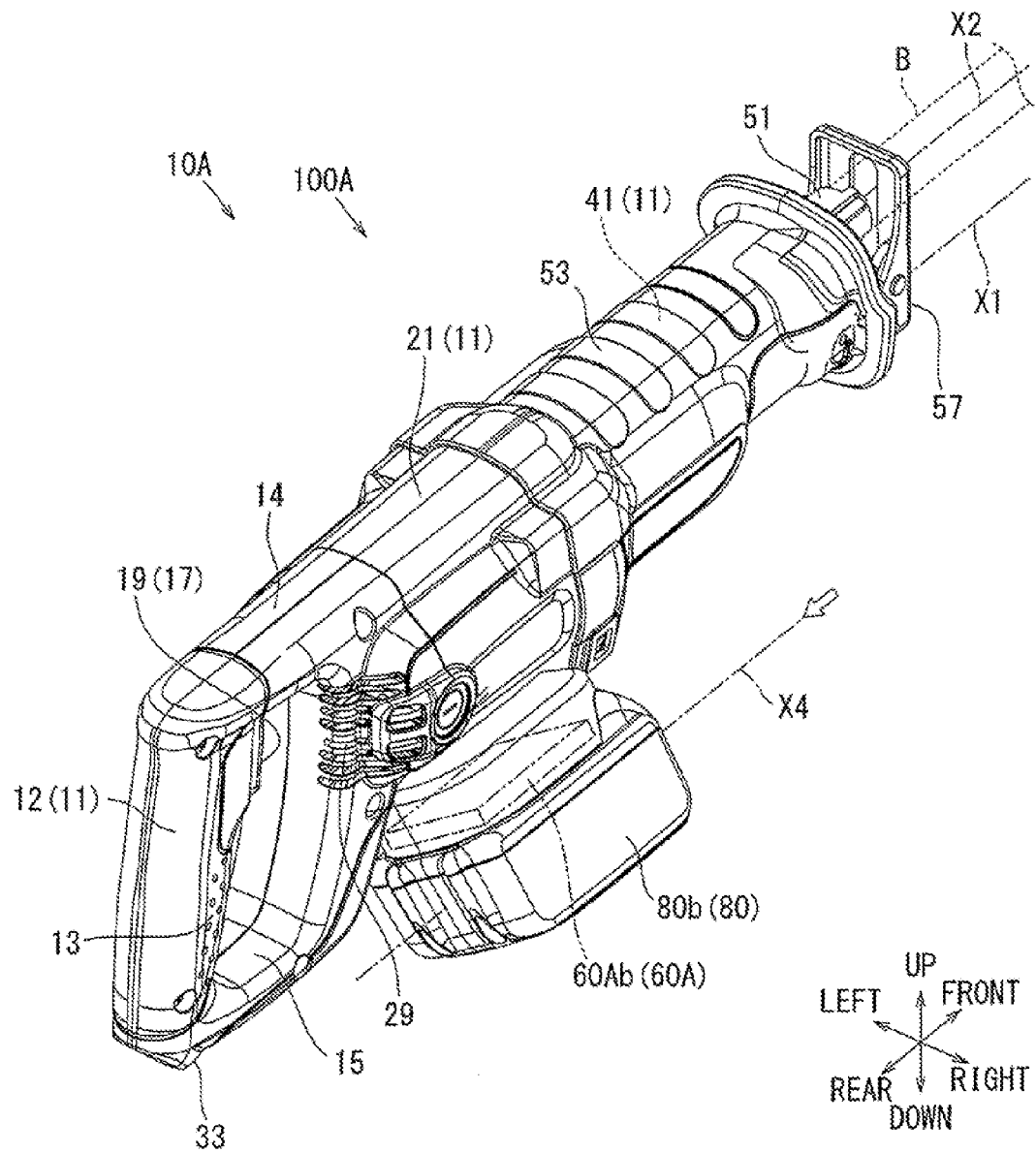
FIG. 11 is a perspective view illustrating the external appearance, as seen obliquely from the rear side, of a reciprocating saw according to a second embodiment.
Figure 12:
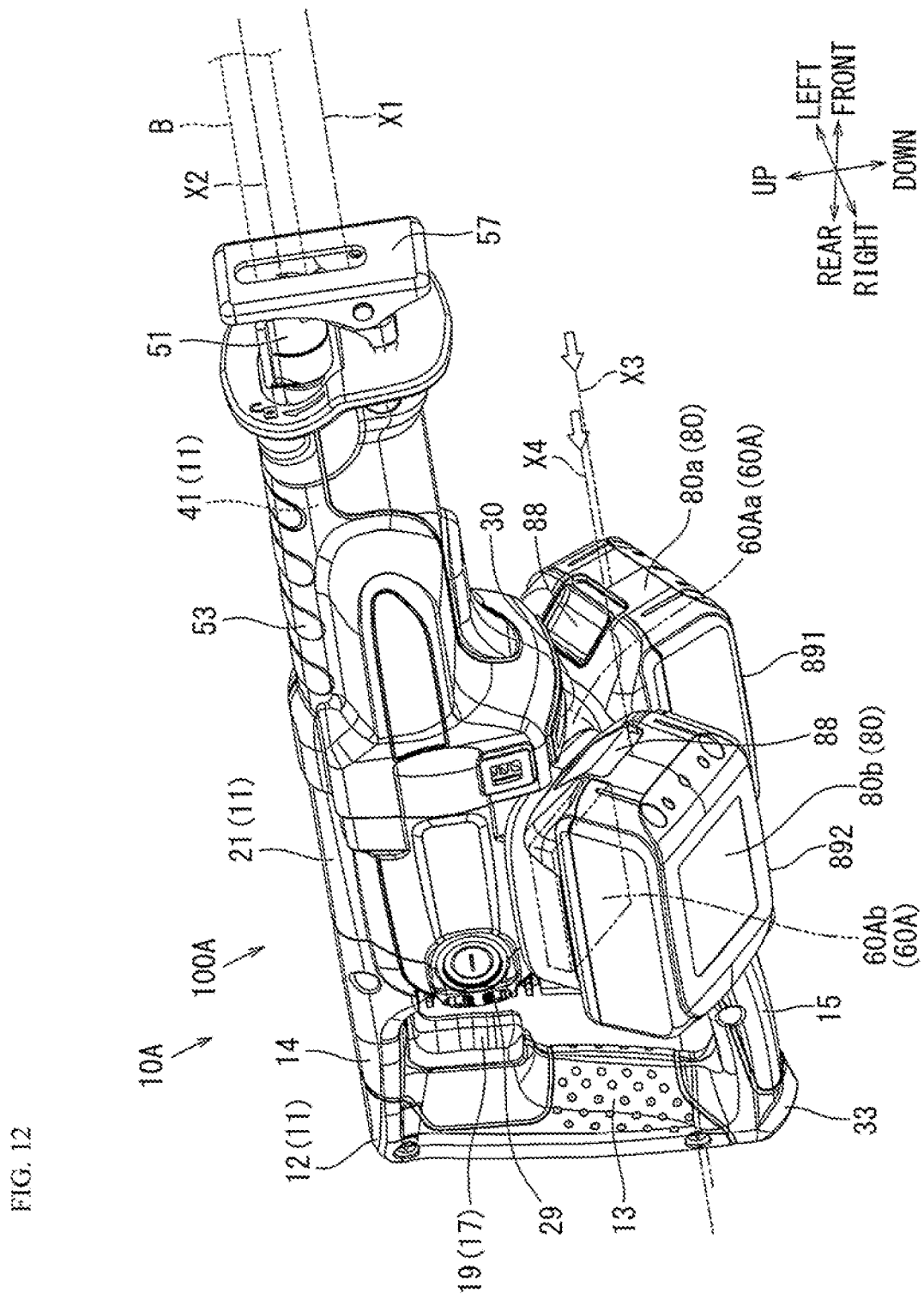
FIG. 12 is a perspective view illustrating another external appearance of the reciprocating saw shown in FIG. 11.
Figure 13:
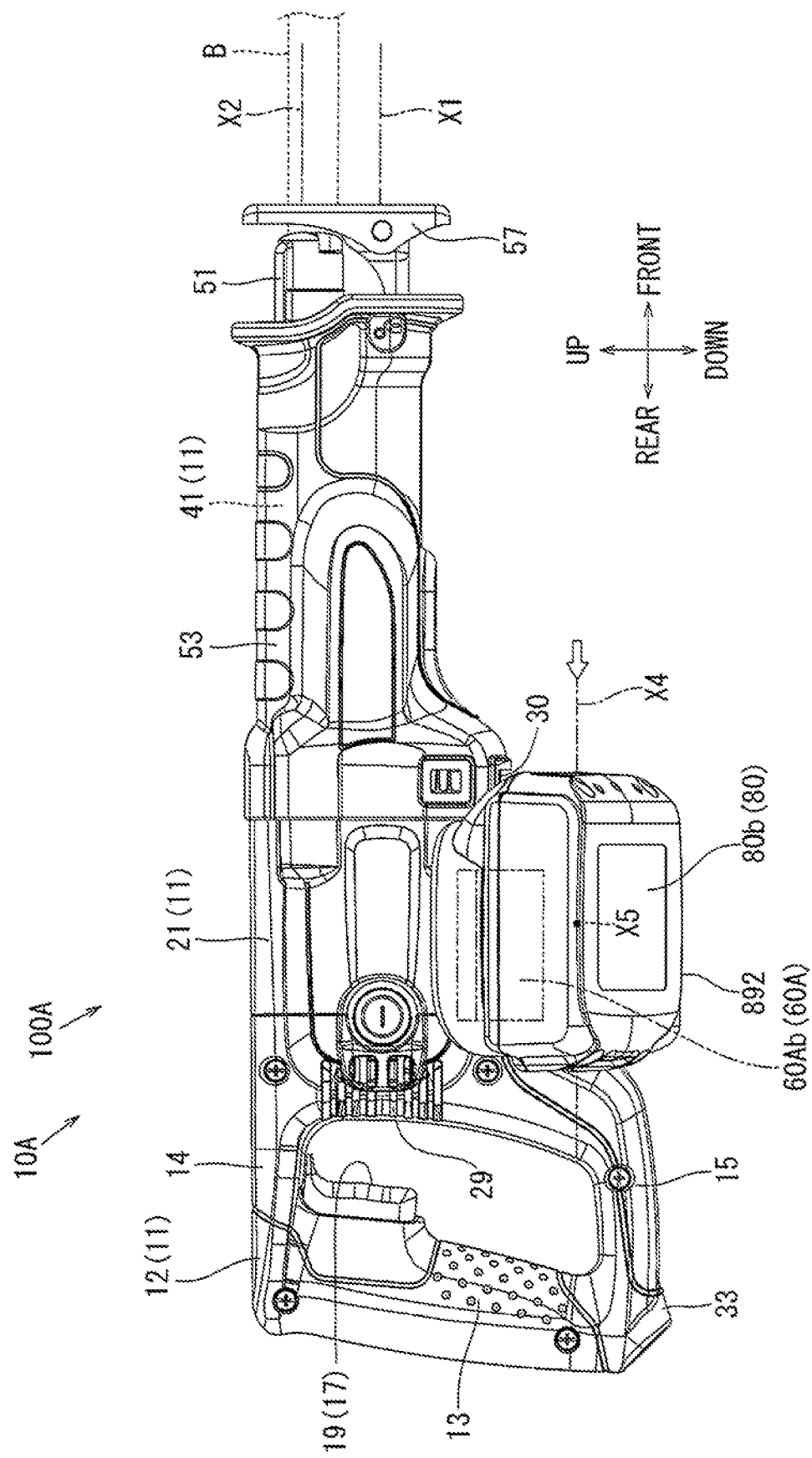
FIG. 13 is a side view of the reciprocating saw shown in FIG. 11.
Figure 14:
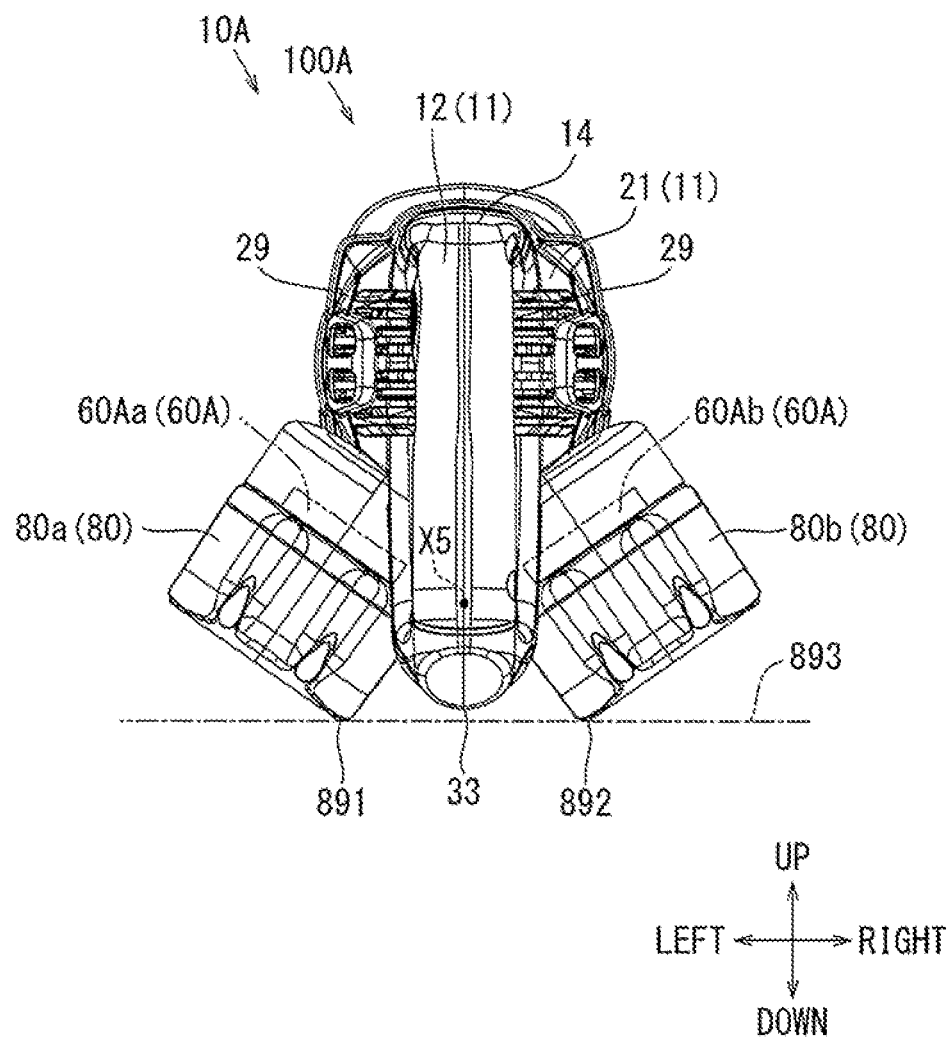
FIG. 14 is a view of the reciprocating saw of FIG. 11 as seen from the rear side.
Figure 15:
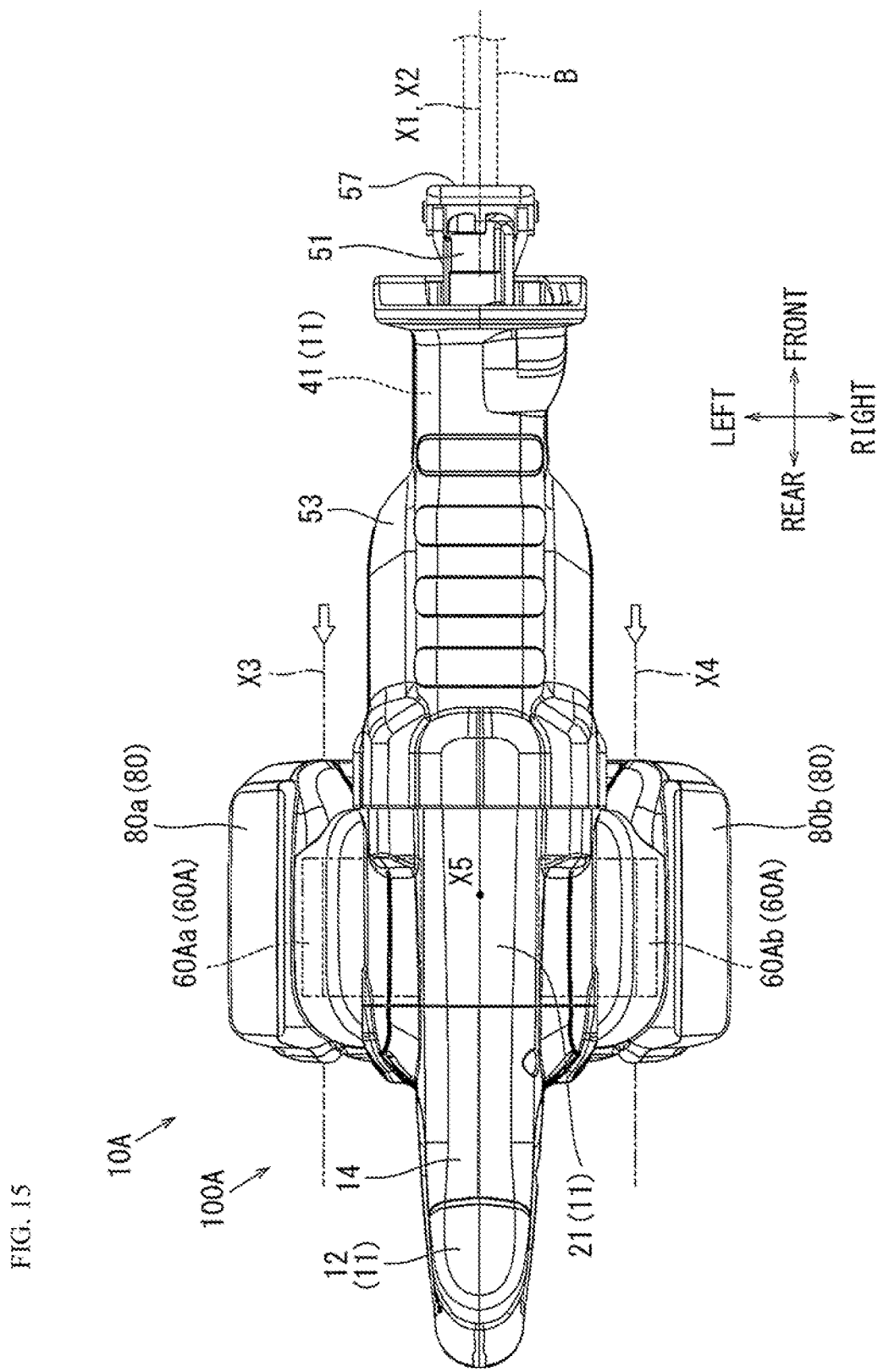
FIG. 15 is a plan view of the reciprocating saw of FIG. 11 as seen from the upper side.
Figure 16:
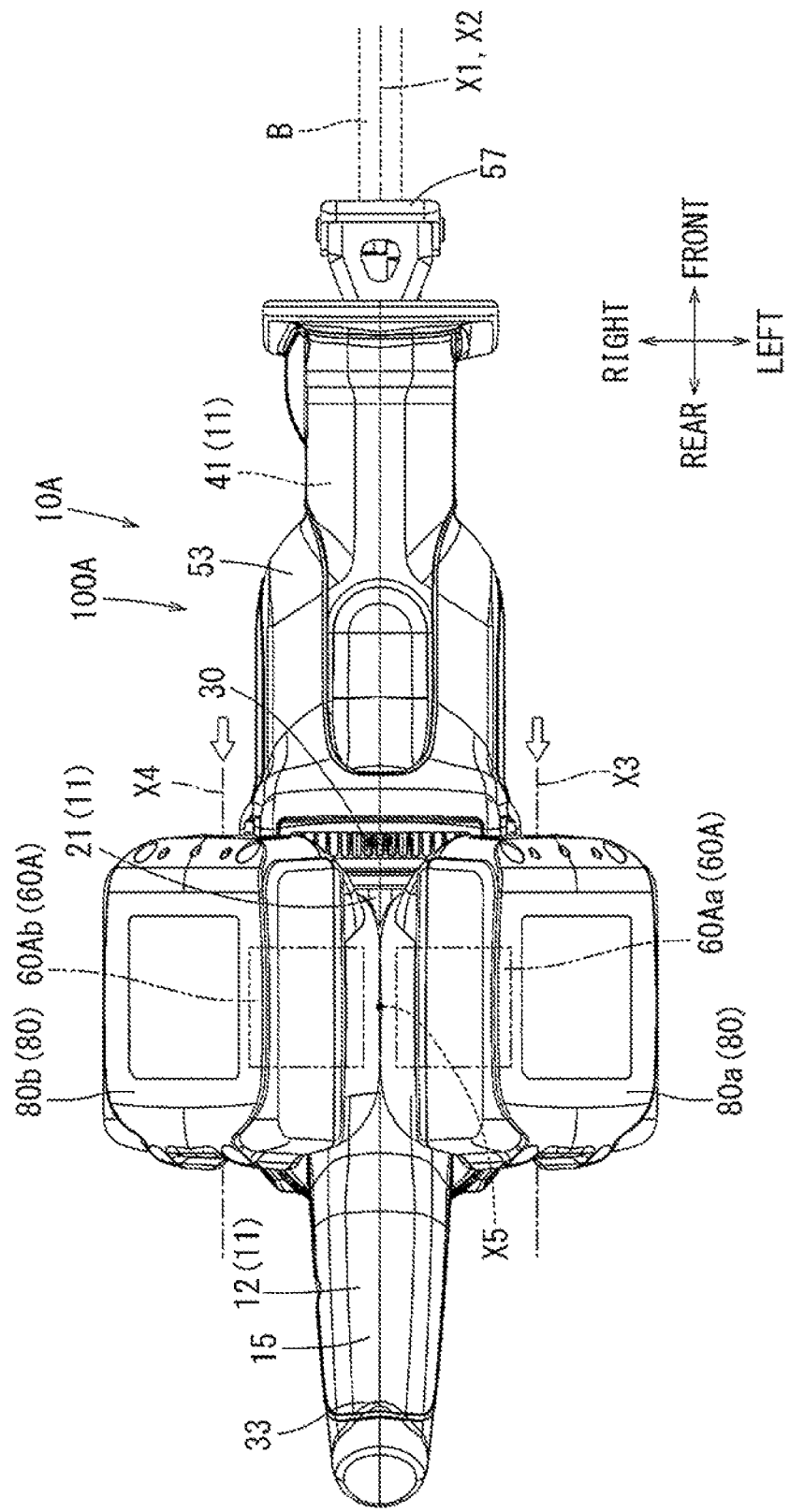
FIG. 16 is a view of the reciprocating saw of FIG. 11 as seen from the lower side.
Figure 17:
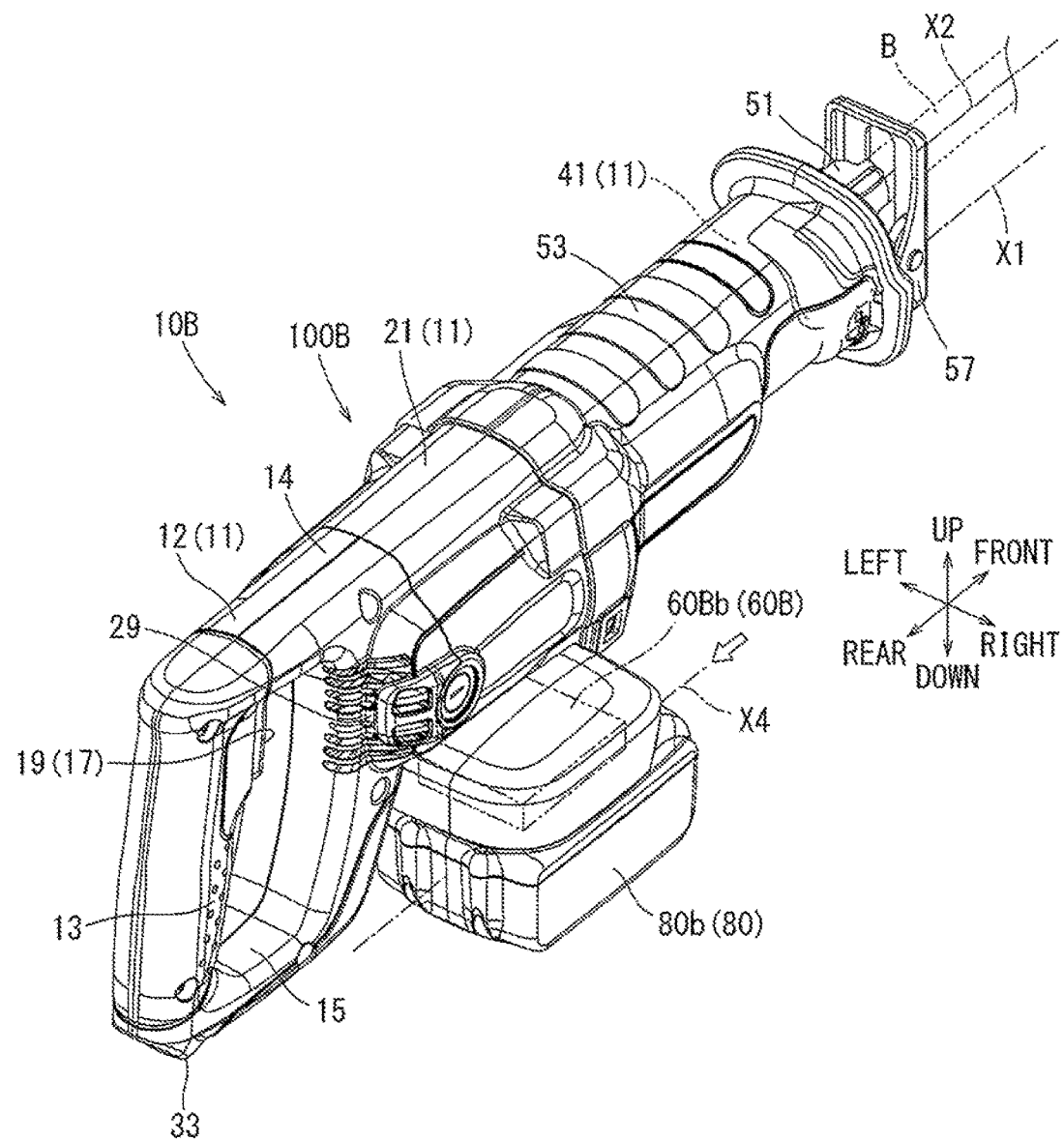
FIG. 17 is a perspective view illustrating the external appearance, as seen obliquely from the rear side, of a reciprocating saw according to a third embodiment.
Figure 18:
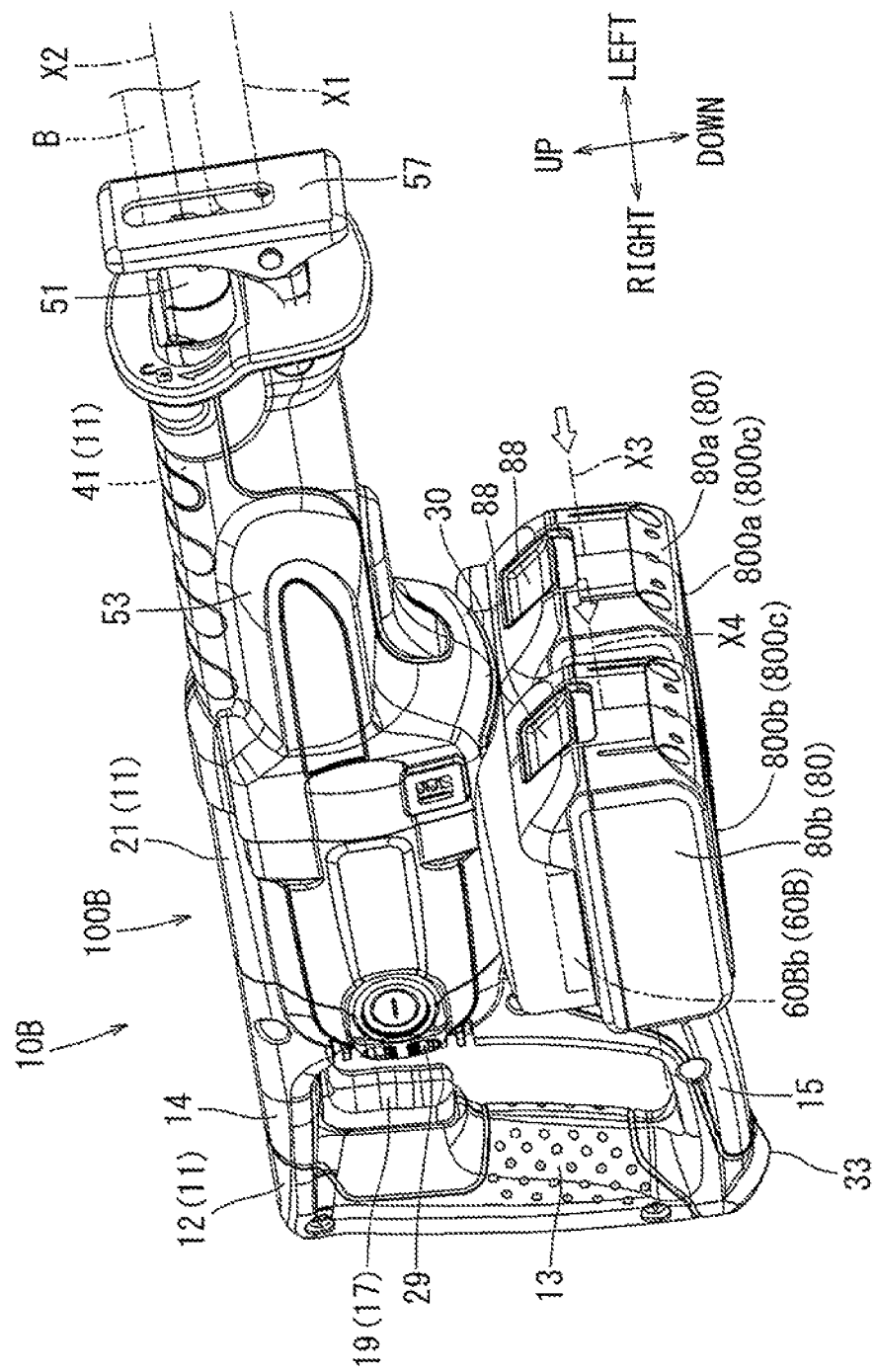
FIG. 18 is an external perspective view illustrating another external appearance of the reciprocating saw shown in FIG. 17.
Figure 19:
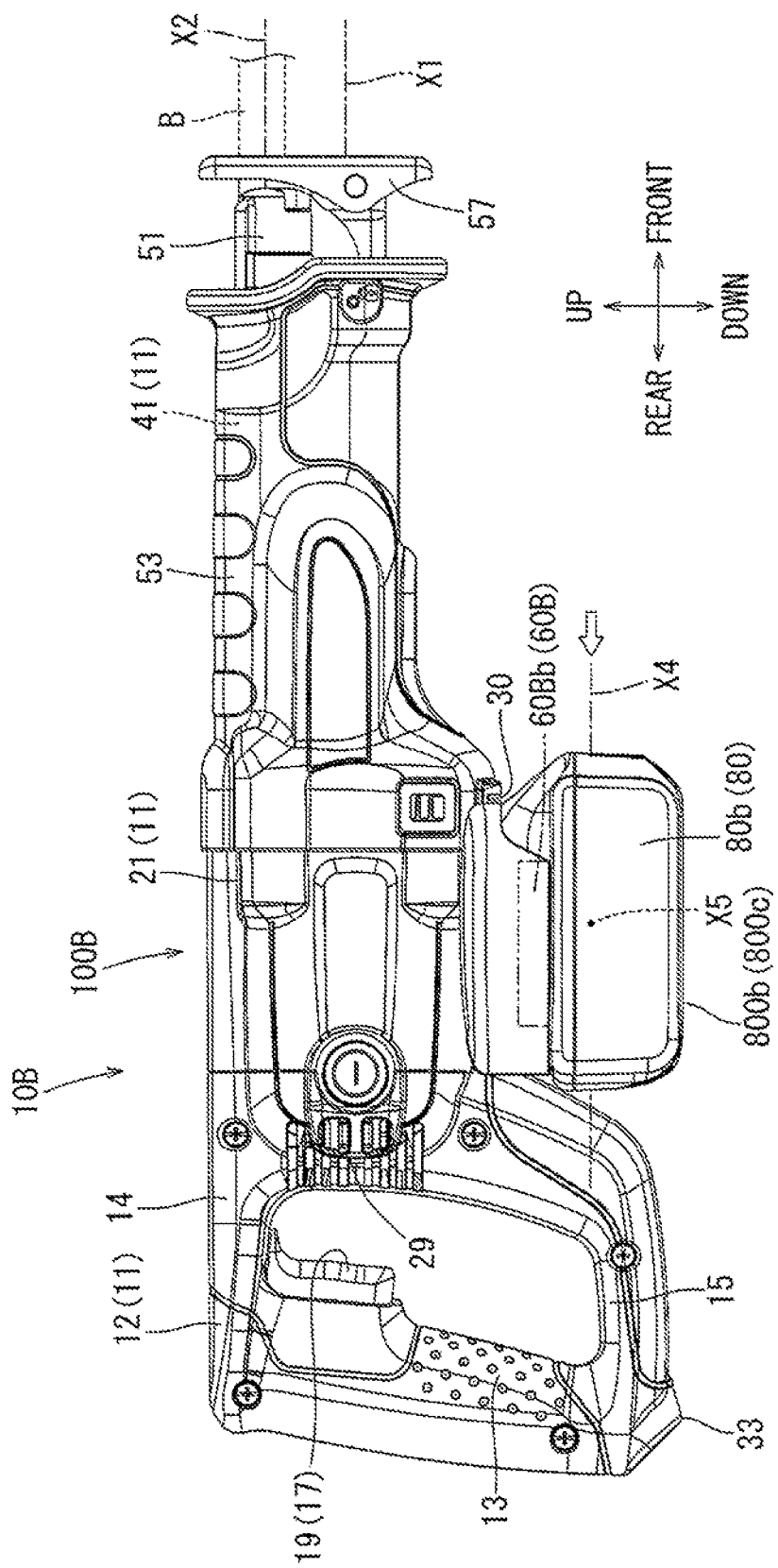
FIG. 19 is a side view of the reciprocating saw shown in FIG. 17.
Figure 21:
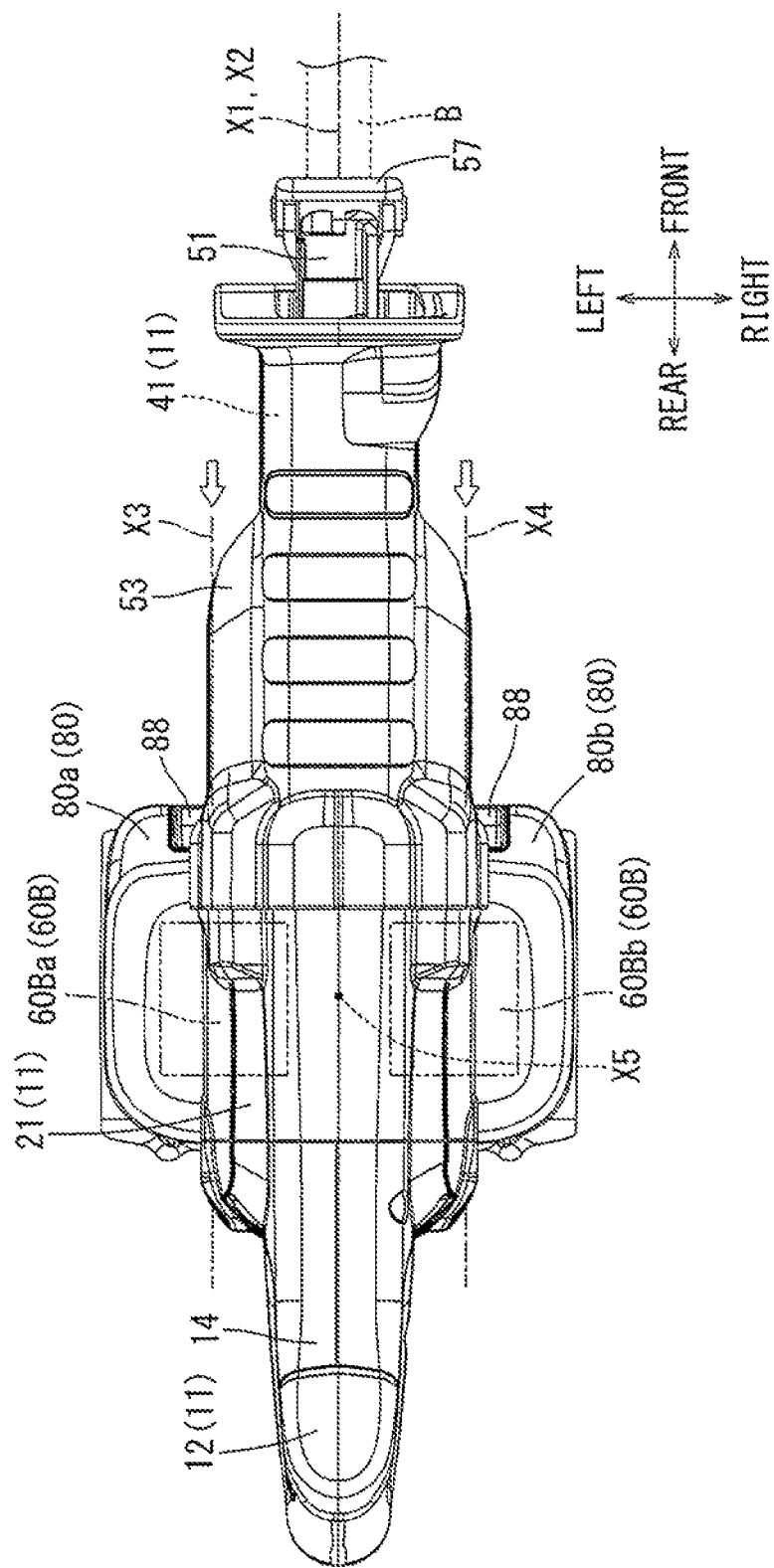
FIG. 21 is a plan view of the reciprocating saw of FIG. 17 as seen from the upper side.
Figure 22:
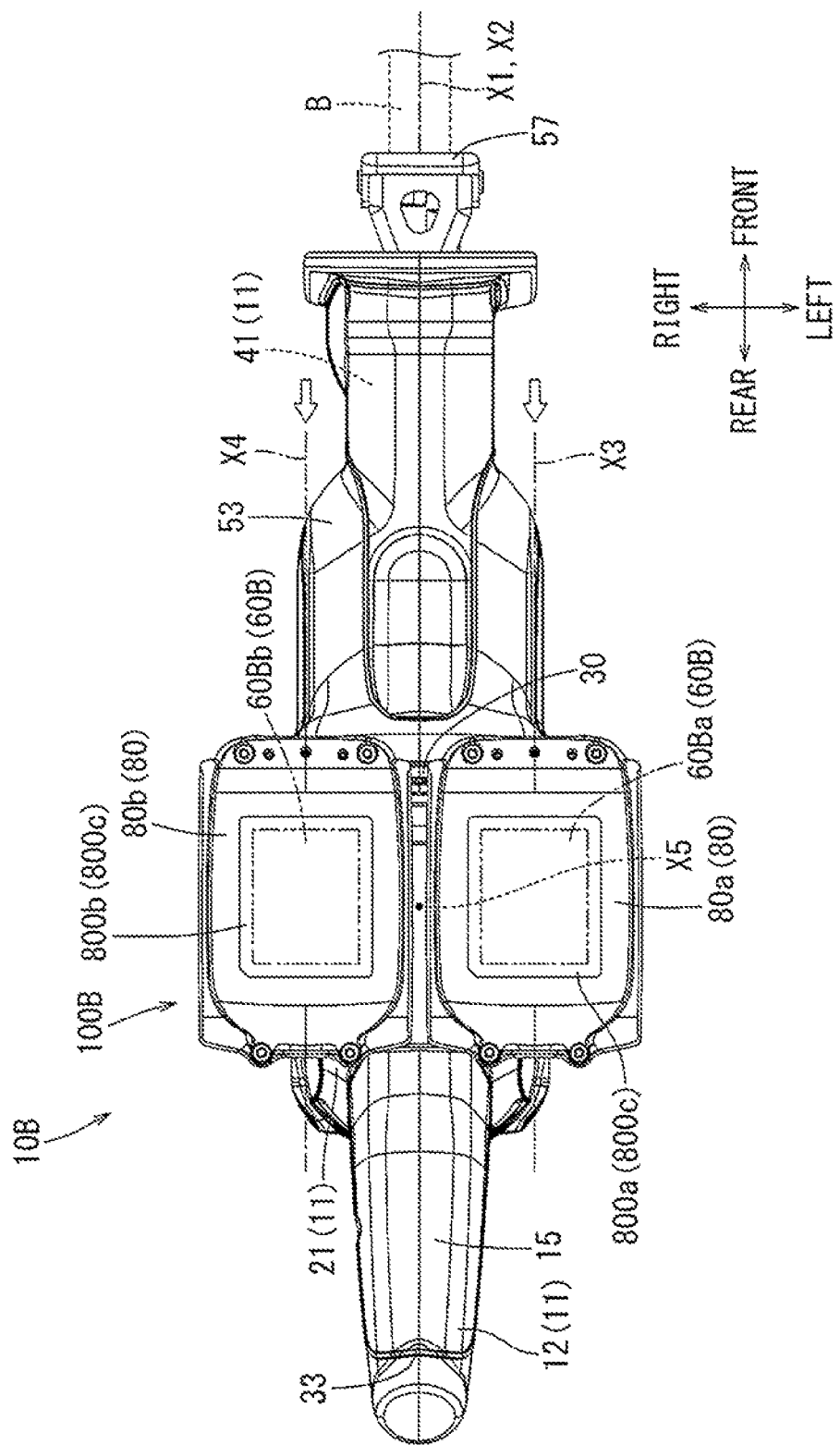
FIG. 22 is a view of the reciprocating saw of FIG. 17 as seen from the lower side.
Figure 23:
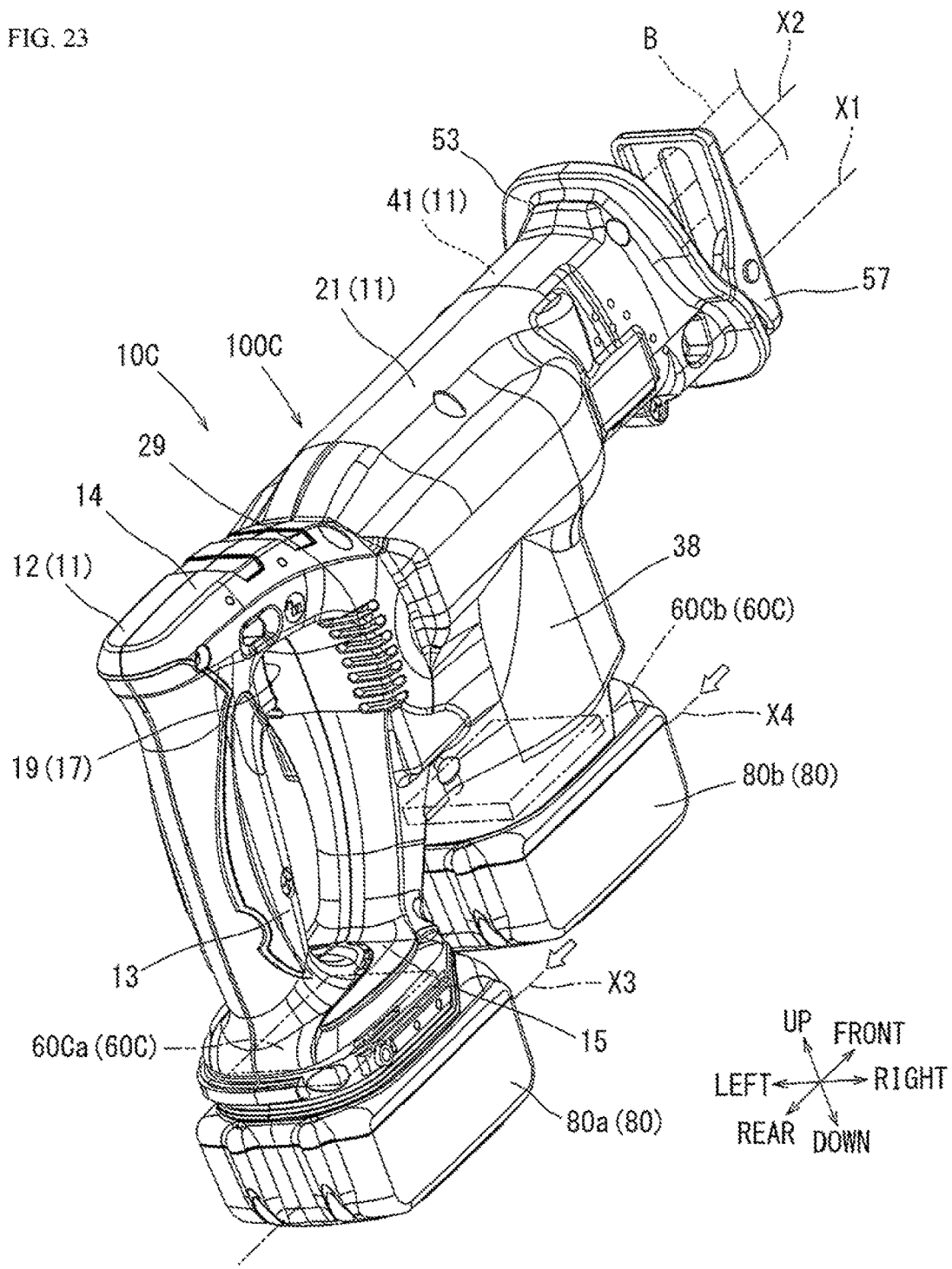
FIG. 23 is a perspective view illustrating the external appearance, as seen obliquely from the rear side, of a reciprocating saw according to a fourth embodiment.
Figure 24:
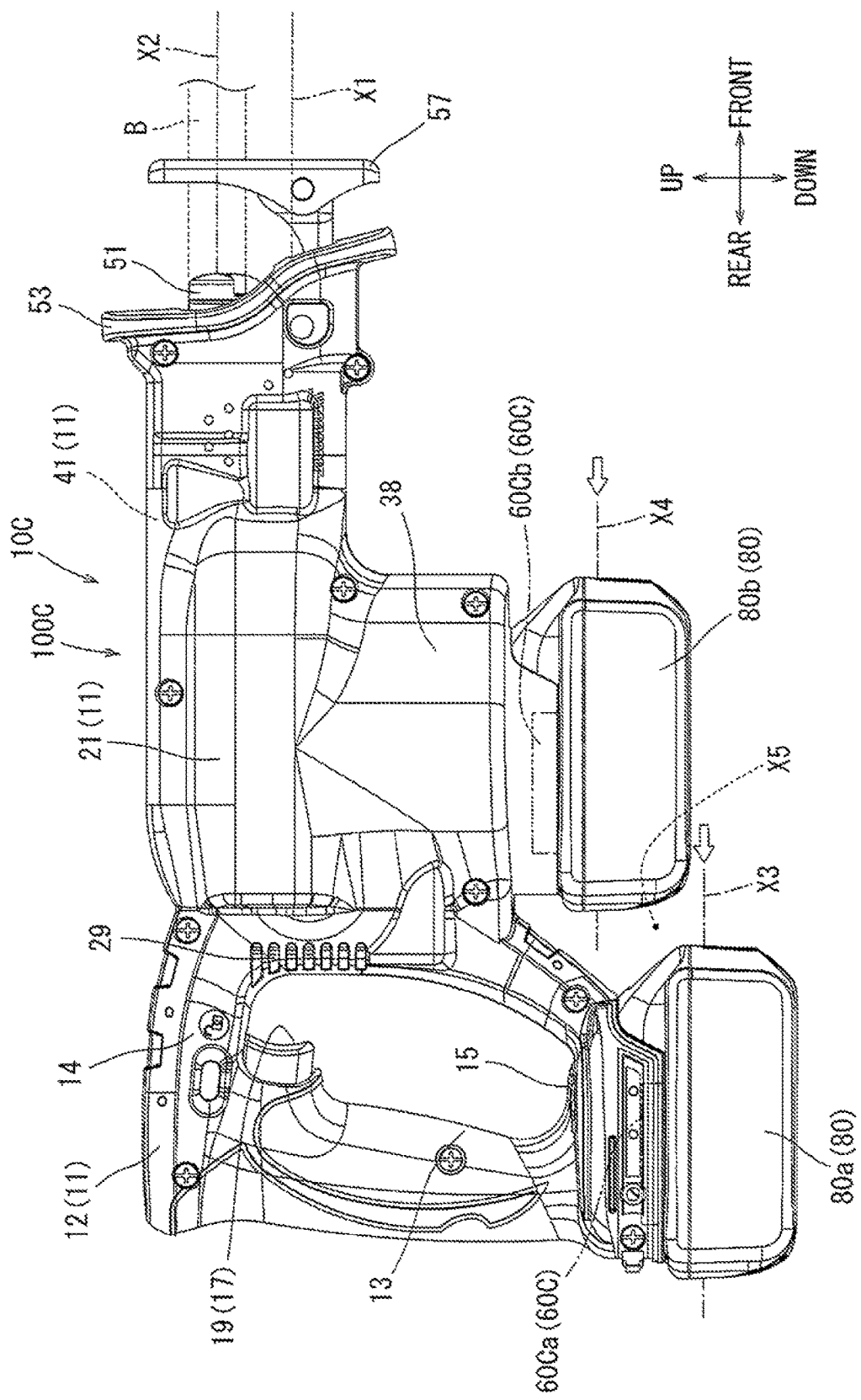
FIG. 24 is a side view of the reciprocating saw shown in FIG. 23.
Figure 25:
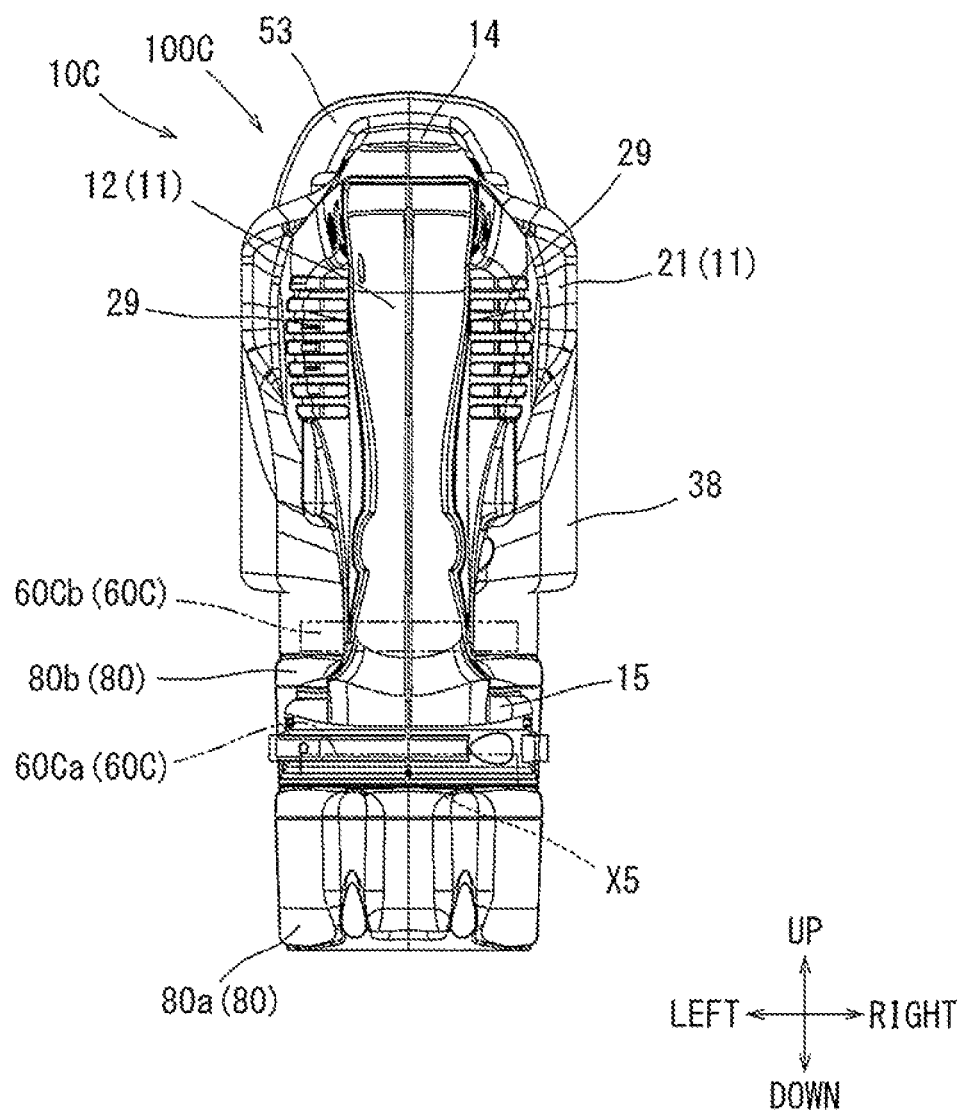
FIG. 25 is a view of the reciprocating saw of FIG. 23 as seen from the rear side.
Figure 26:
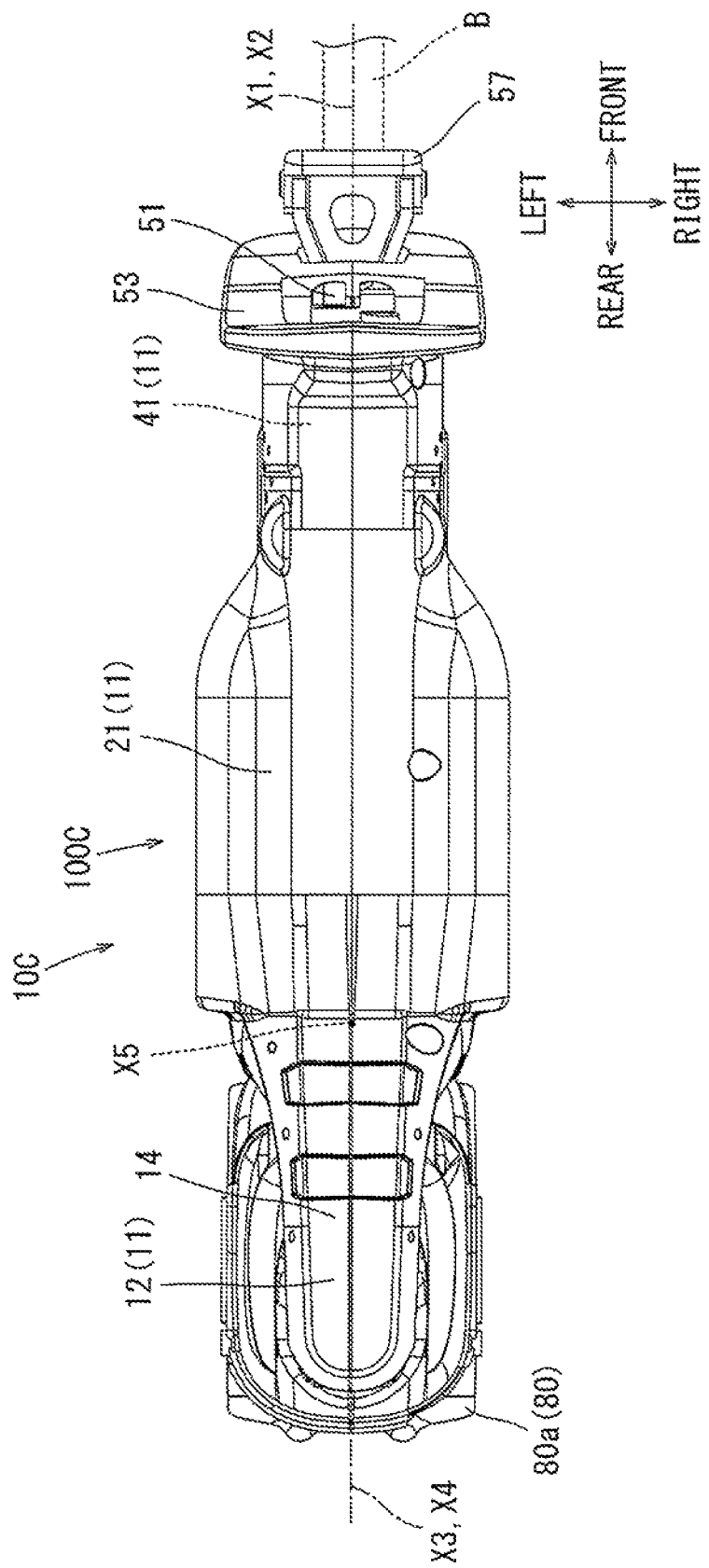
FIG. 26 is a plan view of the reciprocating saw of FIG. 23 as seen from the upper side.
Figure 27:
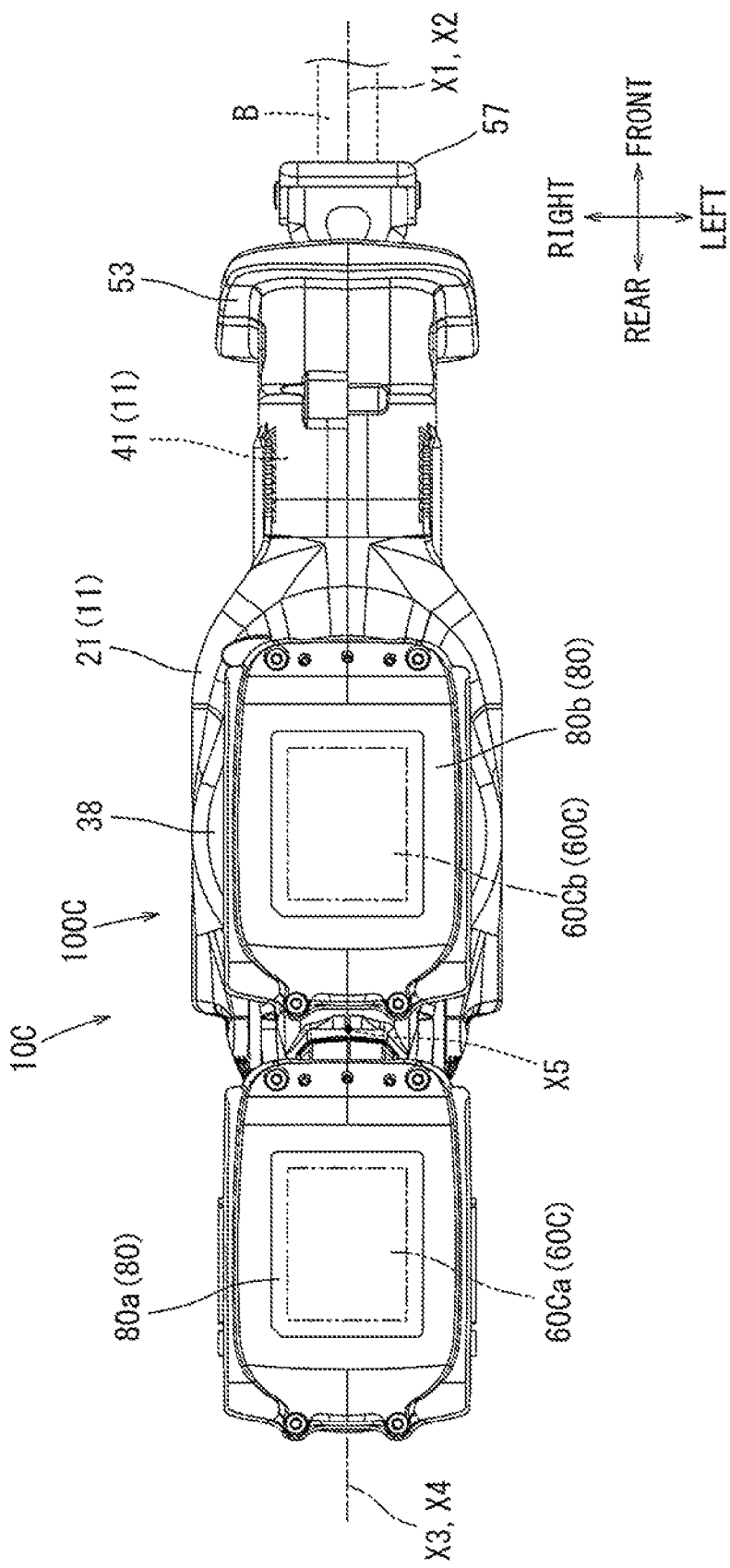
FIG. 27 is a view of the reciprocating saw of FIG. 23 as seen from the lower side.
Figure 28:
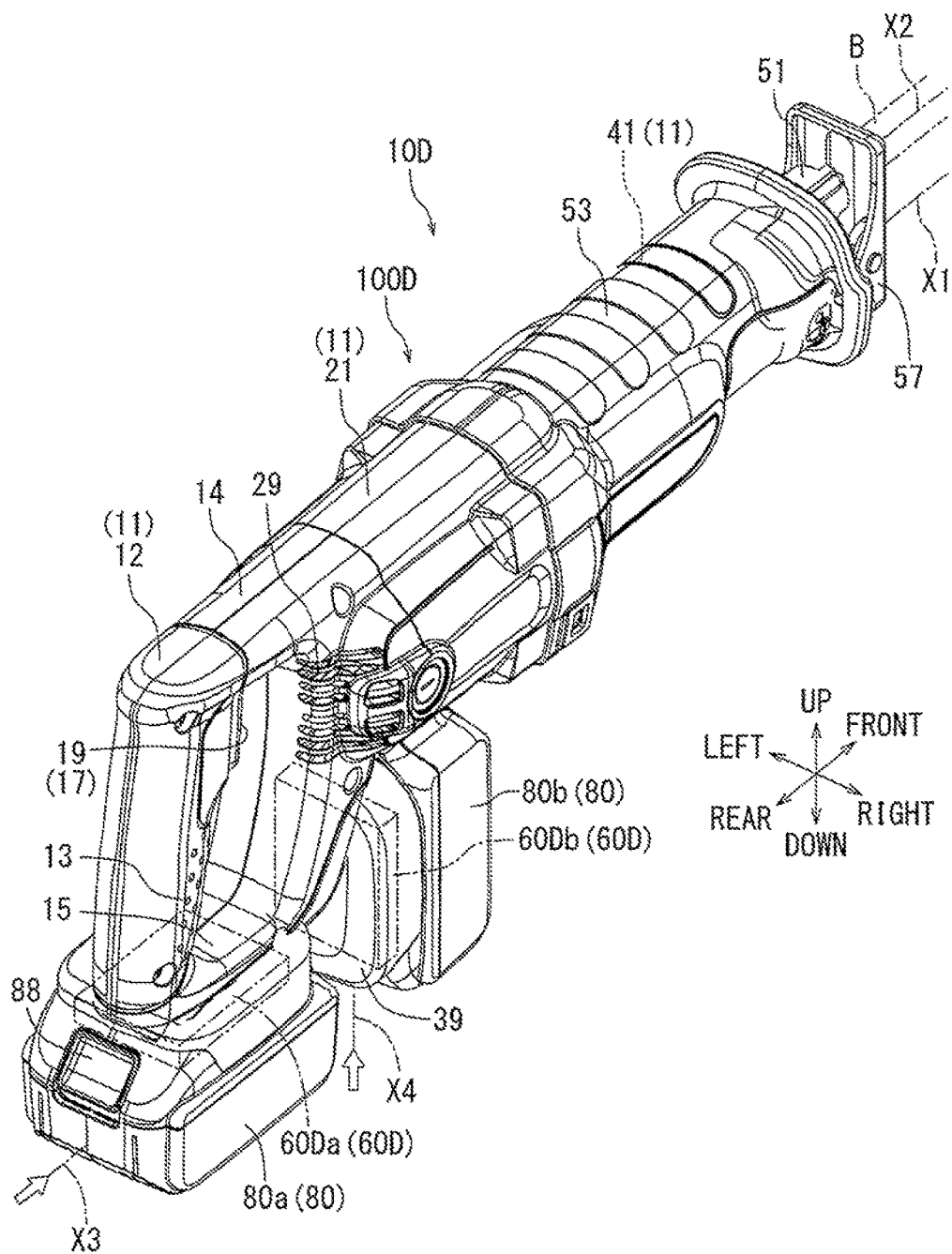
FIG. 28 is a perspective view illustrating the external appearance, as seen obliquely from the rear side, of a reciprocating saw according to a fifth embodiment.
Figure 29:
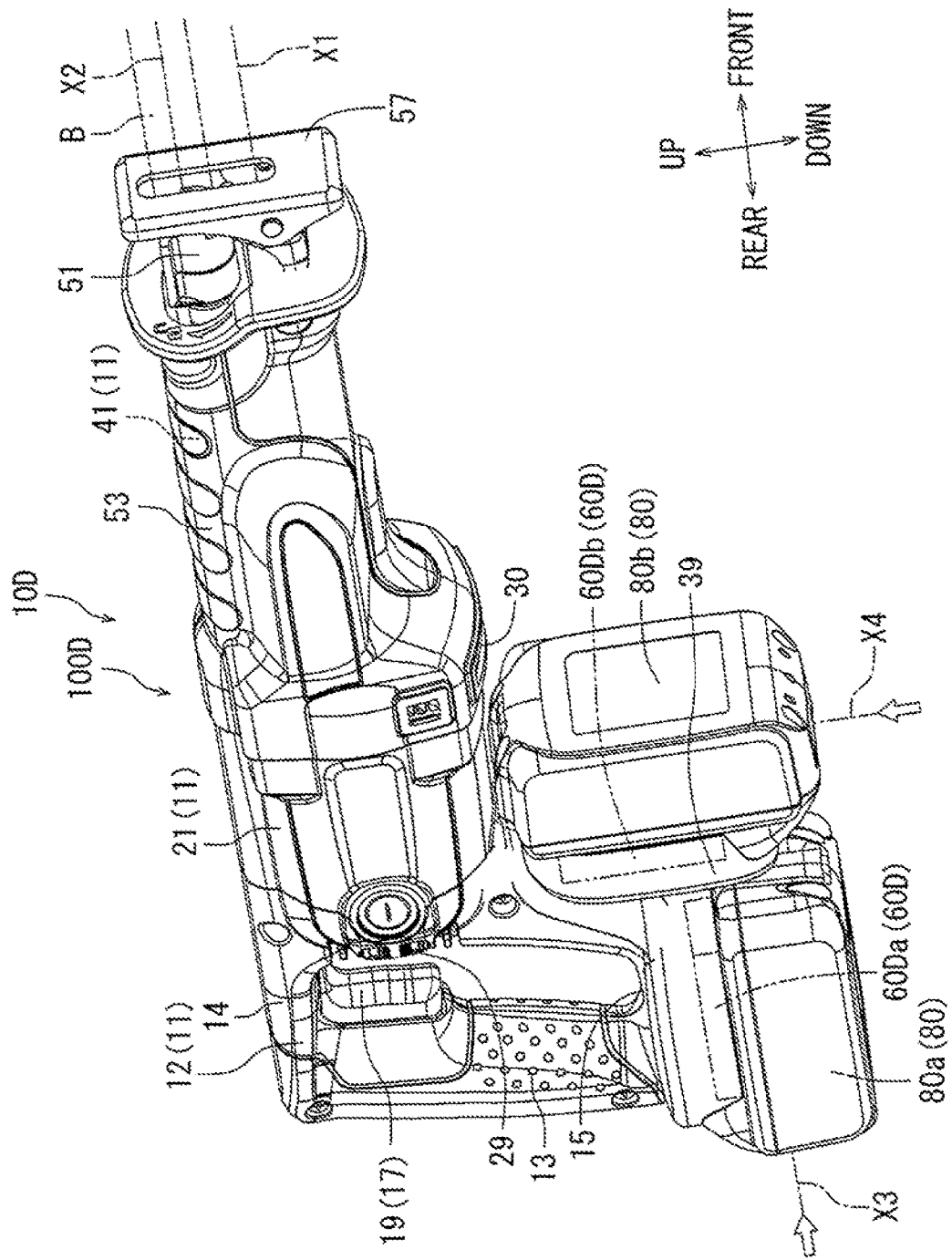
FIG. 29 is an external perspective view illustrating another external appearance of the reciprocating saw shown in FIG. 28.
Figure 30:
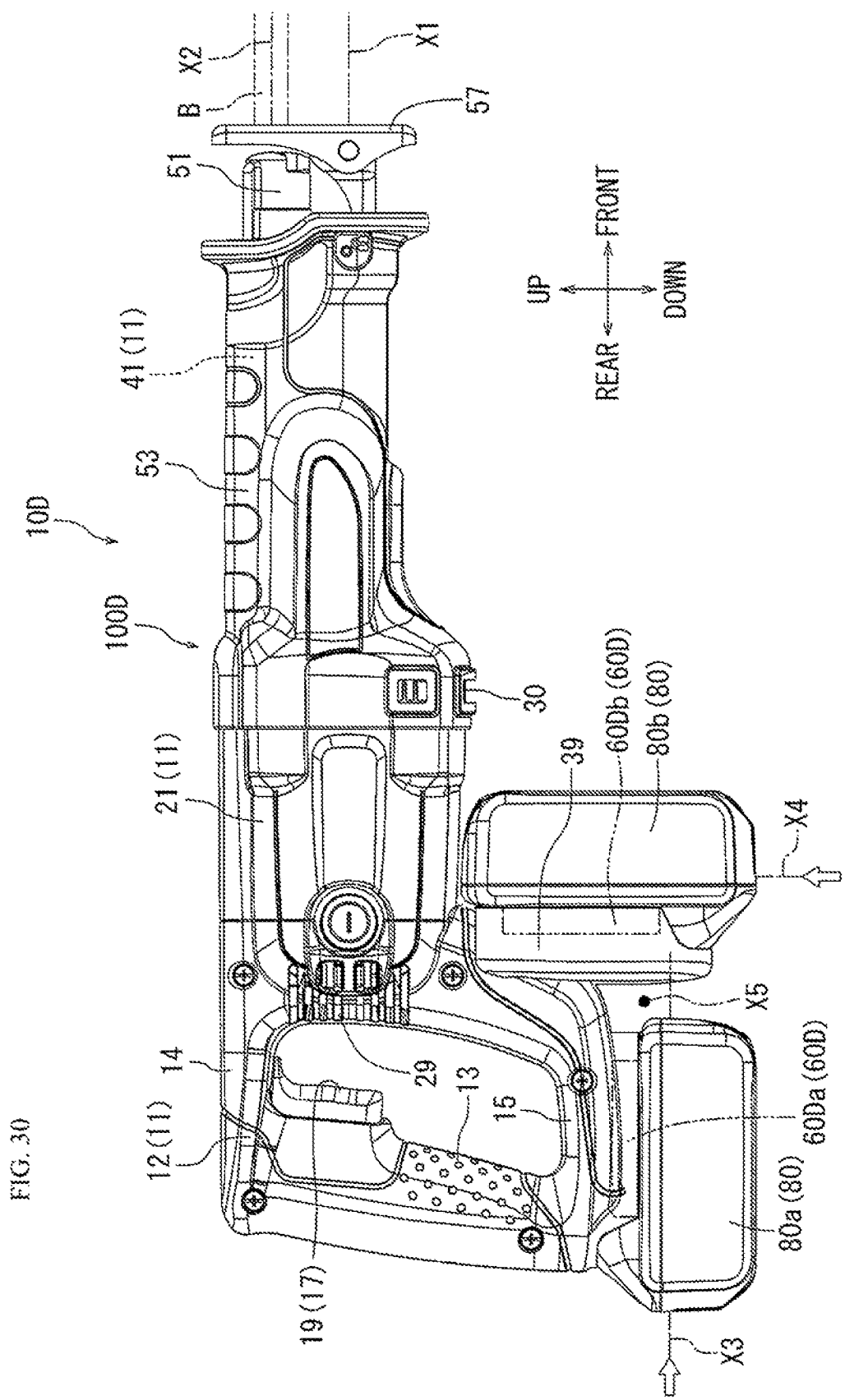
FIG. 30 is a side view of the reciprocating saw shown in FIG. 28.
Figure 31:
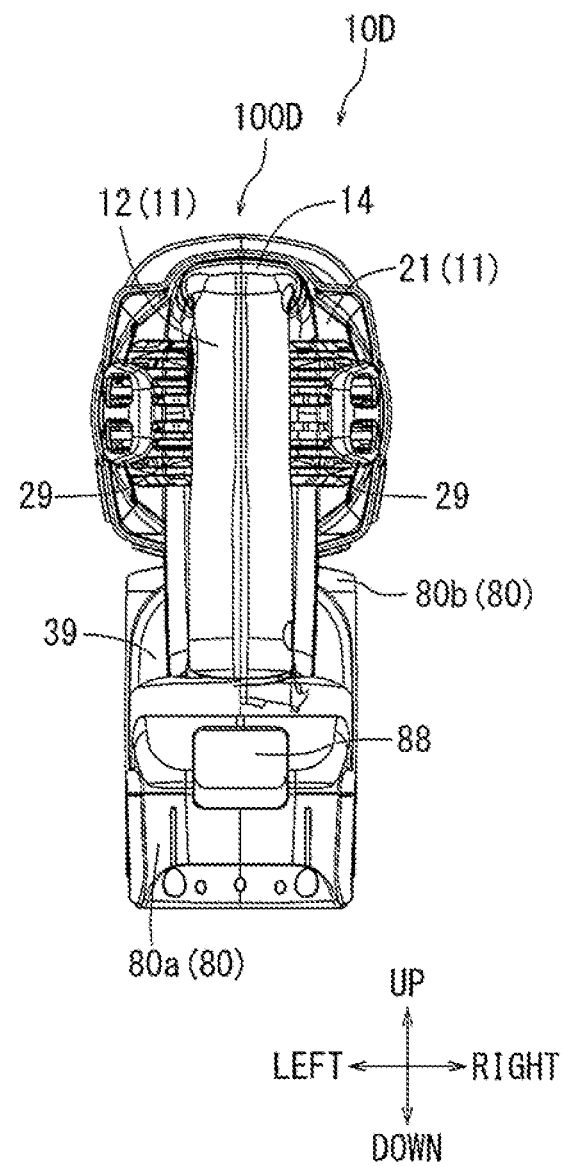
FIG. 31 is a view of the reciprocating saw of FIG. 28 as seen from the rear side.
Figure 32:
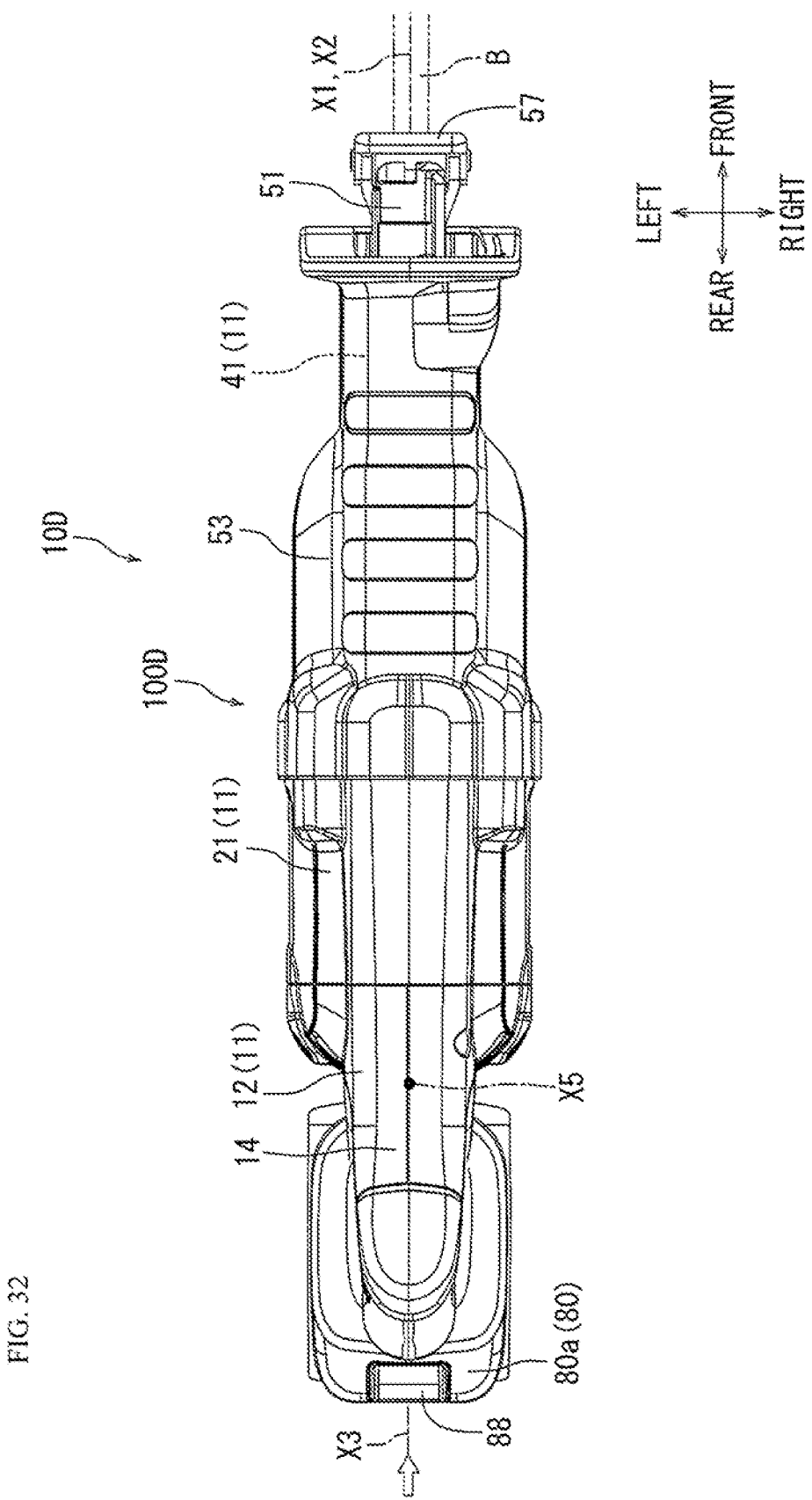
FIG. 32 is a plan view of the reciprocating saw of FIG. 28 as seen from the upper side.
Figure 33:
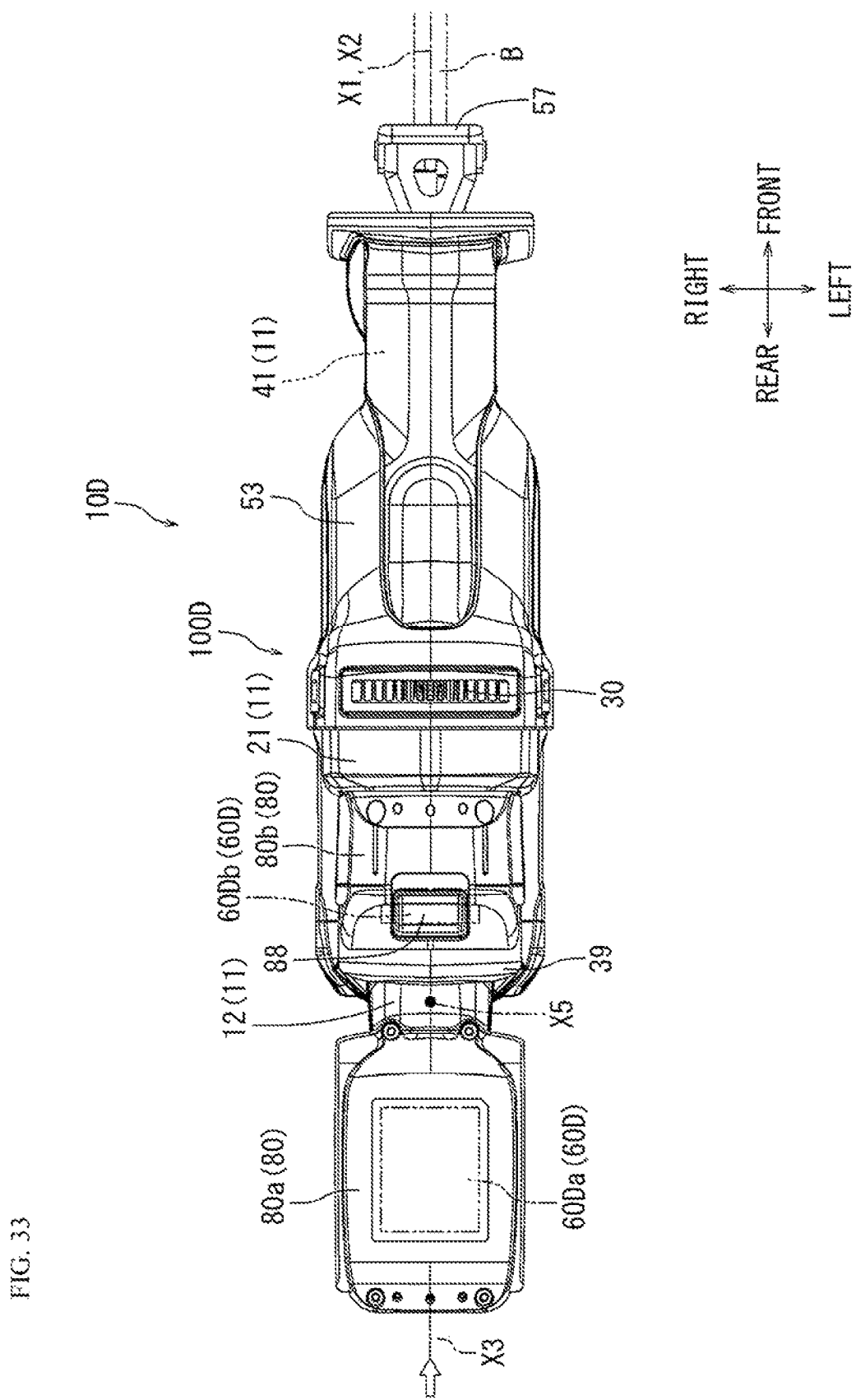
FIG. 33 is a view of the reciprocating saw of FIG. 28 as seen from the lower side.
Figure 34:
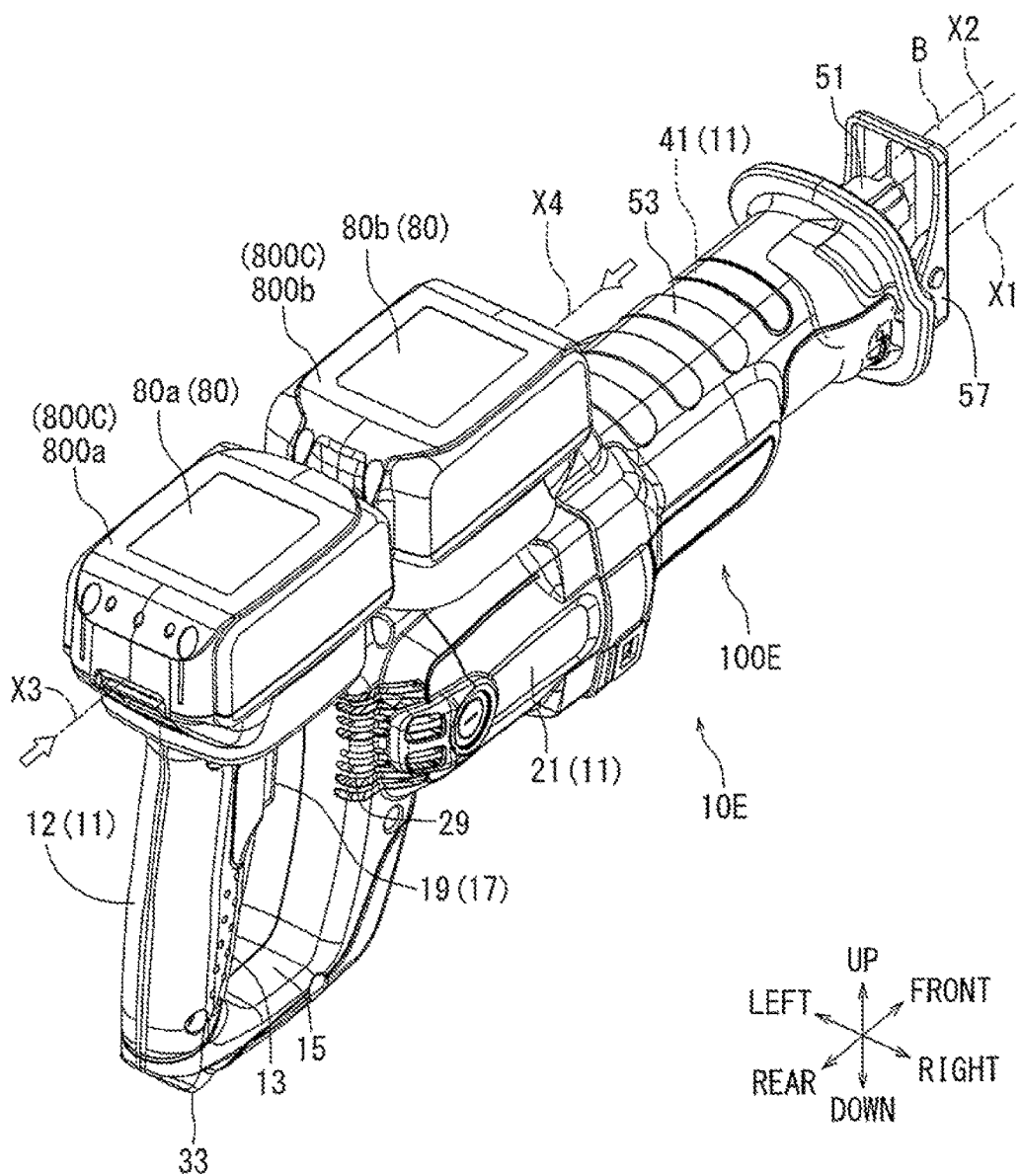
FIG. 34 is a perspective view illustrating the external appearance, as seen obliquely from the rear side, of a reciprocating saw according to a sixth embodiment.
Figure 35:
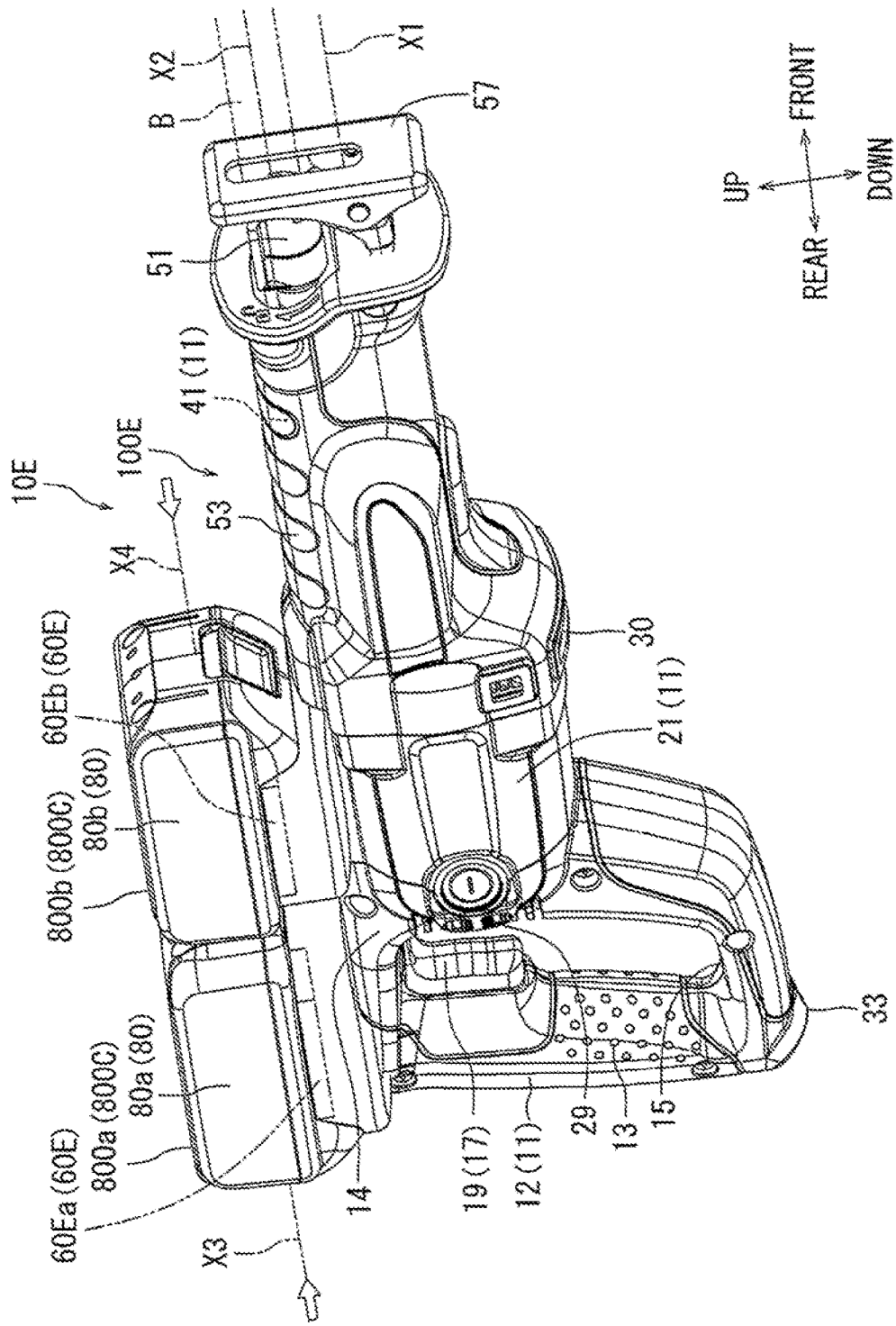
FIG. 35 is an external perspective view illustrating another external appearance of the reciprocating saw shown in FIG. 34.
Figure 36:
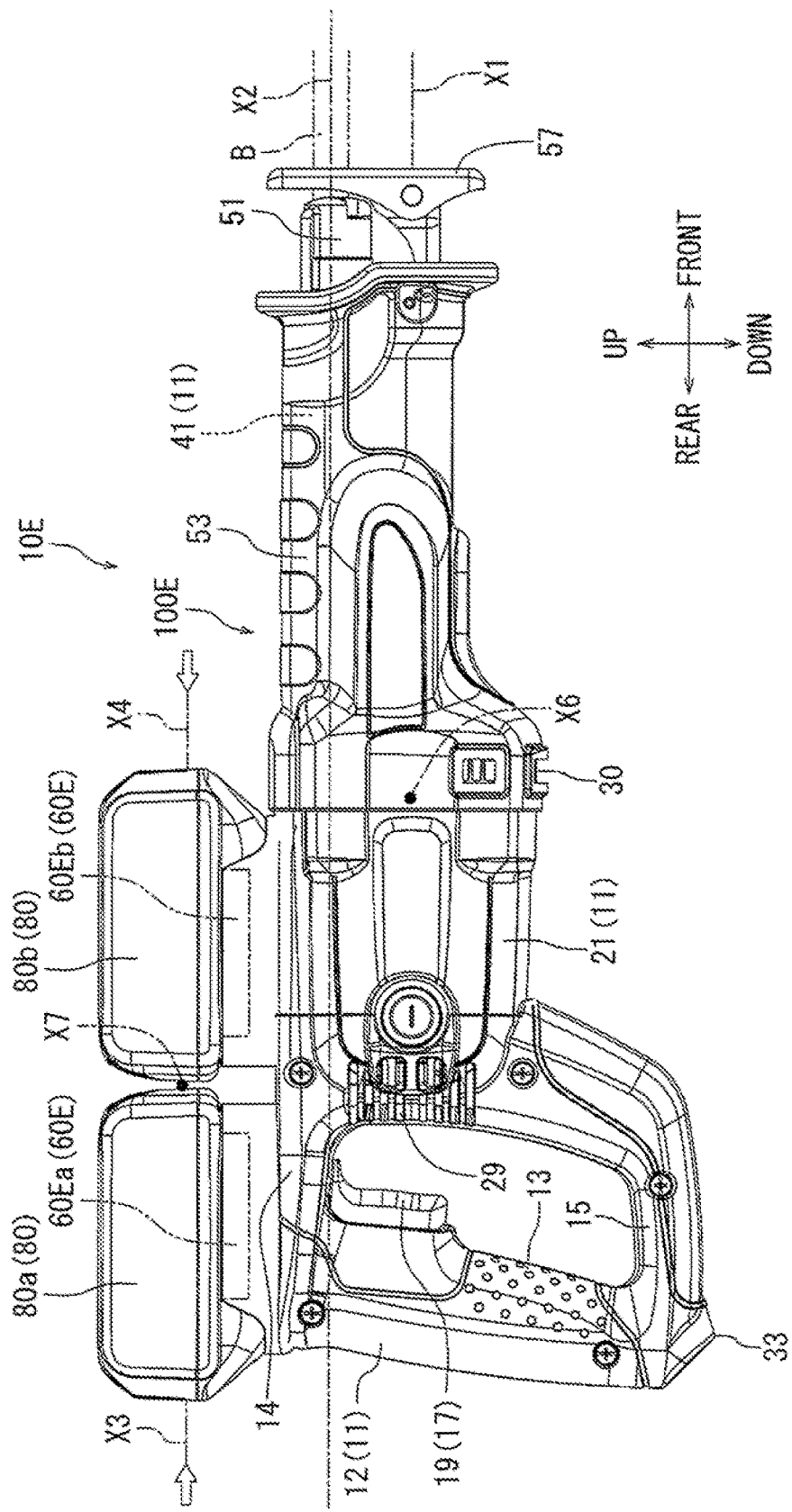
FIG. 36 is a side view of the reciprocating saw shown in FIG. 34.
Figure 37:
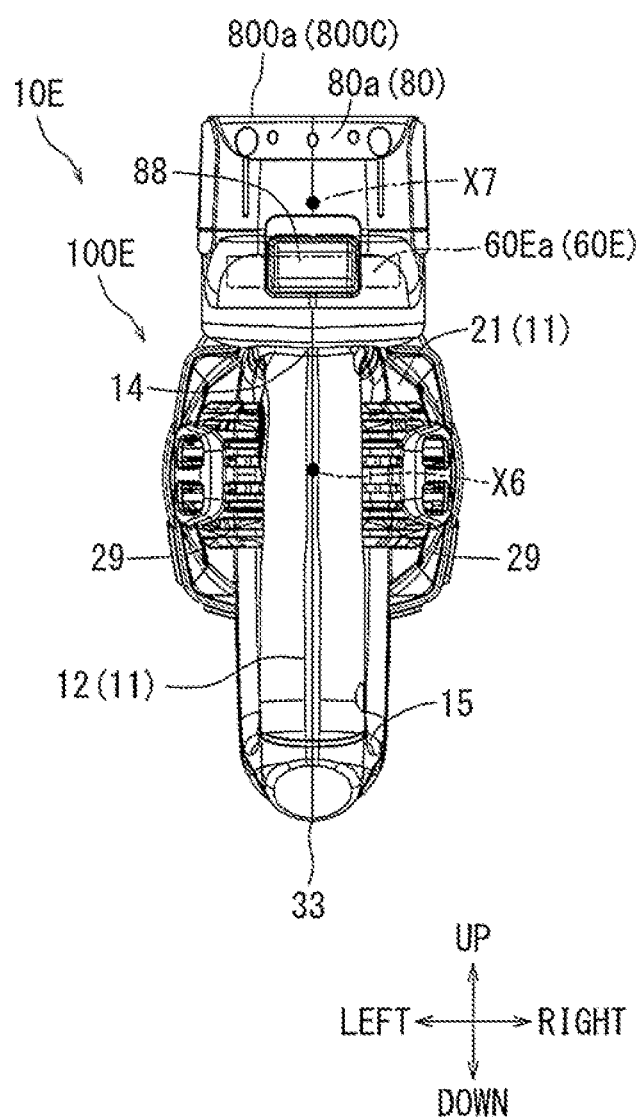
FIG. 37 is a view of the reciprocating saw of FIG. 34 as seen from the rear side.
Figure 38:
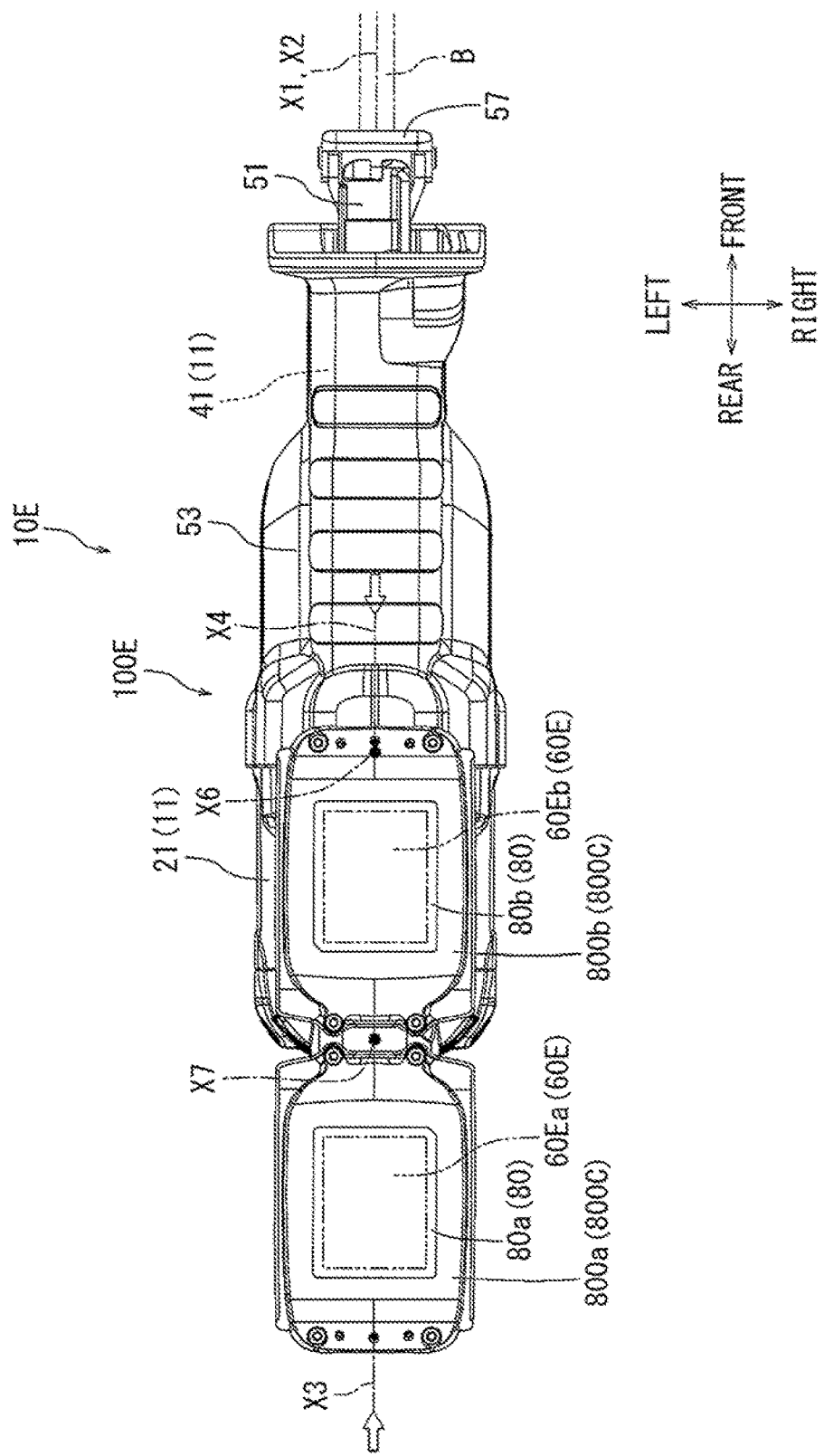
FIG. 38 is a plan view of the reciprocating saw of FIG. 34 as seen from the upper side.
Figure 39:
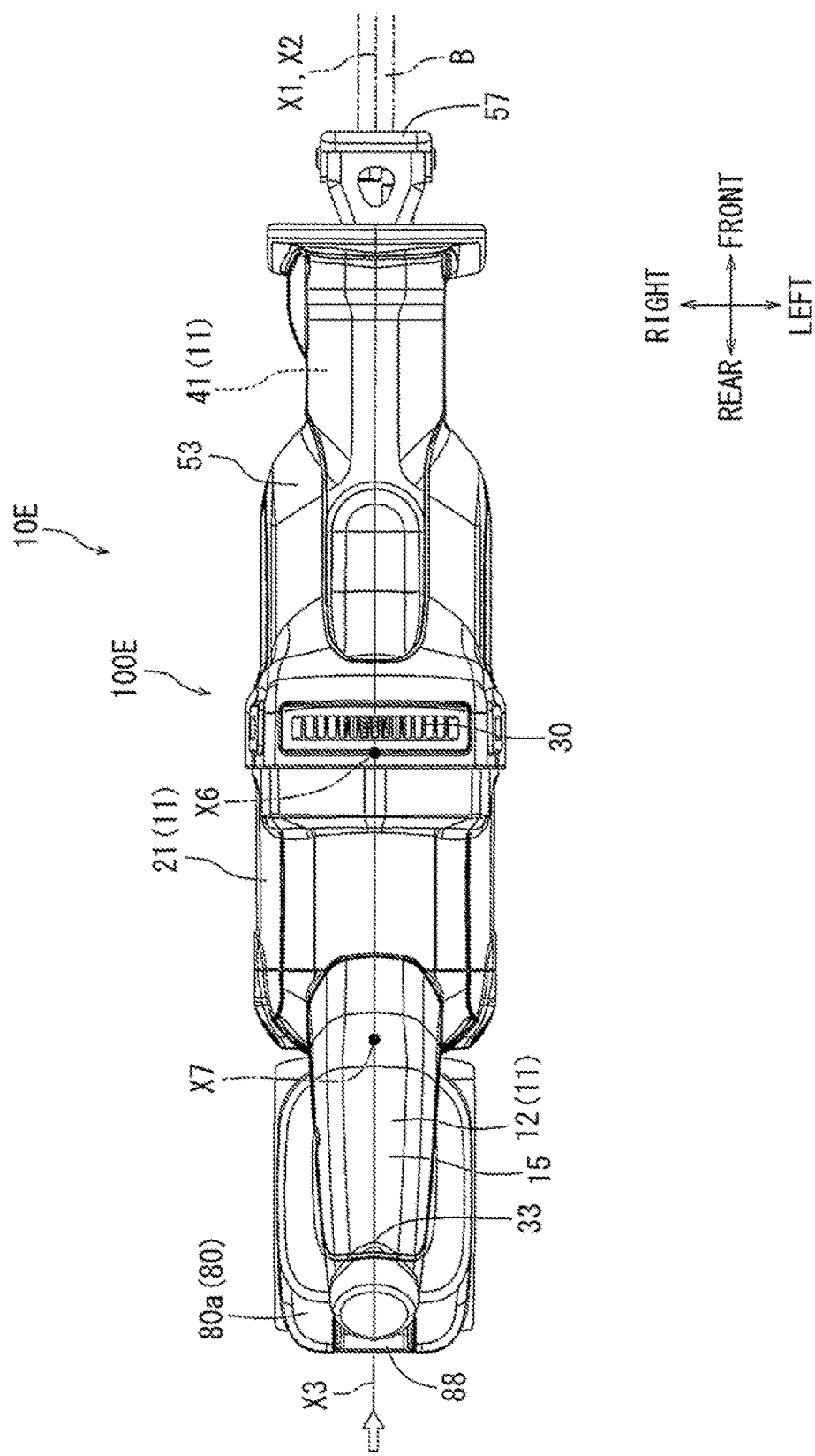
FIG. 39 is a view of the reciprocating saw of FIG. 34 as seen from the lower side.
Figure 40:
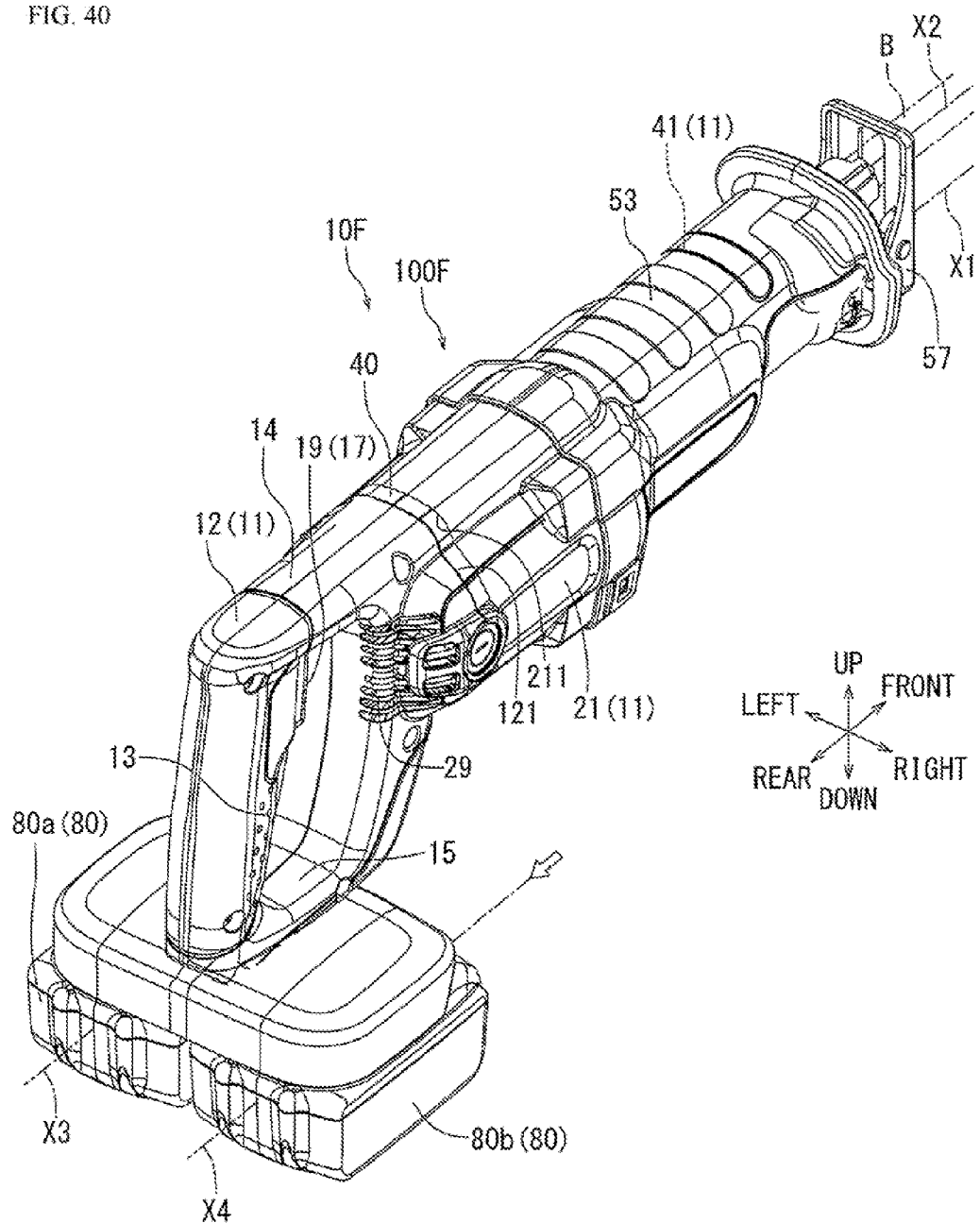
FIG. 40 is a perspective view illustrating the external appearance, as seen obliquely from the rear side, of a reciprocating saw according to a seventh embodiment.
Figure 41:
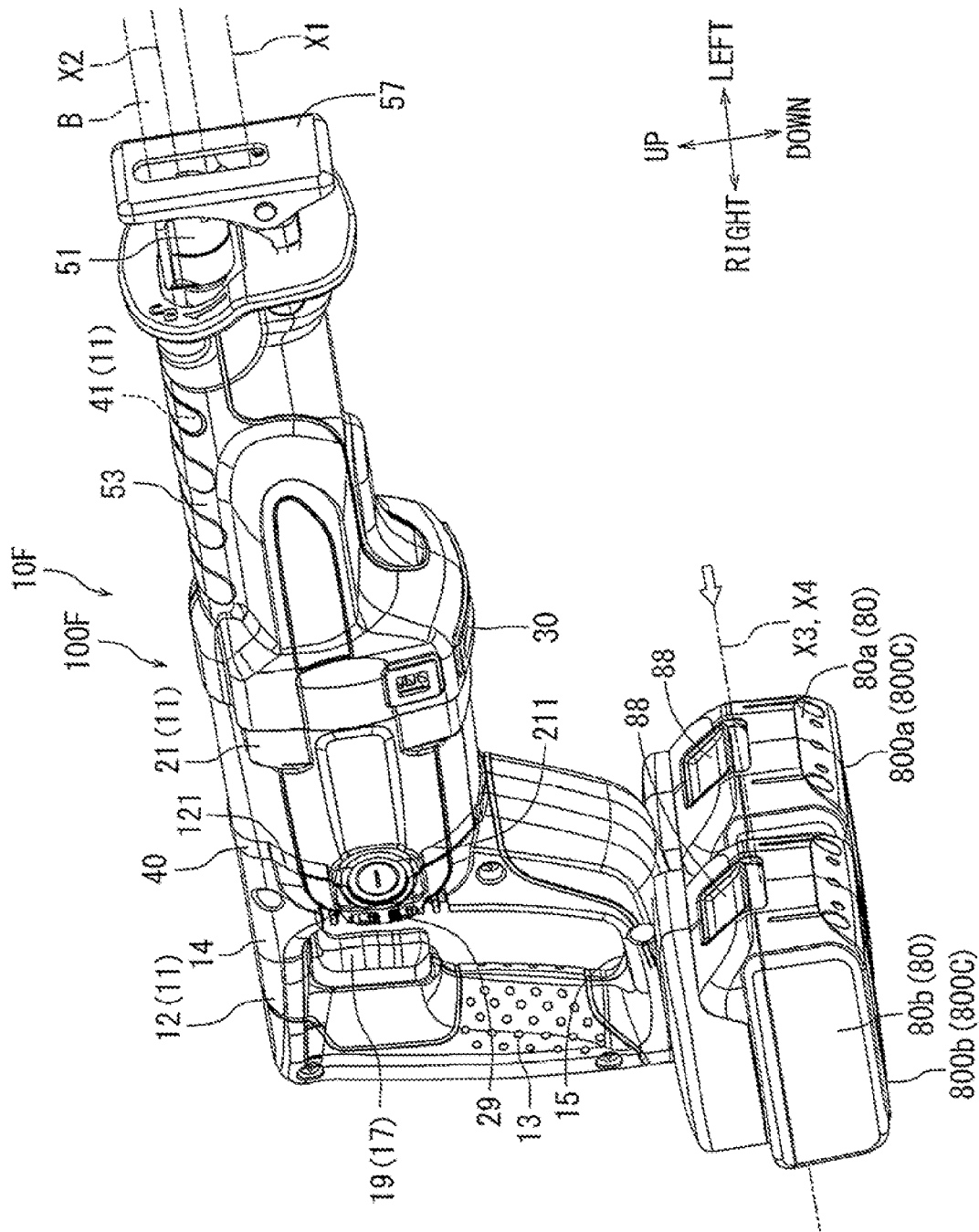
FIG. 41 is an external perspective view illustrating another external appearance of the reciprocating saw shown in FIG. 40.
Figure 42:
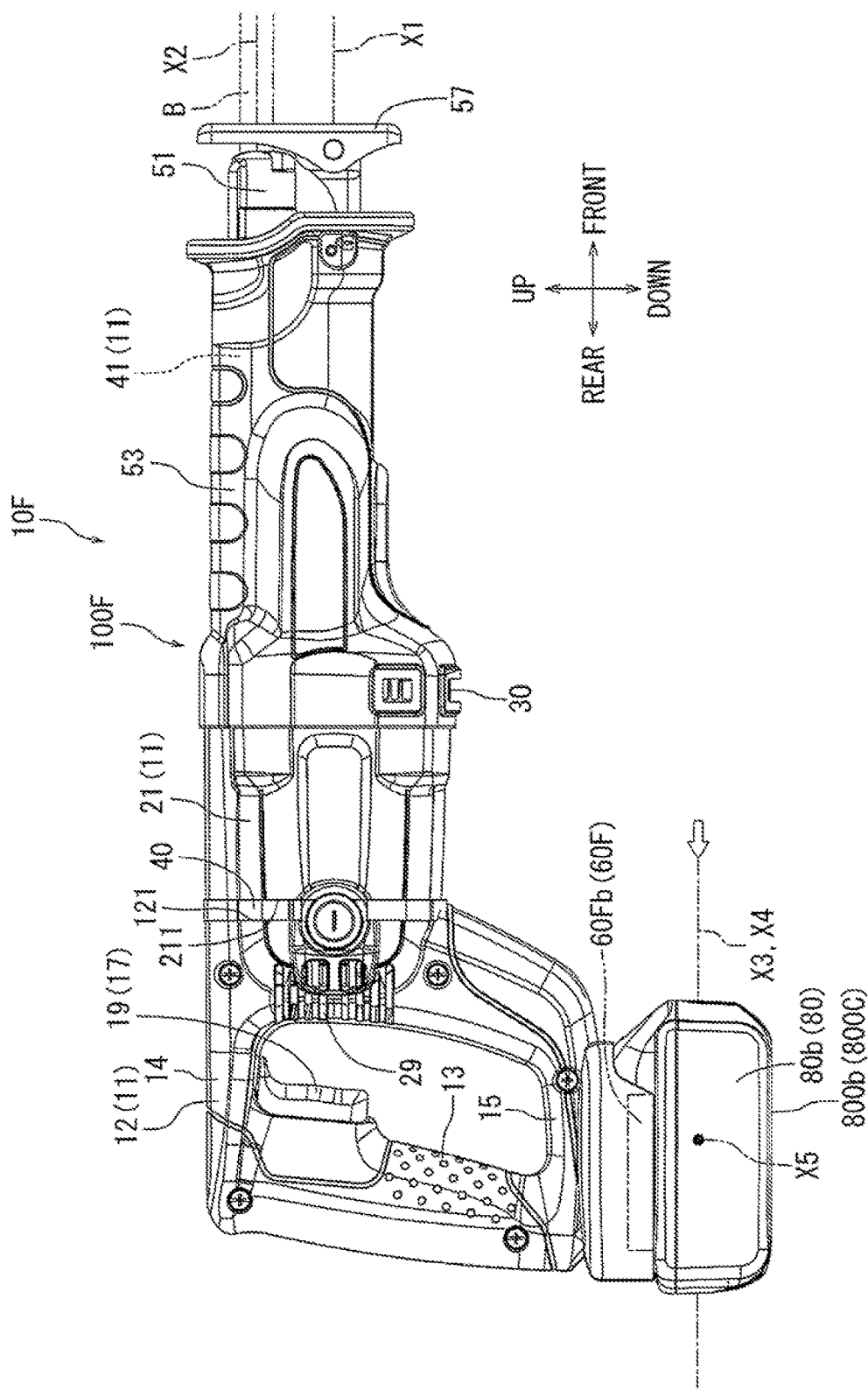
FIG. 42 is a side view of the reciprocating saw shown in FIG. 40.
Figure 43:
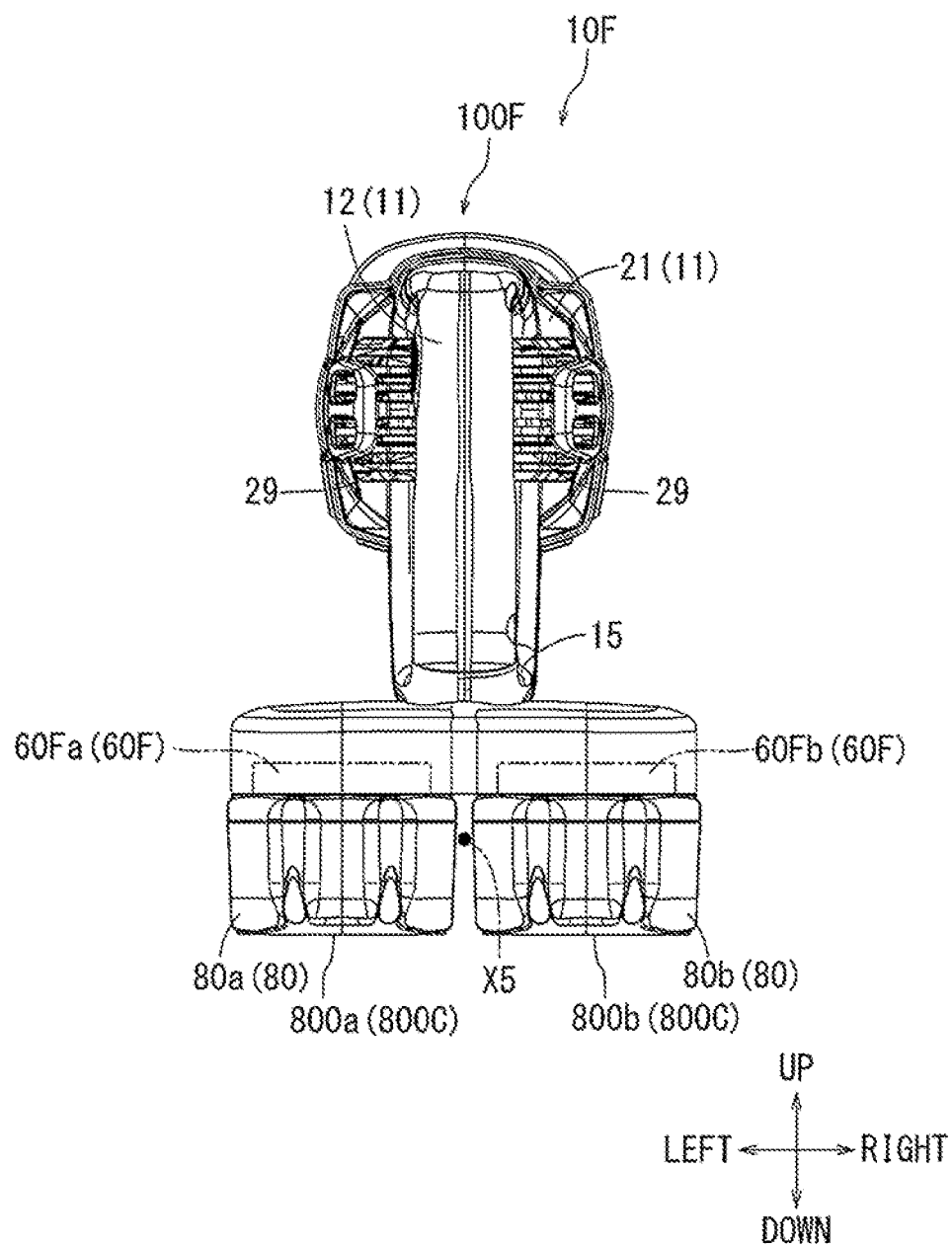
FIG. 43 is a view of the reciprocating saw of FIG. 40 as seen from the rear side.
Figure 44:
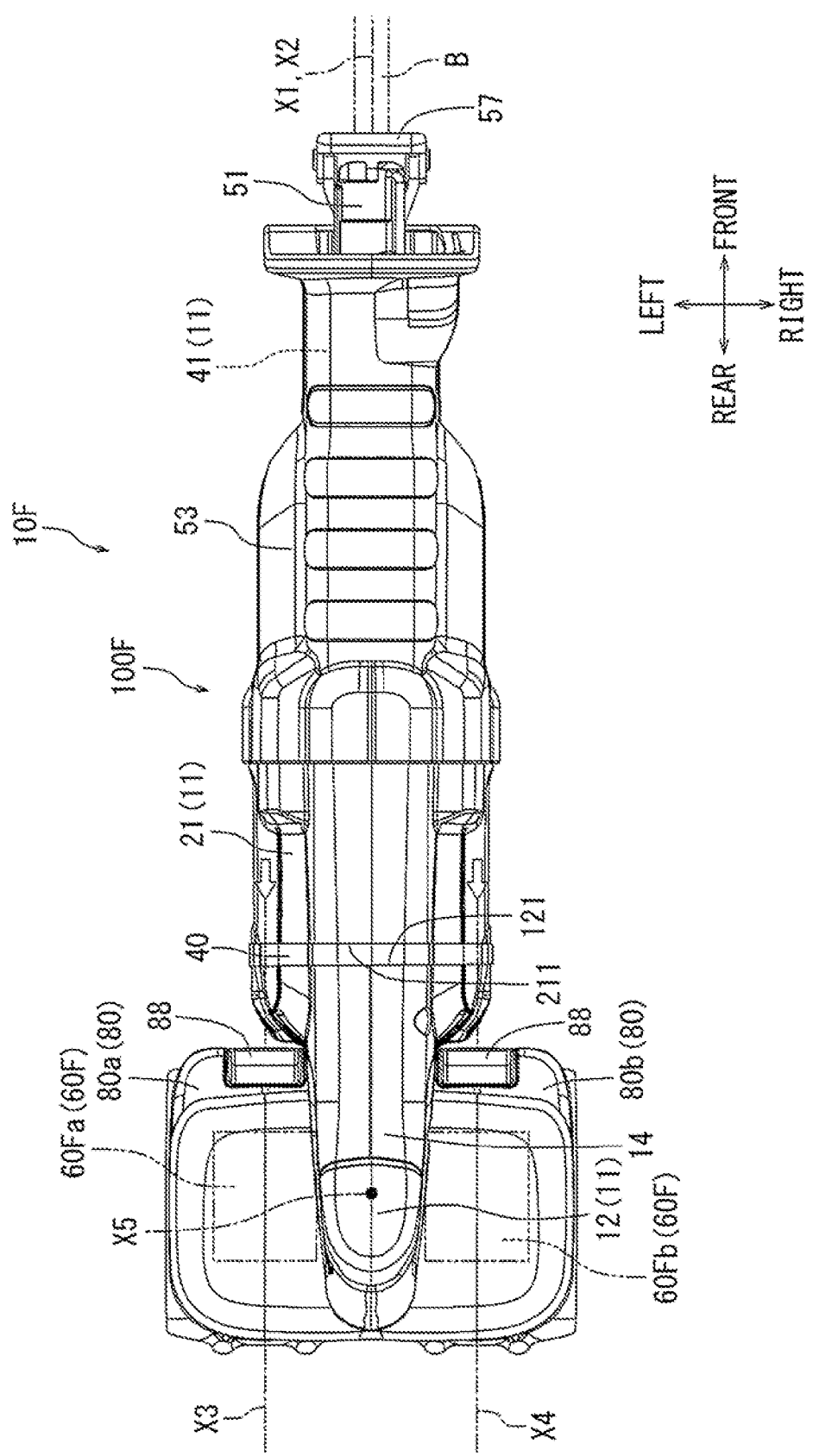
FIG. 44 is a plan view of the reciprocating saw of FIG. 40 as seen from the upper side.
Figure 45:
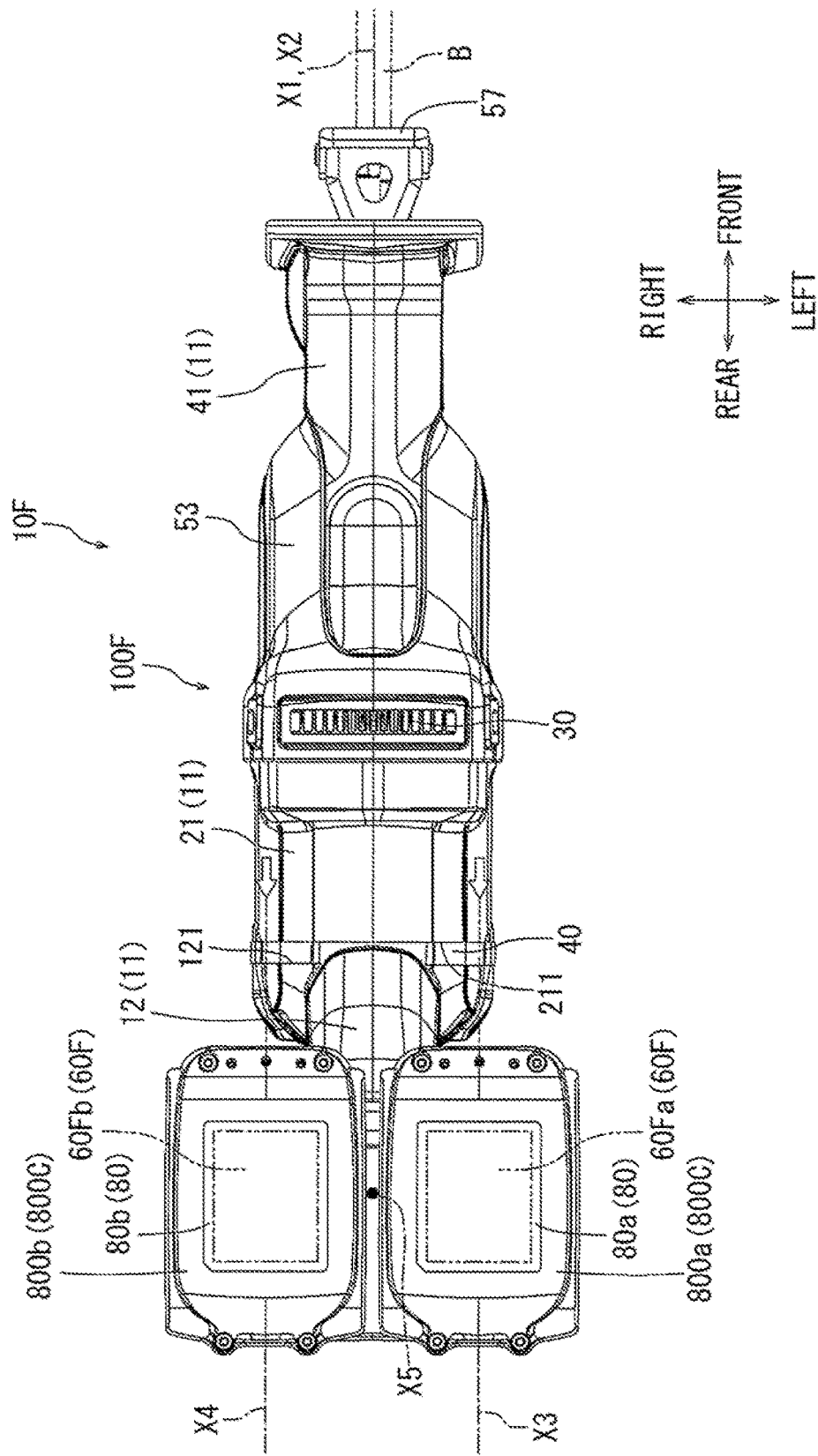
FIG. 45 is a view of the reciprocating saw of FIG. 40 as seen from the lower side.

Next, a first embodiment will be described with reference to FIGS. 1 through 10. In FIG. 1, reference numeral 10 denotes a reciprocating saw which corresponds to a cutting tool according to the present invention. FIG. 1 is a substantially overall perspective view of the external appearance of the reciprocating saw 10 as seen obliquely from the rear side. FIG. 2 is a side view of the reciprocating saw 10 shown in FIG. 1. FIG. 3 is a plan view of the reciprocating saw 10 shown in FIG. 1 as seen from the rear side. FIG. 4 is a plan view of the reciprocating saw 10 shown in FIG. 1 as seen from the upper side. FIG. 5 is a sectional view taken along arrow line (V)-(V) of FIG. 4. FIG. 6 is a sectional view taken along arrow line (VI)-(VI) of FIG. 4. FIG. 7 is a substantially overall perspective view, as seen obliquely from the rear side, illustrating the external appearance of the reciprocating saw 10 with rechargeable batteries 80 removed therefrom. FIG. 8 is a plan view of the reciprocating saw 10 shown in FIG. 7 as seen from the lower side. FIG. 9 is a perspective view of the rechargeable battery 80 that is attached to a battery attachment portion 60 through sliding. FIG. 10 is an enlarged plan view of a battery terminal connection portion 600. In the following, the reciprocating saw 10 will be described by referring to the directions in the drawings.

This reciprocating saw 10 may be a hand-held type cutting tool for performing a machining operation while being held by a hand of the user; it is a high-power type reciprocating saw with a voltage of the supply power set to 36 V. This reciprocating saw 10 may be configured to have an output shaft 50 to which a blade B as a cutting blade is mounted. This output shaft 50 may be provided with a mounting portion 51 for holding the blade B. The blade B may be mounted to this mounting portion 51. This blade B reciprocates as it receives the reciprocating motion of the output shaft 50. Therefore, the reciprocating blade B can cut a workpiece to be cut.

This reciprocating saw 10 may be generally provided with a tool main body 100 from the front end of which the above-mentioned output shaft 50 projects, and a shoe 57 mounted to the front end side of this tool main body 100. The tool main body 100 may be generally provided with a housing 11, an electric motor 22, and a crank mechanism 42. The crank mechanism 42 may serve as a reciprocation converting mechanism. The housing 11 constitutes an outer casing of this tool main body 100. As the housing 11, there may be provided a grip housing 12, a motor housing 21, and a gear housing 41 in the order from the rear side. The grip housing 12, the motor housing 21, and the gear housing 41 are connected to each other to constitute a part of the outer casing of the reciprocating saw 10. The grip housing 12 is formed as a resin molded product divided into halves. As shown in the drawings, this grip housing 12 is formed as a ring (loop shape) extending in the front-rear direction. This grip housing 12 is of a substantially D-shaped shape in a side view. The rear portion of the grip housing 12 formed in the loop shape is formed as a handle portion 13 grasped by the hand of the user.

A suitable elastomer may be attached to the outer peripheral surface of this handle portion 13. This elastomer ensures a function such as a slip preventing function when the handle portion 13 is grasped by the hand. The lower end of this handle portion 13 is set as a handle end portion 33. This handle end portion 33 is set to form substantially the rearmost end of the tool main body 100 and, at the same time, to form the lowermost end of the tool main body 100. On the upper side of this handle portion 13, there is formed an upper connection portion 14 protruding forwards. Further, also on the lower side of the handle portion 13, there is formed a lower connection portion 15 protruding forwards. The front portion of the upper connecting portion 14 and the front portion of the lower connecting portion 15 are connected to each other. The front side portion of the grip housing 12 connecting the upper connection portion 14 and the lower connection portion 15 in this way is connected to the motor housing 21 that will be hereinafter described.

The handle portion 13 may be provided with an operation switch 17. As shown in FIG. 5, this operation switch 17 is provided with a switch main body 18 and an operation button portion 19. The switch main body 18 is accommodated in the grip housing 12 and supported by the grip housing 12. A contact switch that is widely used constitutes this switch main body 18. The operation button portion 19 is supported by the grip housing 12 so as to be movable in the front-rear direction. The contact of the switch main body 18 is turned on through the pushing operation of the operation button portion 19 along the grasping direction of the handle portion 13. The switch main body 18 having its contact turned on inputs a signal indicating turning-on of the switch to a controller (not shown).

When no pushing operation is performed on the operation button portion 19, the pushing is released by a bias spring (not shown), so that a turning-off state is attained in which the contact is tuned off. The front end portion of this grip housing 12 is provided with a rear side bearing 35 supporting a motor shaft 23 of the electric motor 22 described below. The rear side bearing 35 is supported by the grip housing 12. A controller (not shown) is accommodated in this grip housing 12. This controller is constituted to have various electrical components such as a shunt resistor and a field-effect transistor (FET) circuit. This controller is constituted by a circuit board performing various controls relating to the power supply.

The motor shaft 23 may define defined as the center axis X1 of the tool main body 100. A motor housing 21 is connected to the front side of the grip housing 12. This motor housing 21 is formed as a molded product obtained through aluminum casting. This motor housing 21 supports the electric motor 22 arranged inside the motor housing 21. With the supply of electric power, the electric motor 22 rotates the motor shaft 23. This electric motor 22 constituted by a so-called brush motor, and is provided with a stator 24, a rotor 25, and a commutator 26.

The stator 24 may be a permanent magnet supported by the motor housing 21. The rotor 25 may be formed by wound coils. The motor shaft 23 is set as the rotation shaft of the rotor 25. This motor shaft 23 is rotatably supported by a rear side bearing 35 at the rear end side and a front side bearing 36 at the front end side. A cooling fan 28 may be mounted to the portion of the motor shaft 23 on the front side of the rotor 25. On the lower side of the cooling fan 28, there may be provided air discharge holes 30 extending through the motor housing 21 between the interior and the exterior thereof.

Air inlet holes 29 contrasting to the air discharge holes 30 may be provided at the front side of the grip housing 12 as shown in FIG. 1, etc. A gear housing 41 supports the front side bearing 36. Further, at the front end of the motor shaft 23, there is provided a pinion gear 37 using the motor shaft 23 as the rotation shaft. This pinion gear 37 is formed in a tapered configuration so as to be in mesh with a bevel gear 43 of the crank mechanism 42 that will be described later.

The gear housing 41 is connected to the front side of the motor housing 21. The gear housing 41 accommodates the crank mechanism 42. The gear housing 41 is an aluminum-casting product and is formed by joining together a lower housing 411 and an upper housing 412. The lower housing 411 and the upper housing 412 form a substantially tubular shape when they are joined together.

This gear housing 41 is fixed to the motor housing 21 by screws via a flange portion 413. This gear housing 41 accommodates the crank mechanism 42 that converts the drive mode of the rotational drive of the motor shaft 23. This crank mechanism 42 converts the rotational drive of the motor shaft 23 to the reciprocating motion of the output shaft 50. That is, the crank mechanism 42 is generally provided with a bevel gear 43, a bevel gear rotation shaft 44, a crank shaft 45, and a slider 46. The bevel gear 43 is in mesh with the pinion gear 37 at the front end of the motor shaft 23. This bevel gear 43 rotates using as the rotation shaft the bevel gear rotation shaft 44 supported by the lower housing 411. At the offset position from the center of the bevel gear 43, the crank shaft 45 is arranged so as to protrude upwards.

This crank shaft 45 functions as the offset shaft of the bevel gear 43. The front end of the slider 46 is set as the output shaft 50. This slider 46 is formed as a cylindrical tubular rod. The forward/backward slide movement of the slider 46 is guided by a guide sleeve 49 supported by the upper housing 412. A slide plate 47 is disposed at the lower portion of the slider 46. The slide plate 47 is of a U-shaped sectional configuration with its lower side open. The upper end of the crank shaft 45 is loosely fitted into the interior of the U-shaped of the slide plate 47. That is, while sliding to the right and left within the U-shape of the slide plate 47, the crank shaft 45 causes the slider 46 to move in conjunction therewith. As the motor shaft 23 rotates in this way, the pinion gear 37 also rotates, and the bevel gear 43 in mesh with this pinion gear 37 also rotates.

Then, the crank shaft 45 arranged at the offset position of this bevel gear 43 slides to the right and left within the U-shape of the slide plate 47. In this process, the rotational motion of the crank shaft 45 causes the slide plate 47 to move back and forth, with the diameter of the movement path of the crank shaft 45 being the forward/backward stroke amount of the slide plate 47. That is, the slider 46 is moved back and forth by the back and forth movement of the slide plate 47, so that the output shaft 50 moves back and forth, i.e., reciprocates. In this way, the blade B mounted to the mounting portion 51 of the output shaft 50 reciprocates, and this reciprocating blade B can cut the workpiece to be cut.

The extension line of the axis of this output shaft 50 is defined as the reciprocation axis X2 of the output shaft 50. On the outer periphery of the gear housing 41 constructed as described above, there is provided an insulating cover 53 formed of rubber resin. This insulating cover 53 is arranged so as to cover the entire range of the outer periphery of the gear housing 41. This insulating cover 53 effects to insulate thermal conduction and electrical conduction. Thus, the outer peripheral portion of the insulating cover 53 covering the gear housing 41 can also function as a handle portion grasped by the hand of the user.

Reference numeral 57 denotes the shoe. The blade B mounted to the mounting portion 51 of the output shaft 50 protrudes forwards so as to extend through the shoe 57. Although shifted in the vertical direction, this output shaft 50 is arranged on the extension line of the axis of the motor shaft 23 (the central line X1 defined by the axis of the motor shaft 23).

Next, the motor housing 21 may be provided with two battery attachment portions 60 (60a and 60b). That is, substantially the lower half of the motor housing 21 is provided with two battery attachment portions 60a and 60b. In this way, the two battery attachment portions 60a and 60b provided on the motor housing 21 are arranged around the electric motor 22. Rechargeable batteries 80a and 80b to be attached through sliding are respectively attached to the battery attachment portions 60a and 60b.

As shown in FIG. 9, the rechargeable batteries 80a and 80b may be those set to have a supply power voltage of 18 V, which is widely used. The rechargeable batteries 80 may be so-called slide attachment type rechargeable batteries that can be attached to the battery attachment portions 60 through sliding. Therefore, on the upper surface (connection terminal arrangement surface) side of the rechargeable batteries 80, there are provided structures for slide attachment and structures for electrical connection.

That is, as shown in FIG. 9, on the upper surface side of the rechargeable battery 80, there may be provided a pair of slide guide portions 81 and 82 as the structure for slide attachment. Further, on the upper surface side of the rechargeable battery 80, there may be provided a positive side terminal 83, a negative side terminal 84, and a signal side terminal 85 as the structure for electrical connection. Further, on the upper surface side of the rechargeable battery 80, there may be provided a male hook 87 which, when the electrical connection is effected through the slide attachment of the rechargeable battery 80, keeps the rechargeable battery 80 to be engaged with the battery attachment portion 60.

At the detachment direction side of the rechargeable battery 80, there may be provided a pushbutton 88 for operating the above-mentioned male hook 87 (See FIG. 4, etc.) This pushbutton 88 is connected to the male hook 87. By depressing this pushbutton 88, the male hook 87 is operated to be accommodated within the rechargeable battery 80. As a result, a state is resulted in which the rechargeable battery 80 is not engaged with the battery attachment portion 60, making it possible to detach the rechargeable battery 80 from the battery attachment portion 60.

Symbol L in FIG. 9 denotes the length in the longitudinal direction of this rechargeable battery 80. Symbol W in FIG. 9 denotes the length in the width direction of the rechargeable battery 80. Symbol H in FIG. 9 denotes the length in the height direction of the rechargeable battery 80. That is, this rechargeable battery 80 may be formed as a substantially rectangular parallelepiped shape with the relationship in size of the longitudinal length L>the width direction length W>the height direction length H.

Next, the battery attachment portion 60 to which the rechargeable battery 80 is attached through sliding will be described. As shown in FIGS. 7 and 10, the battery attachment portion 60 may be of a structure allowing attachment of the rechargeable battery 80 through sliding. That is, the battery attachment portion 60 is configured as a slide attachment type battery attachment portion suitable to the rechargeable battery 80. Thus, it has an attachment structure suitable to the rechargeable battery 80.

That is, as shown in FIGS. 7 and 10, the battery attachment portion 60 may be provided with a structure allowing the rechargeable battery 80 to be attached through sliding, and a structure allowing electrical connection of the rechargeable battery 80. As shown in FIG. 7, this battery attachment portion 60 may be provided with a pair of slide guide receiving portions 61 and 62 as the structure for slide attachment.

As shown in FIG. 10, the battery attachment portion 60 may be provided with, as the structure for electrical connection, a battery terminal connection portion 600 having a positive side terminal 63, a negative side terminal 64, and a signal side terminal 65. Further, as shown in FIG. 7, when the rechargeable battery 80 is attached through sliding for electrical connection, the rechargeable battery 80 may be locked to the battery attachment portion 60. That is, the battery attachment portion 60 is provided with a female portion (recess) 66 with which the male hook 87 of the rechargeable battery 80 in this state is engaged.

Incidentally, the arrangement positions of these two battery attachment portions 60 (60a and 60b) may be determined with respect to the motor housing 21 based on items set as follows. That is, as shown in FIGS. 6 and 8, these two battery attachment portions 60 (60a and 60b) are arranged with respect to the motor housing 21 supporting the electric motor 22 such that they are proximal to the electric motor 22.

The synthetic center of gravity X5 of the two rechargeable batteries respectively attached to the two battery attachment portions 60 (60a and 60b) may be positioned on the central line X1 (defined by the axis of the motor shaft 23) extending in the front-rear direction of the tool main body 100. In other words, these two battery attachment portions 60 (60a and 60b) are formed to have constructions that are symmetrical with respect to the central line X1 constituting the extension line of the axis of the motor shaft 23.

As shown in FIG. 6, the upper end portions of these two battery attachment portions 60 (60a and 60b) may be set substantially at the same position as the motor shaft 23. More specifically, the upper end portions of these two battery attachment portions 60 (60a and 60b) are set at positions slightly lower than the motor shaft 23. Thus, the positions where these two battery attachment portions 60 (60a and 60b) are arranged are determined on the side opposite to the reciprocating motion axis X2 of the output shaft 50 with respect to the extension line of the axis of the motor shaft 23 (the central line X1 of the tool main body 100).

The phantom line denoted by reference numeral X3 in FIG. 3 indicates an axis along which the rechargeable battery 80a is attached to the first battery attachment portion 60a through sliding. The phantom line denoted by reference numeral X4 in FIG. 3 indicates an axis along which the rechargeable battery 80b is attached to the second battery attachment portion 60b through sliding. The first and second battery attachment portions 60a and 60b are configured to have the construction of the battery attachment portion 60 described above. The attachment directions of the two rechargeable batteries 80 (80a and 80b) with respect to these two battery attachment portions 60 (60a and 60b) are set so as to extend at an angle crossing downwards from above to the direction in which the output shaft 50 reciprocates.

That is, the slide attachment direction (axis X3) of the rechargeable battery 80a with respect to the first battery attachment portion 60a may be inclined from the left upper side to the right lower side. The slide attachment direction (axis X4) of the rechargeable battery 80b with respect to the second battery attachment portion 60b may be inclined from the right upper side to the left lower side. More specifically, the slide attachment direction of the rechargeable battery 80a with respect to the first battery attachment portion 60a and the slide attachment direction of the rechargeable battery 80b with respect to the second battery attachment portion 60b alternately extend from the upper side to the lower side, and are somewhat inclined toward the center.

That is, the first battery attachment portion 60a and the second battery attachment portion 60b are configured to allow attachment of the rechargeable batteries 80a and 80b through sliding in the inclined directions that are oriented alternately obliquely downwards. Thus, as shown in FIGS. 3 and 8, the axis X3 along which the rechargeable battery 80a is attached to the first battery attachment portion 60a through sliding and the axis X4 along which the rechargeable battery 80b is attached to the second battery attachment portion 60b through sliding cross each other at a position on the lower side of the motor housing 21. The rechargeable batteries 80 (80a and 80b) attached to the first battery attachment portion 60a and the second battery attachment portion 60b can supply electric power to the electric motor 22.

In the reciprocating saw 10 according to the first embodiment, the motor housing 21 of the housing 11 constituting the external casing of the tool main body 100 is provided with two battery attachment portions 60 (60a and 60b) allowing attachment of the rechargeable batteries 80 (80a and 80b), so that when used as the reciprocating saw 10, the cutting tool can meet the demand for setting a voltage to be higher and the demand for setting a supply capacitance to be larger.

In this reciprocating saw 10, the two battery attachment portions 60a and 60b are configured as slide attachment type battery attachment portions. Therefore, the two battery attachment portions 60a and 60b can be suited for slide attachment type rechargeable batteries 80a and 80b that are attached through sliding. That is, widely used slide attachment type rechargeable batteries 80 can be used. Thus, in using as the reciprocating saw 10, it is possible to use rechargeable batteries 80 that are particularly widely used while meeting the demand for setting a voltage to be higher and the demand for setting a supply capacitance to be larger.

In the above-described reciprocating saw 10, the positions of the two battery attachment portions 60a and 60b are determined such that the synthetic center of gravity X5 of the two rechargeable batteries 80a and 80b is positioned on the central line X1 extending in the front-rear direction of the tool main body 100 (the front-rear and up-down planes including the axis of the motor shaft 23). As a result, even in the state in which the two rechargeable batteries 80a and 80b are attached, it is possible for the reciprocating saw 10 to be well-balanced in the right-left direction.

With the reciprocating saw 10 described above, the positions of the two battery attachment portions 60a and 60b are determined such that the attachment directions of the two rechargeable batteries 80a and 80b extend at an angle with respect to the reciprocating direction of the output shaft 50 so as to cross thereto downwards from above. As a result, in performing operation with the reciprocating saw 10 oriented horizontally or upwards, it is possible to inhibit the rechargeable batteries 80a and 80b attached to the battery attachment portions 60a and 60b from being detached from the battery attachment portions 60a and 60b. In this way, whatever attitude is taken for the operation, there is no fear that the gravitational force applied to the rechargeable batteries 80a and 80b acts to detach the same from the battery attachment portions 60a and 60b, making it possible to prevent detachment of the rechargeable batteries 80a and 80b from the battery attachment portions 60a and 60b.

In the above-described reciprocating saw 10, the battery attachment portions 60a and 60b are provided on the motor housing 21 supporting the electric motor 22, so that the rechargeable batteries 80a and 80b attached to the battery attachment portions 60a and 60b can also indirectly receive the cooling of the electric motor 22. That is, the rechargeable batteries 80a and 80b attached to the battery attachment portions 60a and 60b can also be cooled in accordance with the cooling of the electric motor 22, thus suppressing heat of the reciprocating saw 10 generating during the use.

Second Embodiment

Next, second and third embodiments, which are modifications of the above-described first embodiment, will be described with reference to FIGS. 11 through 22. Reciprocating saws 10A and 10B of the second and third embodiments differ from the reciprocating saw 10 of the first embodiment only in the arrangement of the battery attachment portions 60. Thus, regarding the reciprocating saws 10A and 10B of the second and third embodiments, solely the arrangement different from the battery attachment portions 60 of the reciprocating saw 10 of the first embodiment will be described; the portions that are of the same construction as those of the first embodiment are labeled with the same reference numerals, and a description thereof will be omitted.

The reciprocating saw 10A according to the second embodiment may be constructed as illustrated in FIGS. 11 through 16.

The reciprocating saw 10A of the second embodiment differs from the reciprocating saw 10 of the first embodiment in the following respects. That is, in the reciprocating saw 10 of the first embodiment, openings of the battery attachment portions 60a and 60b to which the batteries are attached through sliding are directed upwards. Thus, the rechargeable batteries 80a and 80b are attached through sliding substantially downwards from above. In contrast, in the reciprocating saw 10A of the second embodiment shown in FIGS. 11 through 16, openings of battery attachment portions 60Aa and 60Ab to which the batteries are attached through sliding are directed forwards. Therefore, the rechargeable batteries 80a and 80b are attached through sliding from the front side toward the rear side. That is, the battery attachment portions 60Aa and 60Ab of the second embodiment are provided on the motor housing 21 in such a way that the battery attachment portions 60a and 60b of the first embodiment are rotated by 90 degrees to the front side.

In the reciprocating saw 10A of the second embodiment, the axis X3 along which the rechargeable battery 80a is attached through sliding to the first battery attachment portion 60Aa and the axis X4 along which the rechargeable battery 80b is attached through sliding to the second battery attachment portion 60Ab are set to be parallel to each other. Also in the case of the reciprocating saw 10A configured according to the second embodiment, the portions configured substantially in the same manner as in the reciprocating saw 10 according to the first embodiment can provide substantially the same operations and advantages.

Further, with this reciprocating saw 10A, it is possible to reduce the bulkiness in the right-left width of the reciprocating saw 10A to which the rechargeable batteries 80a and 80b are attached. Further, end edge portions (indicated by reference numerals 891 and 892) of the rechargeable batteries 80a and 80b attached to battery attachment portions 60Aa and 60Ab may define an imaginary seating surface (indicated by reference numeral 893) for allowing the support on the surface. In this way, it is possible to arrange the imaginary seating surface 893 so as to be supported by the placing surface, making it possible to place on the surface the reciprocating saw 10A with the rechargeable batteries 80a and 80b attached thereto.

Third Embodiment

Next, the third embodiment will be described. The reciprocating saw 10B according to the third embodiment may be constructed as shown in FIGS. 17 through 22.

The reciprocating saw 10B according to the third embodiment differs from the reciprocating saw 10 of the second embodiment in the orientation in which the rechargeable batteries 80a and 80b are attached to battery attachment portions 60Ba and 60Bb through sliding. More specifically, lower surfaces 800a and 800b of the rechargeable batteries 80a and 80b attached to the battery attachment portions 60Aa and 60Ab of the second embodiment extend in directions inclined with respect to the right-left direction of the tool main body 100B.

In contrast, the lower surfaces 800a and 800b of the rechargeable batteries 80a and 80b attached to the battery attachment portions 60Ba and 60Bb of the third embodiment extend in a direction in conformity with the right-left direction of the tool main body 100B. That is, as shown in FIGS. 17 through 22, the positions of the two battery attachment portions 60Ba and 60Bb are set such that the lower surfaces 800a and 800b of the two rechargeable batteries 80a and 80b attached to the two battery attachment portions 60Ba and 60Bb through sliding are within the same plane. Thus, the lower surfaces 800a and 800b of the two rechargeable batteries 80a and 80b attached to the two battery attachment portions 60B a and 60Bb through sliding define common lower surfaces 800c as a result of being within the same plane.

The common lower surface 800c (800a and 800b) of the two rechargeable batteries 80a and 80b thus attached through sliding is also set to be within the same plane as the handle end portion 33 constituting the lower end of the handle portion 13. Also in the battery attachment portions 60Ba and 60Bb according to the third embodiment, the rechargeable batteries 80a and 80b are set so as to be attached through sliding from the front side toward the rear side. Further, the axis X3 along which the rechargeable battery 80a is attached to the first battery attachment portion 60Ba through sliding and the axis X4 along which the rechargeable battery 80b is attached to the first battery attachment portion 60Bb through sliding are set to be parallel to each other.

Also in the case where the reciprocating saw 10B is configured as in the third embodiment, it is possible to achieve substantially the same operations and effects regarding the portions formed in substantially the same way as those of the reciprocating saw 10 of the above-described first embodiment. Further, in this reciprocating saw 10B, the positions of the two battery attachment portions 60Ba and 60Bb are set such that the lower surfaces 800a and 800b of the two rechargeable batteries 80a and 80b are within the same plane. As a result, the lower surfaces 800a and 800b of the two rechargeable batteries 80a and 80b are within the same plane so as to define the common lower surfaces 800c, making it possible to place the reciprocating saw 10 on the placing surface with the common lower surfaces facing the same. Further, the common lower surfaces 800c (800a and 800b) of the two rechargeable batteries 80a and 80b are also within the same plane as the handle end portion 33 constituting the lower end of the handle portion 13, so that they can be also supported by the lower end of the tool main body 100B itself, making it possible to place the reciprocating saw 10B on the placing surface in a stable fashion.

Fourth Embodiment

Next, fourth and fifth embodiments differing from the first through third embodiments described above will be described with reference to FIGS. 23 through 33. As compared with the reciprocating saws 10, 10A and 10B of the first through third embodiments, reciprocating saws 10C and 10D of the fourth and fifth embodiments described below are devised such that the right-left width of the reciprocating saw may be small even in the state in which the rechargeable batteries 80a and 80b have been attached through sliding.

That is, the reciprocating saw 10C and 10D of the fourth and fifth embodiments differs from the reciprocating saws 10 to 10B of the first through third embodiments in that the two battery attachment portions 60C(60Ca, 60Cb) and 60D (60Da, 60Db) are arranged so as to be displaced in the front-rear direction of the tool main body 100. The reciprocating saw 10c of the fourth embodiment may be constructed as shown in FIGS. 23 through 27.

In the reciprocating saw 10C according to the fourth embodiment, the first battery attachment portion 60Ca is arranged at the lower connection portion 15 of the grip housing 12.

The second battery attachment portion 60Cb is arranged at a lower extension portion 38 on the lower side of the motor housing 21. This lower extension portion 38 is arranged so as to extend on the lower side of the motor housing 21. As compared with the rechargeable battery 80b attached to the second battery attachment portion 60Cb, the rechargeable battery 80a attached to the first battery attachment portion 60Ca is set to be arranged on the lower side of the tool main body 100C. Here, the axis X3 along which the rechargeable battery 80a is attached to the first battery attachment portion 60Ca and the axis X4 along which the rechargeable battery 80b is attached to the second battery attachment portion 60Cb are set to be parallel to each other.

The directions in which the rechargeable batteries 80a and 80b are attached to the first and second battery attachment portions 60Ca and 60Cb through sliding are both from the front side toward the rear side of the tool main body 100C. Therefore, the rechargeable batteries 80a and 80b cannot be attached to the two battery attachment portions 60Ca and 60Cb unless the rechargeable battery 80a is first attached to the first battery attachment portion 60Ca through sliding, and the rechargeable battery 80b is thereafter attached to the second battery attachment portion 60Cb through sliding.

In the case of the reciprocating saw 10C configured as in this fourth embodiment, two battery attachment portions 60Ca and 60Cb allowing attachment of the rechargeable batteries 80a and 80b are arranged at the housing 11 constituting the external casing of the tool main body 100C, and therefore, in using the reciprocating saw 10C, it is possible to meet the demand for setting a voltage to be higher and the demand for setting a supply capacitance to be larger. Further, in this reciprocating saw 10C, the two battery attachment portions 60Ca and 60Cb are configured as slide attachment type battery attachment portions, and therefore, the two battery attachment portions 60Ca and 60Cb are suited to the slide attachment type rechargeable batteries 80a and 80b that are attached through sliding. That is, it is possible to use the slide attachment type rechargeable batteries 80 widely used.

Therefore, in using the reciprocating saw 10C, it is possible to use the rechargeable batteries 80 that are particularly widely used while meeting the demand for setting a voltage to be higher and the demand for setting a supply capacitance to be larger. Further, the two battery attachment portions 60Ca and 60Cb for attaching the two rechargeable batteries 80a and 80b through sliding are arranged so as to be displaced in the front-rear direction of the tool main body 100, so that it is possible to reduce the right-left width of the entire reciprocating saw 10C, making it possible to enhance the convenience for the operation in a narrow space.

Fifth Embodiment

Next, the reciprocating saw 10D according to the fifth embodiment which is a modification of the reciprocating saw 10C of the above-described fourth embodiment will be described. The reciprocating saw 10D according to the fifth embodiment may be configured as shown in FIGS. 28 through 33.

The reciprocating saw 10D of the fifth embodiment differs from the reciprocating saw 10D of the fourth embodiment described above in the position where a second battery attachment portion 60Db is arranged. That is, the second battery attachment portion 60Cb of the reciprocating saw 10C of the fourth embodiment is arranged at the lower side extension portion 38 on the lower side of the motor housing 21. In contrast, the second battery attachment portion 60Db of the reciprocating saw 10D of the fifth embodiment is arranged at the front side extension portion 39 of the grip housing 12 of a tool main body 100D.

The second battery attachment portion 60Db is arranged at the front surface portion of the front side extension portion 39. With this second battery attachment portion 60Db, the rechargeable battery 80b is attached through sliding from the lower side toward the upper side. In the case where the rechargeable battery 80b is attached through sliding to the second battery attachment portion 60Db arranged at the front side extension portion 39, the battery may be arranged on the lower side the motor housing 21. Further, the first battery attachment portion 60Da is set such that the direction in which the battery is attached through sliding is opposite to that in the case of the first battery attachment portion 60Ca of the reciprocating saw 10C of the fourth embodiment.

That is, for the first battery attachment portion 60Da of the reciprocating saw 10D of the fifth embodiment, the rechargeable battery 80a is attached through sliding from the rear side toward the front side. Even in the case where the reciprocating saw 10D is configured as in the case of the fifth embodiment, it is possible to achieve substantially the same operations and effects as those in the reciprocating saw 10C regarding the portions formed substantially in the same way as in the fourth embodiment. Moreover, as compared with the case where the reciprocating saw 10C is configured as in the fourth embodiment, in the case where the reciprocating saw 10D is configured as in the fifth embodiment, it is possible to reduce the bulkiness of the front side portion, so that it is possible to further enhance the convenience for the operation in a narrow space.

Sixth Embodiment

Next, a sixth embodiment of the present invention will be described. A reciprocating saw 10E of the sixth embodiment differs from the reciprocating saw 10 of the first embodiment only in the arrangement construction of the battery attachment portions 60. Therefore, regarding the reciprocating saw 10E of the sixth embodiment described below, only the arrangement construction different from the battery attachment portions 60 of the first reciprocating saw 10 of the first embodiment will be described; portions of the same construction as those of the first embodiment are labeled with the same reference numerals, and a description thereof will be omitted.

The reciprocating saw 10E of the sixth embodiment may be constructed as shown in FIGS. 34 through 39.

The reciprocating saw 10E of the sixth embodiment differs from the reciprocating saw 10 of the first embodiment in the following respect. That is, in the reciprocating saw 10 of the first embodiment described above, the battery attachment portions 60a and 60b are arranged at the lower portion of the motor housing 21. In contrast, in the reciprocating saw 10E of the sixth embodiment shown in FIGS. 34 through 39, battery attachment portions 60Ea and 60Eb are arranged at the upper portion of the tool main body 100E.

That is, the arrangement positions of the two battery attachment portions 60Ea and 60Eb are set on the side opposite the center of gravity X6 of a tool main body 100E with the rechargeable batteries 80 (80a and 80b) removed therefrom, with respect to the reciprocating motion axis X2 along which the output shaft 50 reciprocates. More specifically, the first battery attachment portion 60Ea is arranged at the upper surface of the upper connection portion 14 of the grip housing 12. The first battery attachment portion 60Ea is configured so as to allow the rechargeable battery 80a to be attached through sliding from the rear side toward the front side.

The second battery attachment portion 60Eb is arranged at the upper surface of the motor housing 21. The second battery attachment portion 60Eb is configured so as to allow the rechargeable battery 80b to be attached through sliding from the front side toward the rear side. When the two rechargeable batteries 80a and 80b are attached through sliding to the two battery attachment portions 60Ea and 60Eb constructed as described above, the two rechargeable batteries 80a and 80b are arranged at the upper surface of the tool main body 100E.

The lower surfaces 800a and 800b of the rechargeable batteries 80a and 80b thus attached to the battery attachment portions 6Ea and 60Eb extend relative to each other along directions in conformity with the right-left direction determined by the tool main body 100E. That is, as shown in FIGS. 34 through 39, the positions of the two battery attachment portions 60Ea and 60Eb are set such that the lower surfaces 800a and 800b of the two rechargeable batteries 80a and 80b attached to the two battery attachment portions 60Ea and 60Eb through sliding are within the same plane. Thus, the lower surfaces 800a and 800b of the two rechargeable batteries 80a and 80b respectively attached to the two battery attachment portions 60Ea and 60Eb through sliding may define common lower surfaces 800c that are within the same plane.

Also in the case that the reciprocating saw 10E is configured as in the sixth embodiment, it is possible to achieve substantially the same operations and effects regarding the portions configured substantially in the same way as in the reciprocating saw 10 of the first embodiment. Further, in this reciprocating saw 10E, the position X7 of the center of gravity of the two rechargeable batteries 80a and 80b attached to the two battery attachment portions 60Ea and 60Eb is set on the side opposite the position X6 of the center of gravity of the tool main body 100E with the rechargeable batteries 80a and 80b removed therefrom, with respect to the reciprocating motion axis X2 along which the output shaft 50 reciprocates. As a result, it is possible to set the position of the center of gravity of the entire reciprocating saw 10E with the two rechargeable batteries 80a and 80b attached to the two battery attachment portions 60Ea and 60Eb, to be close to the reciprocating motion axis X2 along which the output shaft 50 reciprocates. Thus, it is possible to bring the position of the center of gravity of the entire reciprocating saw 10E with the two rechargeable batteries 80a and 80b attached thereto, to be close to the reciprocating motion axis X2 along which the output shaft 50 having undergone conversion by the crank mechanism 42 reciprocates.

As a result, it is possible to suppress fluttering of the reciprocating output shaft 50 generated during cutting of the workpiece to cut. Thus, it is possible to provide a cutting tool improved in terms of the feeling of use (easiness of handling) for the user. Further, in this reciprocating saw 10E, the positions of the two battery attachment portions 60Ea and 60Eb are set such that the lower surfaces 800a and 800b of the two rechargeable batteries 80a and 80b are within the same plane. As a result, the lower surfaces 800a and 800b of the two rechargeable batteries 80a and 80b are within the same plane so as to define common lower surfaces 800c, and it is possible to place the reciprocating saw 10E with the common lower surfaces 800c facing the placing surface.

Seventh Embodiment

Next, a seventh embodiment of the present invention will be described. The reciprocating saw 10F of the seventh embodiment differs from the reciprocating saw 10 of the first embodiment only in the arrangement construction of the battery attachment portions 60. Therefore, regarding the reciprocating saw 10F of the seventh embodiment described below, only the arrangement construction different from the battery attachment portions 60 will be described; portions that are of the same construction as the first embodiment described above are labeled with the same reference numerals, and a description thereof will be omitted.

The reciprocating saw 10F according to the seventh embodiment may be constructed as shown in FIGS. 40 through 45. The reciprocating saw 10F according to the seventh embodiment differs from the reciprocating saw 10 of the first embodiment in the following respect.

That is, in the reciprocating saw 10 of the first embodiment described above, the battery attachment portions 60a and 60b are arranged at the lower portion of the motor housing 21. In contrast, in the reciprocating saw 10F of the seventh embodiment shown in FIGS. 40 through 45, battery attachment portions 60Fa and 60Fb are arranged at the lower connection portion 15 of the grip housing 12. Further, in the reciprocating saw 10F of the seventh embodiment, openings of the battery attachment portions 60Fa and 60Fb are directed forward and are arranged side by side. Thus, the rechargeable batteries 80a and 80b are attached through sliding from the front side toward the rear side.

In this way, the rechargeable batteries 80a and 80b attached to the battery attachment portions 60Fa and 60Fb through sliding are arranged side by side as shown in the drawings. That is, as in the case of the reciprocating saw 10B of the third embodiment, the lower surfaces 800a and 800b extend side by side in the right-left direction of the tool main body 100F. More specifically, the positions of the two battery attachment portions 60Fa and 60Fb are set such that the lower surfaces 800a and 800b of the two rechargeable batteries 80a and 80b attached to the two battery attachment portions 60Fa and 60Fb through sliding are within the same plane. As a result, the lower surfaces 800a and 800b of the two rechargeable batteries 80a and 80b define common lower surfaces 800c that are within the same plane.

An intermediation rubber 40 may be arranged between a front end portion 121 of the grip housing 12 and a rear end portion 211 of the motor housing 21. This intermediation rubber 40 may be formed of a resin rubber exhibiting elastic restorability and corresponds to an elastic member according to the present disclosure. This intermediation rubber 40 may be arranged over the entire circumference of the front end portion 121 of the grip housing 12. This intermediation rubber 40 is arranged so as to connect the front end portion 121 of the grip housing 12 and the rear end portion 211 of the motor housing 21. The front end portion 121 of the grip housing 12 corresponds to the front side portion of the grip housing of the present disclosure. The rear end portion 211 of the motor housing 21 corresponds to the rear side portion of the motor housing of the present disclosure.

Also in the case where the reciprocating saw 10F is configured as in this second embodiment, regarding the portions formed substantially the same way as in the reciprocating saw 10 of the first embodiment, it is possible to achieve substantially the same operations and effects. Further, in this reciprocating saw 10F, the grip housing 12 is provided with two battery attachment portions 60F (60Fa and 60Fb) to which the rechargeable batteries 80 (80a and 80b) can be attached, so that the two rechargeable batteries 80a and 80b can be respectively attached to the two battery attachment portions 60Fa and 60Fb. As a result, it is possible to increase the weight of the grip housing 12 having the handle portion 13, so that the vibrations generated by the reciprocation of the output shaft 50 are inhibited so as not to be easily transmitted to the handle portion 13. Thus, the reciprocating saw 10F is reduced in vibrations and improved in terms of the feeling of use for the user.

Further, in this reciprocating saw 10F the intermediation rubber 40 is arranged between the front end portion 121 of the grip housing 12 and the rear end portion 211 of the motor housing 21 to which the front end portion 121 of the grip housing 12 is connected. Therefore, if the vibrations generated by the reciprocating motion of the output shaft 50 are transmitted to the handle portion 13, it is necessary that the vibrations are transmitted via the intermediation rubber 40. Here, the intermediation rubber 40 has the function of buffering the vibrations transmitted to the handle portion 13. Thus, the reciprocating saw 10F is reduced in vibrations and improved in terms of the feeling of use for the user. Further, in this reciprocating saw 10F, the lower surfaces 800a and 800b of the two rechargeable batteries 80a and 80b are within the same plane, thus defining common lower surfaces 800c within the same plane. Therefore, it is possible to place the reciprocating saw 10F, with the common lower surfaces 800c facing the placing surface.

Eighth Embodiment

Next, an eighth embodiment of the present invention will be described. A reciprocating saw 10H of the eighth embodiment differs from the reciprocating saw 10F of the above-described seventh embodiment only in the arrangement construction of the battery attachment portions 60. Thus, regarding the reciprocating saw 10H of the eighth embodiment described below, only the arrangement construction different from the battery attachment portions 60 of the reciprocating saw 10F of the seventh embodiment will be described; portions of the same construction as those of the seventh embodiment are labeled with the same reference numerals, and a description thereof will be omitted.

The reciprocating saw 10H of the eighth embodiment may be constructed as shown in FIGS. 46 through 51.

The reciprocating saw 10H of the eighth embodiment differs from the reciprocating saw 10F of the seventh embodiment in the attachment directions of the rechargeable batteries 80 with respect to the battery attachment portions 60H. In the eighth embodiment, the attachment directions of the rechargeable batteries 80 with respect to the battery attachment portions 60H are set to the width direction of a tool main body 100H. That is, the attachment directions of the two rechargeable batteries 80a and 80b with respect to the two battery attachment portions 60Ha and 60Hb are set to the width direction (the right-left direction) of the tool main body 100H, i.e., a direction crossing the reciprocating direction (the front-rear direction) of the output shaft 50, and crossing the direction in which the grip housing 12 extends (the up-down direction).

Figure 52:
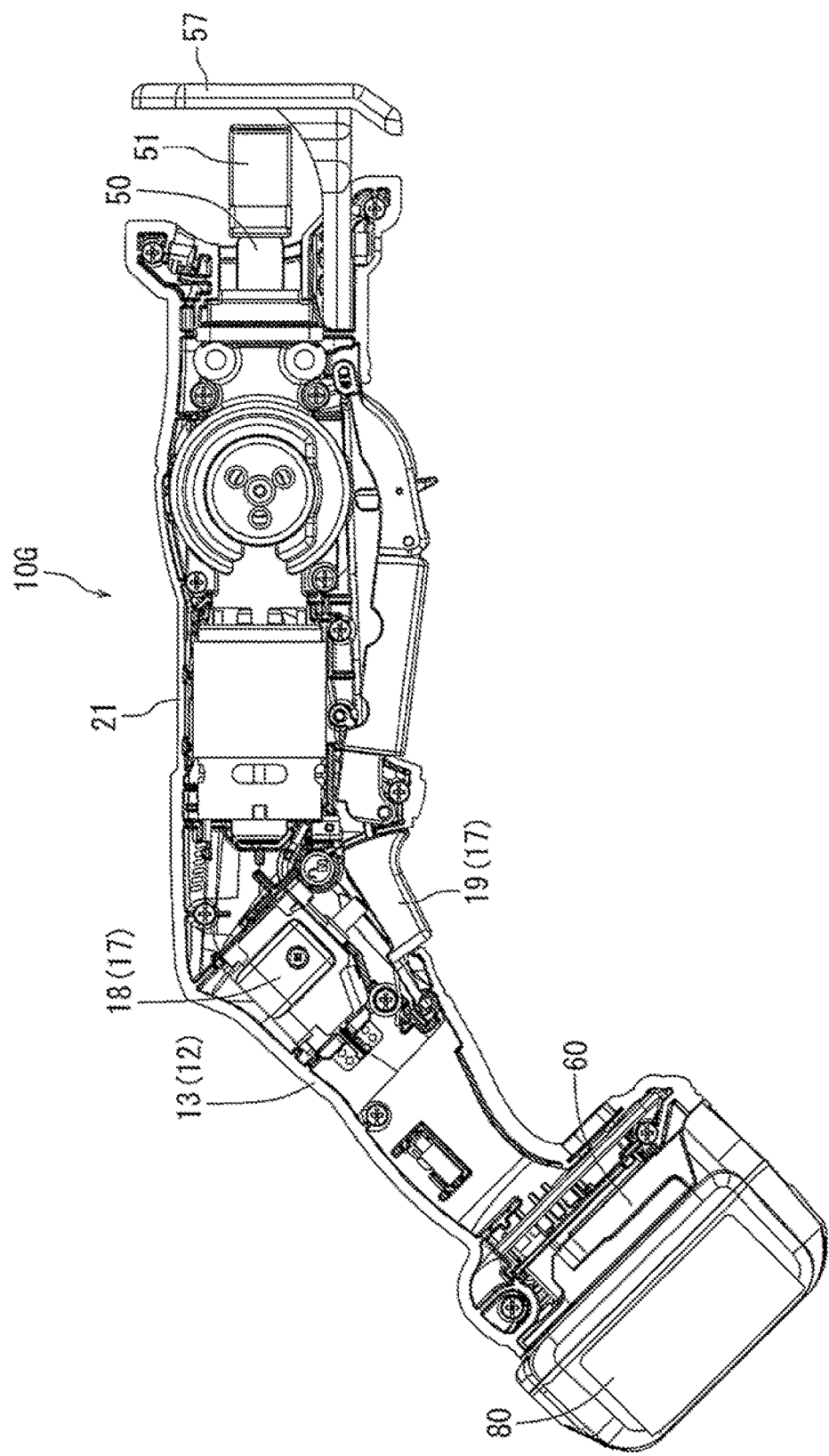
FIG. 52 is a sectional view of a reciprocating saw to which the present invention is applicable.

As in the case of the battery attachment portions 60H of the eighth embodiment, similar to the battery attachment portions 60F of the seventh embodiment described above, the two battery attachment portions 60Ha and 60Hb are arranged at the lower connection portion 15 of the grip housing 12. Further, the two battery attachment portions 60Ha and 60Hb are arranged across the vertical center plane extending in the front-rear direction of the tool main body 100H. Further, regarding the direction in which the grip housing of the reciprocating saw of the present disclosure extends, a direction orthogonal to the reciprocating direction (the front-rear direction) of the output shaft 50 of the reciprocating saw 10H is included; additionally, a direction set oblique to the reciprocating direction (the front-rear direction) of the output shaft 50 of a reciprocating saw 10G shown in FIG. 52 is included. Here, the width direction of the tool main body is set as a direction extending along the right-left direction crossing the front-rear direction.

Figure 46:
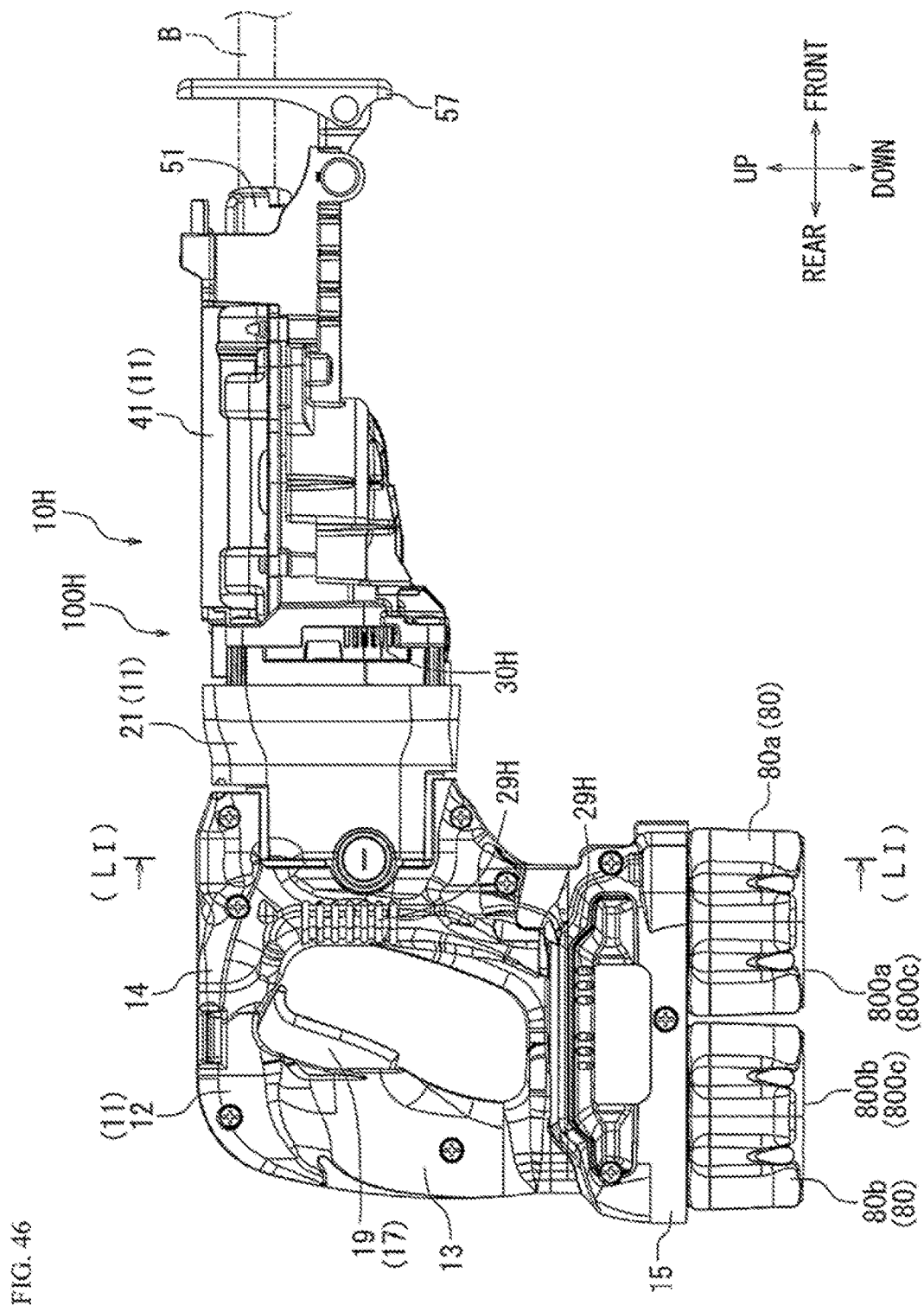
FIG. 46 is a side view illustrating the external appearance, as seen from the right side, of a reciprocating saw according to an eighth embodiment.
Figure 47:
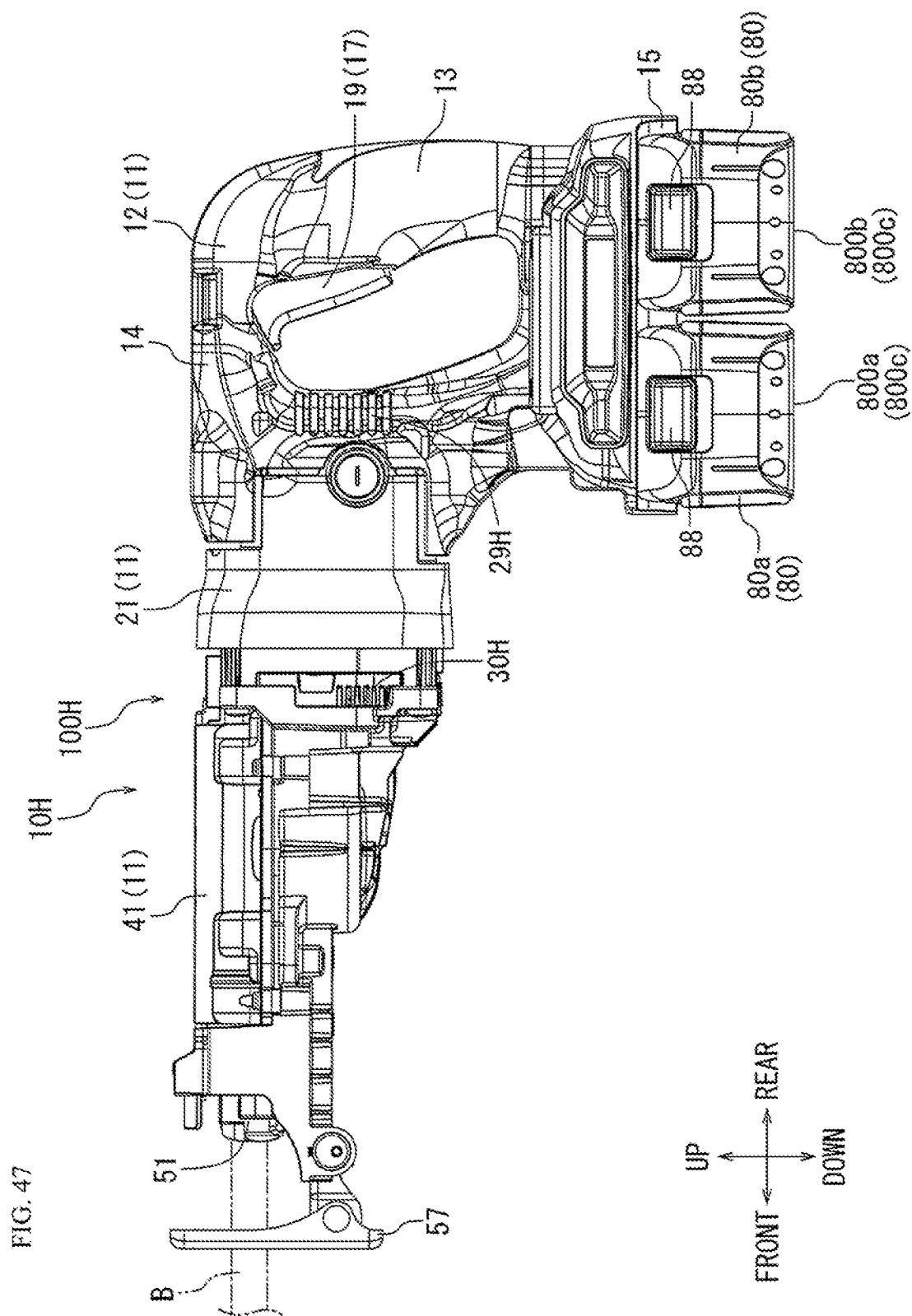
FIG. 47 is a side view illustrating the external appearance, as seen from the left side, of the reciprocating saw shown in FIG. 46.
Figure 48:
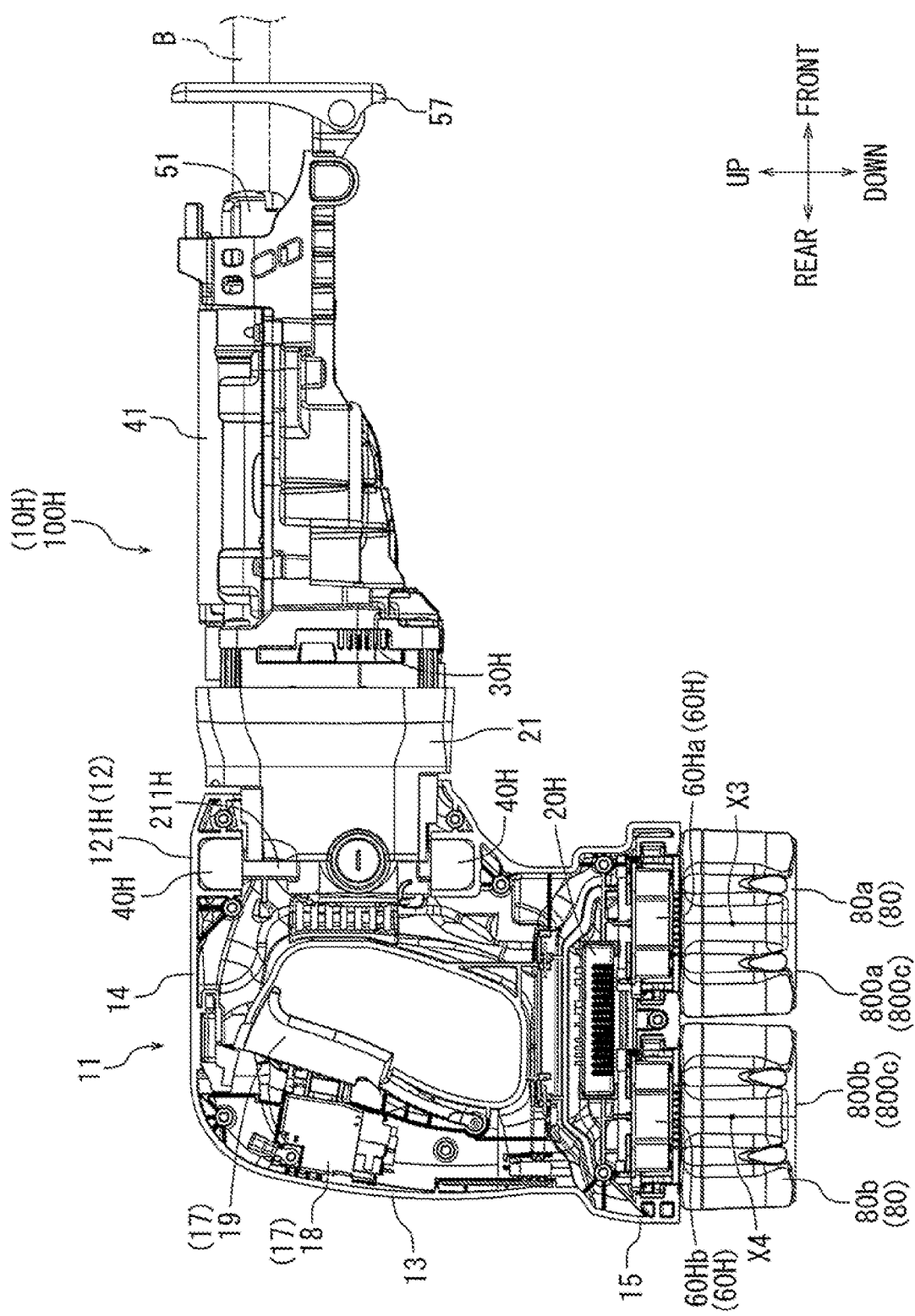
FIG. 48 is a side view of the reciprocating saw of FIG. 46 with a grip housing removed therefrom.

For the two battery attachment portions 60Ha and 60Hb of the eighth embodiment, the attachment directions of the two rechargeable batteries 80a and 80b are the same direction. More specifically, openings of the two battery attachment portions 60Ha and 60Hb to which the batteries are attached through sliding are set to be directed to the left and parallel to each other. Thus, as shown in FIGS. 46 and 47, the two rechargeable batteries 80a and 80b are attached to the two battery attachment portions 60Ha and 60Hb through sliding from the left-hand side to the right-hand side.

The rechargeable batteries 80a and 80b thus attached to the battery attachment portions 60Ha and 60Hb through sliding are arranged in parallel as shown in the drawings. Therefore, the lower surfaces 800a and 800b extend side by side in a direction in conformity with the front-rear direction of the tool main body 100H. That is, the positions of the two battery attachment portions 60Ha and 60Hb are set such that the lower surfaces 800a and 800b of the two rechargeable batteries 80a and 80b attached to the two battery attachment portions 60Ha and 60Hb through sliding are also within the same plane as in the seventh embodiment described above. As a result, the lower surfaces 800a and 800b of the two rechargeable batteries 80a and 80b define the common lower surfaces 800c that are within the same plane.

Figure 49:
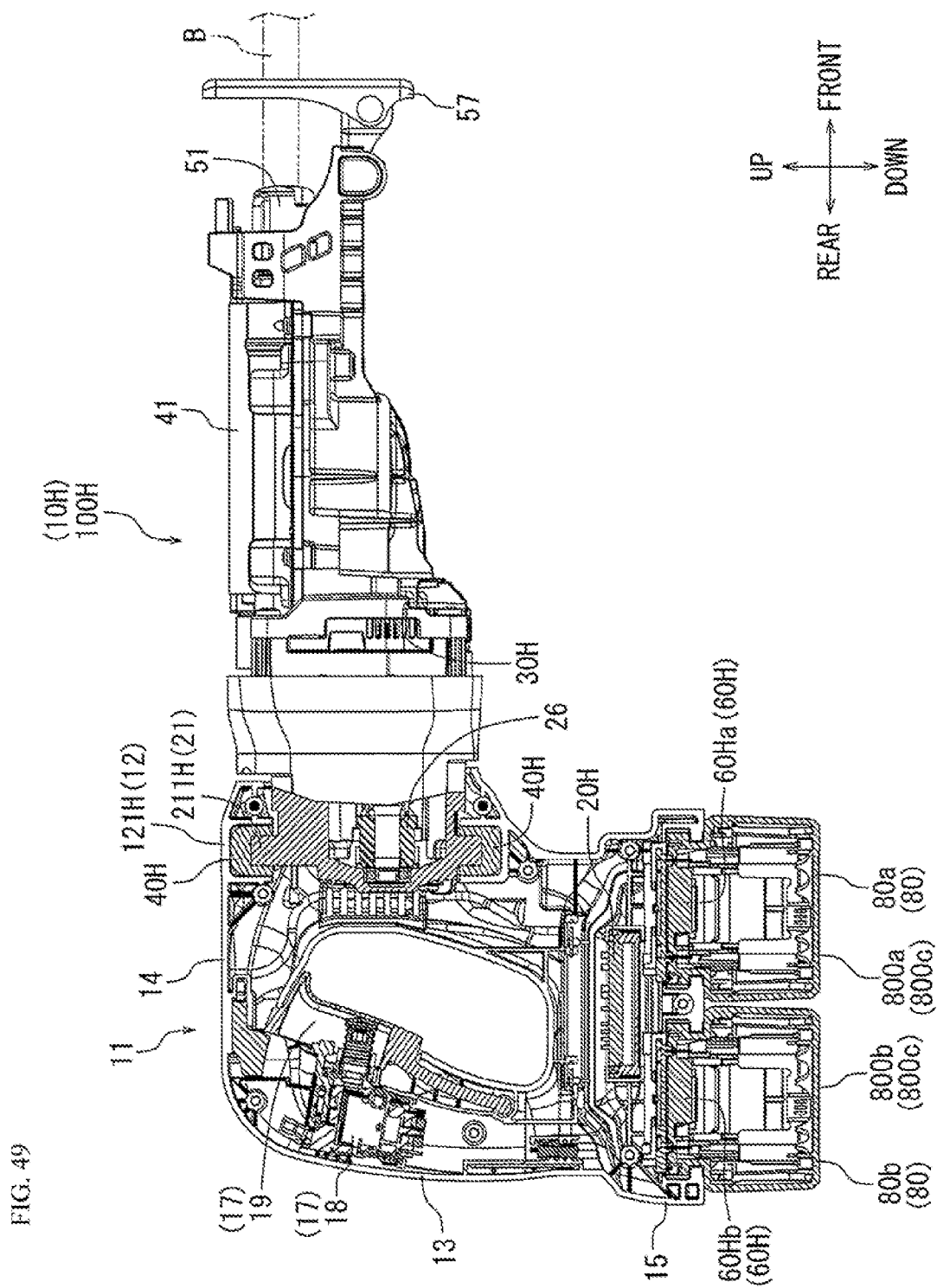
FIG. 49 is a sectional view of the reciprocating saw of FIG. 46 taken along the center axis thereof.
Figure 50:
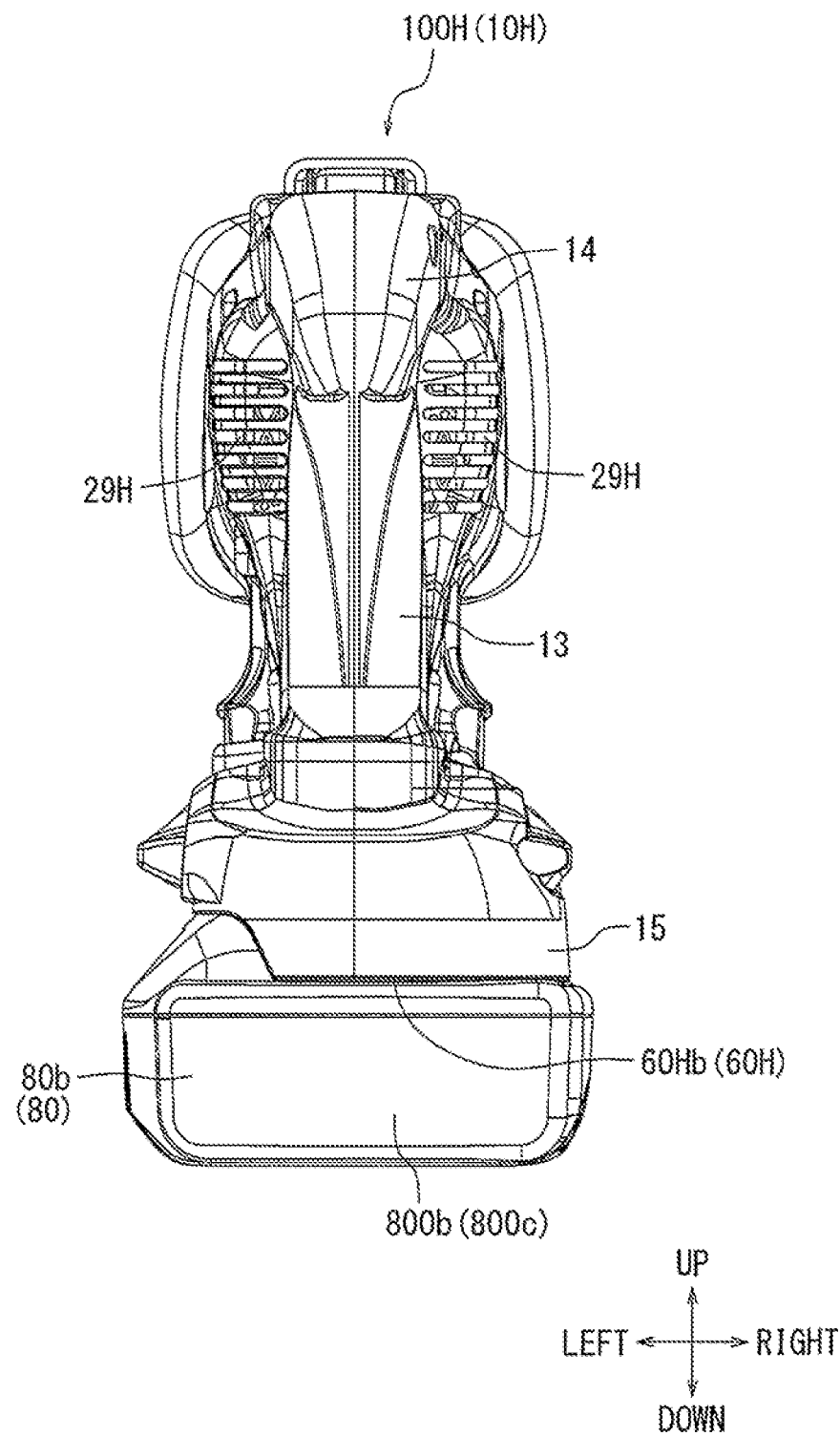
FIG. 50 is a view of the reciprocating saw of FIG. 46 as seen from the rear side.

As shown in FIGS. 49 and 51, intermediation rubbers 40H may be arranged between a front end portion 121H of the grip housing 12 and a rear end portion 211H of the motor housing 21. Also these intermediation rubbers 40H are formed of a resin rubber exhibiting elastic restorability as in the seventh embodiment described above, and correspond to the elastic member of the present disclosure. These intermediation rubbers 40H are arranged at the upper and lower positions of the interior of the grip housing 12 so as to fill the spaces formed between the front end portion 121H of the grip housing 12 on the outer circumferential side and the rear end portion 211H of the motor housing 21 on the inner circumferential side.

The front end portion 121H of the grip housing 12 corresponds to the front side portion of the grip housing according to the present disclosure. The rear end portion 211H of the motor housing 21 corresponds to the rear side portion of the motor housing according to the present disclosure. The lower connection portion 15 positioned at the lower portion of the grip housing 12 accommodates a controller 20H. This controller 21H controls the electric power supplied to the electric motor 22. Further, the lower connection portion 15 of the grip housing 12 near the controller 20H is provided with air inlet holes 29H through which air is drawn inwardly from the exterior. In the drawings, reference numeral 30H denotes air discharge openings for discharging air to the exterior. The lower connection portion 15 may be configured as a molded product that is integral with the grip housing 12 as in the examples shown in the drawings; or it may be a separate molded product from the grip housing 12.

Also in the case where the reciprocating saw 10H is configured as in the eighth embodiment, regarding the portions formed in the same way as in the case of the reciprocating saws 10 and 10F according to the first and seventh embodiments, it is possible to achieve substantially the same operations and effects. For example, in the case of the reciprocating saw 10H, the battery attachment portions 60Ha and 60Hb are arranged at the lower portion of the grip housing 12, so that it is possible to increase the weight of the grip housing 12 having the handle portion 13 as compared with the known art. As a result, in the case that vibrations are transmitted from the gear housing 41 side to the handle portion 13 side, the vibrations of the grip housing 12 caused by the transmission of the vibrations can be suppressed by the weight of the grip housing 12. That is, the reciprocating saw 10H is reduced in vibrations and improved in terms of the feeling of use for the user.

In particular, in the case where a spring member (elastic member) is arranged between the gear housing 41 and the handle portion 13, it is possible to set the spring constant of the spring member to relatively high by increasing the weight of the grip housing 12. This helps to bring the handle portion 13 and the gear housing 41 into the state of being integrated with each other, making it possible to enhance the ease of handling (the feeling of use) of the reciprocating saw 10H. Since the vibrations generated through the reciprocation of the output 50 are transmitted to the handle portion 13 via the intermediation rubber 40H, it is possible to buffer the vibrations transmitted to the handle portion 13 by the elasticity of the intermediation rubber 40. Thus, the reciprocating saw 10H is reduced in vibrations and improved in terms of the feeling of use for the user.

In this reciprocating saw 10H, the rechargeable batteries 80*a* and 80*b* are attached in the right-left direction (width direction) of the tool main body 100H, so that it is possible to arrange the two rechargeable batteries 80*a* and 80*b* side by side in the direction in which the tool main body 100H extends (front-rear direction). As shown in the drawings, the tool main body 100H is configured so as to extend in the front-rear direction, which is the reciprocating direction of the output shaft 50. Therefore, the side-by-side arrangement of the two rechargeable batteries 80*a* and 80*b* can suppress the bulkiness in the right-left direction (width direction) of the reciprocating saw 10H, making it easier to perform a cutting operation in a narrow space and to maintain the maneuverability of the tool.

Further, because the attachment directions of the two rechargeable batteries 80*a* and 80*b* cross the vibrating direction of the tool main body 100H, it is possible to enhance the effect of preventing detachment of the two rechargeable batteries 80*a* and 80*b* after attachment. Further, in this reciprocating saw 10H, both the two rechargeable batteries 80 are attached in the same direction, i.e., from the left-hand side to the right-hand side, so that it is possible to attach the two rechargeable batteries 80*a* and 80*b* at once in one direction. Conversely, because both the two rechargeable batteries 80 are detached in the same direction, i.e., from the right-hand side to the left-hand side, it is possible to detach the two rechargeable batteries 80*a* and 80*b* at once in one direction. Therefore, the operation for attaching or detaching the two rechargeable batteries can be easily performed to provide convenience.

The attaching directions of the two rechargeable batteries 80*a* and 80*b* may be set to directions that are opposite to the directions in this embodiment and that are those from the right-hand side to the left-hand side; or they may be set to directions opposite to each other. Further, in this reciprocating saw 10H, the two rechargeable batteries 80*a* and 80*b* attached to the two battery attachment portions 60Ha and 60Hb are arranged so as to be astride the center line extending in the front-rear direction of the tool main body 100H. As a result, it is possible for the weight of the rechargeable batteries 80 attached to the battery attachment portions 60H to be well-balanced in the right-left direction of the tool main body 100H, making it possible to maintain the maneuverability of the tool.

The cutting tool according to the present disclosure may not be limited to the reciprocating saw described above. That is, the cutting tool according to the present disclosure may include the above embodiments of the cutting tools with appropriate modifications as long as they are hand-held type cutting tools used for cutting operation while held by hand. Further, the constructions for the slide attachment of the first and second rechargeable batteries in the above embodiments may not be limited for attachment in the direction as shown in the drawings; they may be set for directions opposite to the directions shown in the drawings; further, they may be set for any of combinations in directions including directions that are the same and directions opposite to each other.

The intermediation rubber 40 of the above embodiment is arranged over the entire circumference of the front end portion 121 of the grip housing 12. However, the elastic member according to the present disclosure may not be limited to this embodiment, and may be that arranged at at least a portion of the space between the front side portion of the grip housing and the rear side portion of the motor housing to which the front side portion of the grip housing is connected. Further, the cutting tool of the present invention may not be limited to such types of reciprocating saws as the reciprocating saws 10 through 10F of the above-described embodiments; the present invention may be applied to the reciprocating saw 10G of the type as shown in FIG. 52. In the drawing, the portions of the same functions as the above-described embodiments are labeled with the same reference numerals.

The rechargeable batteries 80*a* and 80*b* of the above-described embodiments are set to have a voltage of 18 V. However, the voltage of the rechargeable batteries according to the present disclosure may not be limited to this voltage; it is also possible to utilize rechargeable batteries (secondary batteries) designed for appropriate voltages such as 10 V and 14 V. The electric power supplied from the two rechargeable batteries 80*a* and 80*b* may be used not only for increasing the voltage but also for increasing the supply capacitance (total recharging amount). That is, the present disclosure may not be limited to a construction for increasing the voltage of the electric power supplied from the rechargeable batteries 80; it may be suitably constructed to increase the supply capacitance of the electric power supplied from the rechargeable batteries 80.

The invention claimed is:
1. A cutting tool comprising:
a tool main body including:
an output shaft configured to be capable of mounting a cutting blade thereto, wherein the output shaft protrudes from a front end of the tool main body;
an electric motor configured to rotatably drive a motor shaft with a supply of power from a rechargeable battery,
a reciprocation converting mechanism configured to convert the rotation of the motor shaft to a reciprocating motion of the output shaft, so that the cutting blade mounted to the output shaft cuts a workpiece as the output shaft reciprocates;

wherein the tool main body includes a rear portion that connects with a loop-shaped grip housing including a loop-shaped handle portion to be grasped by hand;

wherein the grip housing includes a lower connection portion that connects a lower portion of the handle portion to the rear portion of the tool main body;

two battery attachments portions disposed at the lower connection portion of the grip housing;

wherein each of the two battery attachment portions is configured as a slide-attaching type attachment portion to allow attachment of a slide-type rechargeable battery through sliding;

wherein the two battery attachment portions are arranged on opposite sides with respect to a central plane of the tool main body, the central plane including a plane within which the cutting blade reciprocates; and wherein an attaching direction of the rechargeable battery to each of the two battery attachment portions is set in a direction from a front side to a rear side along the central plane of the tool main body, and wherein an air inlet hole is formed in the grip housing for introducing a cooling air for the electric motor.

2. The cutting tool according to claim 1, wherein the lower connecting portion of the grip portion including the two battery attachment portions is disposed on a lower side of both of the motor shaft and the output shaft.

3. The cutting tool according to claim 1, wherein:
each of the two battery attachment portions is configured such that the battery is attached as the battery is slid in a direction parallel to the output shaft or the motor shaft.

4. The cutting tool according to claim 1, wherein:
the grip housing further comprises an upper connection portion that protrudes forward from an upper portion of the handle portion; and
the upper connection portion is connected to a motor housing of the tool main body, the motor housing supporting the electric motor.

5. The cutting tool according to claim 1, further comprising a controller configured to control an electric power supplied to the electric motor, wherein the controller is disposed within the grip housing.

6. A cutting tool comprising:
a tool main body including:
an output shaft configured to be capable of mounting a cutting blade there to, wherein the output shaft protrudes from a front end of the tool main body;
an electric motor configured to rotatably drive a motor shaft with a supply of power from a rechargeable battery,
a reciprocation converting mechanism configured to convert the rotation of the motor shaft to a reciprocating motion of the output shaft in a front-to-rear direction, so that the cutting blade mounted to the output shaft cuts a workpiece as the output shaft reciprocates; and
a housing forming an outer casing of the tool main body and including two battery attachment portions each allowing attachment of the rechargeable battery;
wherein the housing comprises:
a motor housing configured to support the electric motor such that the motor housing comprises only housing immediately surrounding the motor; and
a grip housing disposed on a rear side of the motor housing and only including a handle portion to be grasped by hand, wherein the motor housing does not extend to the grip housing;

wherein at least one battery attachment portion of the two battery attachment portions is arranged at the motor housing.

7. The cutting tool according to claim 6, wherein:
the two battery attachment portions comprise a first attachment portion disposed at the motor housing and a second attachment portion disposed at the grip housing.

8. The cutting tool according to claim 7, wherein:
the first attachment portion is disposed at a lower portion of the motor housing; and
the second attachment portion is disposed at a lower portion of the grip housing.

9. The cutting tool according to claim 7, wherein:
the grip housing has a loop-shape and includes a lower connection portion and an upper connection portion;
the lower connection portion connects a lower portion of the handle portion to the rear portion of the motor housing; and
the upper connection portion protrudes forward from an upper portion of the handle portion so as to be connected to the motor housing.

10. The cutting tool according to claim 8, wherein:
at least the first battery attachment portion of the first and second battery attachment portions is configured such that the corresponding battery is attached to at least the first battery attachment portion as the battery is slid in a direction parallel to the output shaft.

11. The cutting tool according to claim 8, further comprising a controller configured to control an electric power supplied to the electric motor, wherein the controller is disposed within the grip housing.

12. The cutting tool according to claim 8, wherein an air inlet hole is formed in the grip housing for introducing a cooling air for the electric motor.

13. A cutting tool comprising:
a tool main body including:
an output shaft configured to be capable of mounting a cutting blade there to, wherein the output shaft protrudes from a front end of the tool main body;
an electric motor configured to rotatably drive a motor shaft with a supply of power from a rechargeable battery,
a reciprocation converting mechanism configured to convert the rotation of the motor shaft to a reciprocating motion of the output shaft, so that the cutting blade mounted to the output shaft cuts a workpiece as the output shaft reciprocates; and
a housing forming an outer casing of the tool main body and including at least one battery attachment portion allowing attachment of the rechargeable battery;
wherein an arrangement position of the at least one battery attachment portion is set to a position opposite to a position of a center of gravity of the tool main body, with respect to a reciprocating axis along which the output shaft reciprocates.

14. The cutting tool according to claim 13, wherein:
the center of gravity of the tool main body is located on a lower side of the reciprocating axis; and
the at least one battery attachment portion is located on an upper side of the reciprocating axis.

15. The cutting tool according to claim 14, wherein:
the at least one battery attachment portion comprises a first battery attachment portion and a second battery attachment portion; and
the second battery attachment portion is disposed on a rear side of the first battery attachment portion.

16. The cutting tool according to claim 15, wherein:
the housing comprises a motor housing and a grip housing;
the motor housing is configured to support the electric motor;
the grip housing is disposed on a rear side of the motor housing and includes a handle portion to be grasped by hand;
the first battery attachment portion is disposed at an upper portion of the motor housing; and
the second attachment portion is disposed at an upper portion of the grip housing.

17. The cutting tool according to claim 16, wherein:
each of the first and second battery attachment portions is configured such that a corresponding battery is mounted as the corresponding battery is slid in a direction parallel to the output shaft.

18. The cutting tool according to claim 16, wherein:
the grip housing has a loop-shape and includes a lower connection portion and an upper connection portion;
the lower connection portion connects a lower portion of the handle portion to a rear portion of the motor housing; and
the upper connection portion protrudes forward from an upper portion of the handle portion so as to be connected to the motor housing.

19. The cutting tool according to claim 16, further comprising a controller configured to control an electric power supplied to the electric motor, wherein the controller is disposed within the grip housing.

20. The cutting tool according to claim 16, wherein an air inlet hole is formed in the grip housing for introducing a cooling air for the electric motor.

* * * * *